United States Patent
Enomoto et al.

(10) Patent No.: US 9,854,512 B2
(45) Date of Patent: Dec. 26, 2017

(54) TERMINAL DEVICE AND COMMUNICATION CONTROL METHOD

(71) Applicant: SHARP KABUSHIKI KAISHA, Sakai, Osaka (JP)

(72) Inventors: Masayuki Enomoto, Osaka (JP); Masafumi Aramoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/310,754

(22) PCT Filed: May 13, 2015

(86) PCT No.: PCT/JP2015/063771
§ 371 (c)(1),
(2) Date: Nov. 12, 2016

(87) PCT Pub. No.: WO2015/174456
PCT Pub. Date: Nov. 19, 2015

(65) Prior Publication Data
US 2017/0078959 A1    Mar. 16, 2017

(30) Foreign Application Priority Data

May 13, 2014 (JP) ................................. 2014-099197

(51) Int. Cl.
*H04W 4/00* (2009.01)
*H04W 48/18* (2009.01)
(Continued)

(52) U.S. Cl.
CPC ........... *H04W 48/18* (2013.01); *H04W 76/02* (2013.01); *H04W 84/12* (2013.01); *H04W 88/06* (2013.01)

(58) Field of Classification Search
CPC ....... H04W 48/18; H04W 76/02; H04W 84/12
(Continued)

(56) References Cited

U.S. PATENT DOCUMENTS

| 2014/0206353 | A1* | 7/2014 | Kim | ..................... H04W 36/14 455/436 |
| 2014/0341076 | A1* | 11/2014 | Orlandi | ................. H04W 48/18 370/254 |
| 2015/0009826 | A1* | 1/2015 | Ma | .................... H04W 28/0268 370/235 |

OTHER PUBLICATIONS

"3GPP TS 23.261 V10.2.0 (Mar. 2012) Technical Specification: 3$^{rd}$ Generation Partnership Project; Technical Specification Group Services and System Aspects; IP flow mobility and seamless Wireless Local Area Network (WLAN) offload; Stage 2 (Release 10)," 2012, pp. 1-22, 3GPP Organizational Partners, Valbonne, France.
(Continued)

*Primary Examiner* — Nghi H Ly
(74) *Attorney, Agent, or Firm* — Kilpatrick Townsend & Stockton LLP

(57) ABSTRACT

Provided are a communication control method in which selection by a communication terminal of an access network is controlled using a policy for selecting an access network that is transmitted by a server of a home operator and a policy for selecting the access network, which is transmitted by a base station apparatus, and the like. By notifying the communication terminal of a policy for selection of the access network by a server and a policy for selection of the access network by the base station apparatus, a home operator can control selection of the access network by the communication terminal.

4 Claims, 22 Drawing Sheets

(51) Int. Cl.
*H04W 76/02* (2009.01)
*H04W 84/12* (2009.01)
*H04W 88/06* (2009.01)

(58) Field of Classification Search
USPC .......................... 455/434, 422.1, 414.2, 418
See application file for complete search history.

(56) References Cited

OTHER PUBLICATIONS

"3GPP TS 23.402 V12.4.0 (Mar. 2014) Technical Specification: 3$^{rd}$ Generation Partnership Project; Technical Specification Group Services and System Aspects; Architecture enhancements for non-3GPP accesses (Release 12)," 2014, pp. 1-288, 3GPP Organizational Partners, Valbonne, France.

"LS on CN impacts of RAN2 solutions for WLAN/3GPP radio networking," 3GPP TSG-RAN2 Meeting #85, Prague, Czech Republic, Feb. 10-14, 2014, pp. 1-3, R2-141026, Intel.

"Coexistence of RAN rules and ANDSF rules," 3GPP SA WG2 Meeting #102, Malta, Mar. 24-28, 2014, pp. 1-5, S2-141183, Blackberry UK Ltd.

"Interaction between (e)ANDSF and RAN rule," 3GPP TSG RAN WG2 Meeting #85bis, Valencia, Spain, Mar. 31-Apr. 4, 2014, pp. 1-6, R2-141098, CATT.

International Patent Application No. PCT/JP2015/063771, International Search Report dated Jun. 9, 2015, 3 pages.

International Patent Application No. PCT/JP2015/063771, International Preliminary Report on Patentability dated Nov. 24, 2016, 10 pages.

"OPI evaluation and use in ANDSF policies," 3GPP SA WG2 Meeting #102, St. Julian's, Malta, Mar. 24-28, 2014, pp. 1-3, S2-141202, AT&T, InterDigital Communications.

European Patent Application No. EP 15 792 263.4, Search Report dated Oct. 25, 2017, 5 pages.

\* cited by examiner

FIG. 2
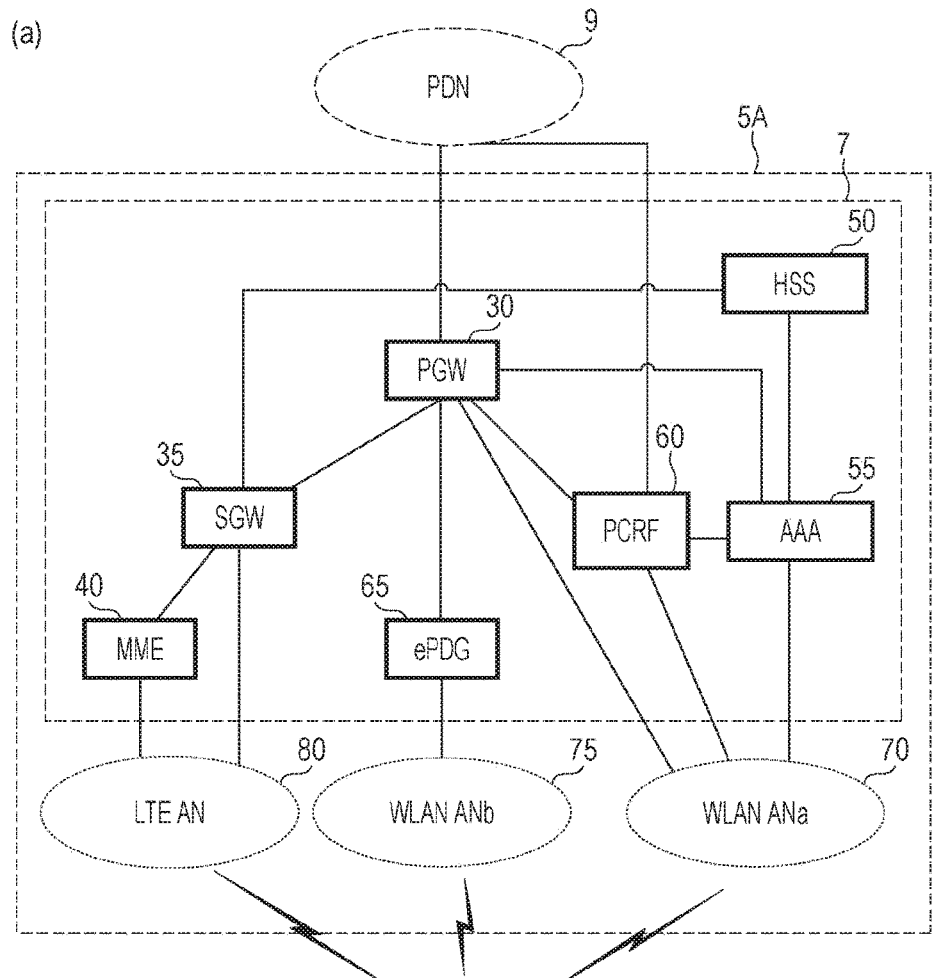
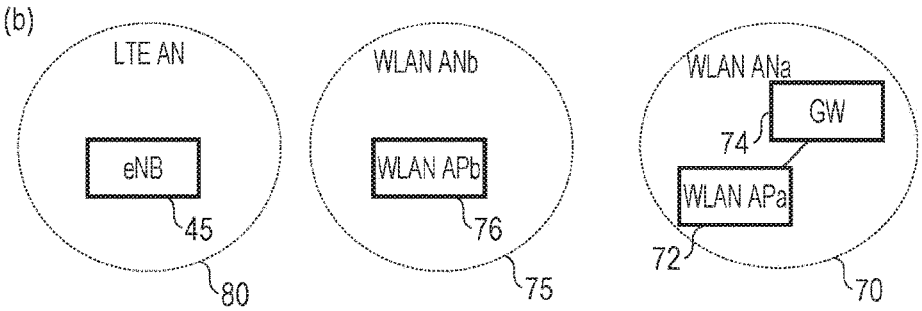

FIG. 4

(a) PRE-CHANGE UE POLICY (a-1) ANDSF POLICY

| POLICY |
|---|
| POLICY 1 |
| POLICY 2 |
| POLICY 3 |

(a-2) RAN POLICY

| ACCESS NETWORK INFORMATION | THRESHOLD 2 | OPI 2 |
|---|---|---|
| LTE | THRESHOLD 2 VALUE 1 | OPI 2 VALUE 1 |
| WLAN | THRESHOLD 2 VALUE 2 | OPI 2 VALUE 2 |

(b) UE POLICY AFTER RECEPTION OF ANDSF POLICY (b-1) ANDSF POLICY

| POLICY |
|---|
| POLICY 1 |
| POLICY 2-1 |
| POLICY 3 |

(b-2) RAN POLICY

| ACCESS NETWORK INFORMATION | THRESHOLD 2 | OPI 2 |
|---|---|---|
| LTE | THRESHOLD 2 VALUE 1 | OPI 2 VALUE 1 |
| WLAN | THRESHOLD 2 VALUE 2 | OPI 2 VALUE 2 |

(c) UE POLICY AFTER RECEPTION OF RAN POLICY (c-1) ANDSF POLICY

| POLICY |
|---|
| POLICY 1 |
| POLICY 2-1 |
| POLICY 3 |

(c-2) RAN POLICY

| ACCESS NETWORK INFORMATION | THRESHOLD 2 | OPI 2 |
|---|---|---|
| LTE | THRESHOLD 2 VALUE 3 | OPI 2 VALUE 3 |
| WLAN | THRESHOLD 2 VALUE 2 | OPI 2 VALUE 2 |

(d) PRE-CHANGE APPROVAL INFORMATION

| APPROVAL INFORMATION 1 | DISAPPROVED |
|---|---|
| APPROVAL INFORMATION 2 | DISAPPROVED |

(e) POST-CHANGE APPROVAL INFORMATION

| APPROVAL INFORMATION 1 | APPROVED |
|---|---|
| APPROVAL INFORMATION 2 | DISAPPROVED |

(a) CONSTITUTION OF eNB (b) RAN POLICY

| ACCESS NETWORK INFORMATION | THRESHOLD 2 | OPI 2 |
|---|---|---|
| LTE | THRESHOLD 2 VALUE 3 | OPI 2 VALUE 3 |
| WLAN | THRESHOLD 2 VALUE 2 | OPI 2 VALUE 2 |

FIG. 10

(a) MESSAGE THAT IS TRANSMITTED FROM UE TO ANDSF

| CAPABILITY OF UE | LOCATION INFORMATION |
|---|---|
| LTE, WLAN | LOCATION INFORMATION 1 |

(b) MESSAGE (ANDSF POLICY) THAT IS TRANSMITTED FROM ANDSF TO UE

| ACCESS NETWORK INFORMATION | POLICY |
|---|---|
| WLAN | POLICY 2-1 |

(c) MESSAGE (RAN POLICY) THAT IS TRANSMITTED FROM eNB TO UE

| ACCESS NETWORK INFORMATION | THRESHOLD 2 | OPI 2 |
|---|---|---|
| LTE | RSRP2/RSRQ 2 VALUE 3 | OPI 2 VALUE 3 |

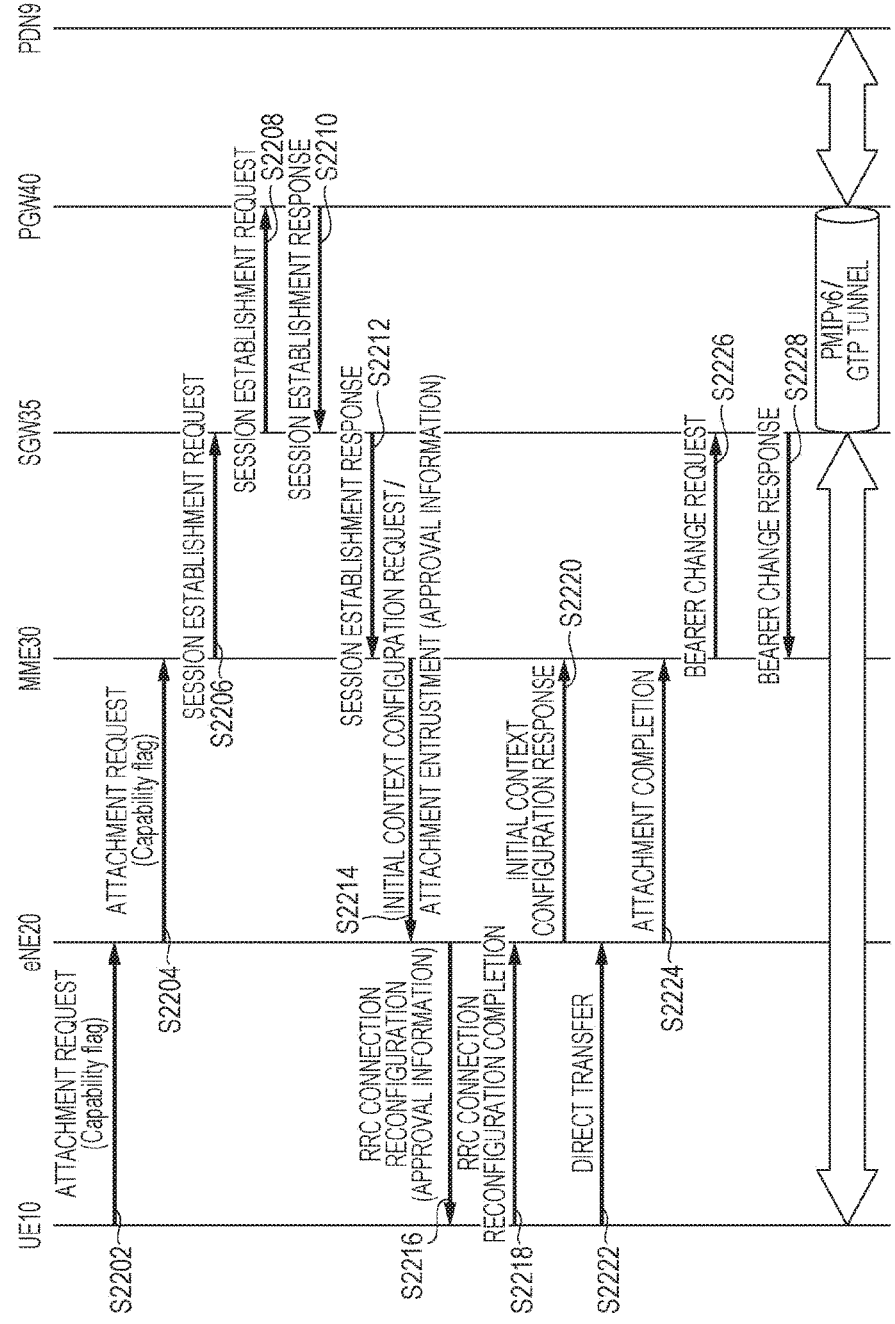

TERMINAL DEVICE AND COMMUNICATION CONTROL METHOD

CROSS REFERENCE TO RELATED APPLICATIONS

This application is the U.S. national phase of International Application No. PCT/JP2015/063771 filed on May 13, 2015, and published in Japanese on Nov. 19, 2015, as International Publication No. WO 2015/174456 A1, which application claims priority to Japanese Patent Application No. 2014-099197 filed on May 13, 2014, the contents of all of which are incorporated herein by reference.

TECHNICAL FIELD

The present invention relates to a terminal device and a communication control method.

BACKGROUND ART

In the 3rd Generation Partnership Project (3GPP) that is a standardization body for mobile communication systems, a job of developing a specification of an Evolved Packet System (EPS) as the next generation mobile communication system, which is disclosed in NPL 1 that follows, is proceeding. As an access system that is connected to the EPS, a Wireless LAN (WLAN) or Worldwide Interoperability for Microwave Access (WiMAX), as well as Long Term Evolution (LTE) has been under study.

Furthermore, in NPL 1, a job of developing a specification of the EPS in a case of performing roaming has been under study as well. In NPL 1, a network of a home mobile operator that is a roaming destination is disclosed as a Visited-Public Land Mobile Network (V-PLMN), and a network of a home mobile operator that does not perform roaming, with which a UE has a contract, is disclosed as Home-Public Land Mobile Network (H-PLMN).

Additionally, in the 3GPP, a recent increase in traffic due to the access of smartphones to the Internet has been under study, and a method in which concentration of traffic in LTE is avoided by performing switching from LTE to other access systems such as a wireless LAN and WiMAX according to a situation on the assumption that the traffic is difficult to process only with LTE has been under study.

In NPL 2, IP Flow Mobility (IFOM) as a technology in which concentration of traffic is avoided using multiple access systems has been under study and has been defined. IFOM is a technology in which distribution of the traffic can be performed by dividing the access system on the basis of flow. At this point, the flow is possible to identify with a transmission source IP address, a transmission destination IP address, a transmission source port number, a transmission destination IP address, and a protocol number (IP 5 is named after these five parameters).

Furthermore, in NPL 1, Multi Access PDN Connectivity (MAPCON) is disclosed as a technology in which the UE makes connections to different access systems at the same time. In MAPCON, different PDN connections to different access systems are established at the same time and thus connections to different access systems are made at the same time. At this point, the PDN connection is an information element in which an association is formed between the UE, the access system, and a Packet Data Network (PDN).

Furthermore, in NPL 2, a method in which Access Network Discovery and Selection Function (ANDSF) is used as a procedure in which the UE switches to the access system is disclosed. The ANDSF is a function of detecting the access system, selecting one access system from among one or multiple detected access systems, and notifying the UE of the selected access system as a policy of the home mobile operator.

The UE that is notified, by the ANDSF, of the access system as an ANDSF policy determines whether or not the access system that is included in the ANDSF policy is applied, and, in a case where the ANDSF policy is applied, switches to that access system by reflecting the UE policy.

Furthermore, in NPL 3, it is disclosed that the UE receives a RAN policy from an LTE access network. In the same manner as in the ANDSF policy, information for selecting one access system from among multiple access systems is included in the RAN policy.

CITATION LIST

Non Patent Literature

NPL 1: 3 GPP TS23.402 General Technical Specification Group Services and System Aspects, Architecture enhancements for non-3GPP accesses
NPL 2: 3GPP TS23.261 Technical Specification Group Services and System Aspects, IP flow mobility and seamless Wireless Local Area Network (WLAN) offload, Stage 2 (Release 10)
NPL 3: 3GPP S2-140871 LS on CN impacts of RAN2 solutions for WLAN/3GPP radio interworking

SUMMARY OF INVENTION

Technical Problem

However, it is difficult for the UE to receive the ANDSF policy and the RAN policy and to determine whether or not to make a selection of the access system that is based on the ANDSF policy and the RAN policy. Furthermore, it is difficult for the UE to receive the ANDSF policy and the RAN policy that are stipulated by the home mobile operator (H-PLMN) with which the UE has a contract at a roaming destination or by the home mobile operator at the roaming destination and to determine whether or not to make a selection of the access system that is based on the ANDSF policy and the RAN policy that are stipulated by the H-PLMN or the V-PLMN.

Because it is difficult for the UE to determine whether or not to make a selection of the access system which is based on the ANDSF policy and the RAN policy, it is difficult for the home mobile operator to control the selection by the UE of the access system that is based on the ANDSF policy and the RAN policy. Furthermore, at the roaming destination, because it is difficult for the UE to determine whether or not to make a selection of the access system with the ANDSF policy and the RAN policy which are received from the H-PLMN or the V-PLMN, it is also difficult for the home mobile operator with which the UE has a contract and the home mobile operator at the roaming destination to control the selection by the UE of the access system that is based on the RAN policy.

An object of the present invention, which was made in view of this situation, is to provide a mobile communication system and the like in which, in a case where a mobile station apparatus that has a connection to an LTE base station apparatus performs data communication, with the notification of an ANDSF policy by an ANDSF to a UE and the notification of a RAN policy by the LTE base station apparatus, the UE can switch from data transmission and reception through the LTE base station apparatus to data transmission and reception through a WLAN base station apparatus, using the ANDSF policy or the RAN policy and can avoid concentration of traffic in the LTE base station apparatus.

Solution to Problem

According to an aspect of the present invention, there is provided a terminal device including: an interface unit through which to receive an Inter-System Routing Policy (ISRP) that includes at least a first Offload preference Indicator (OPI) which is transmitted by an Access Network Discovery and Selection Function (ANDSF) on a Home Public Land Mobile Network (PLMN) and a second OPI that is transmitted by an access network; and a control unit that uses the ISRP to route traffic, based on the first OPI and the second OPI.

According to another of the present invention, there is provided a terminal device including: an interface unit through which to receive an Inter-APN Routing Policy (IARP) that includes at least a first Offload preference Indicator (OPI) which is transmitted by an Access Network Discovery and Selection Function (ANDSF) on a Home Public Land Mobile Network (PLMN) and a second OPI that is transmitted by an access network; and a control unit that uses the IARP to route traffic, based on the first OPI and the second OPI.

According to still another of the present invention, there is provided a terminal device including: an interface unit through which to receive an Inter-System Routing Policy (ISRP) from an Access Network Discovery and Selection Function (ANDSF) on a Home Public Land Mobile Network (PLMN) and to receive threshold information of a first access network and/or threshold information of a second access network from the first access network; and a control unit that uses the ISRP to route traffic, based on the threshold information of the first access network and/or the threshold information of the second access network, in a case where control information for using the threshold information of the first access network and/or the threshold information of the second access network is included in the ISRP.

According to still another aspect of the present invention, there is provided a communication control method for use in a terminal device, the method including: a step of receiving an Inter-System Routing Policy (ISRP) that includes at least a first Offload preference Indicator (OPI), from an Access Network Discovery and Selection Function (ANDSF) on a Home Public Land Mobile Network (PLMN); a step of receiving a second OPI from an access network; and a step of using the ISRP to route traffic, based on the first OPI and the second OPI.

According to still another aspect of the present invention, there is provided a communication control method for use in a terminal device, the method including: a step of receiving an Inter-APN Routing Policy (IARP) that includes at least a first Offload preference Indicator (OPI), from an Access Network Discovery and Selection Function (ANDSF) on a Home Public Land Mobile Network (PLMN); a step of receiving a second OPI from an access network; and a step of using the IARP to route traffic, based on the first OPI and the second OPI.

According to still another aspect of the present invention, there is provided a communication control method for use in a terminal device, the method including: a step of receiving an Inter-System Routing Policy (ISRP) from an Access Network Discovery and Selection Function (ANDSF) on a Home Public Land Mobile Network (PLMN); a step of receiving threshold information of a first access network and/or threshold information of a second access network from the first access network; and a step of using the ISRP to route traffic, based on the threshold information of the first access network and/or the threshold information of the second access network, in a case where control information for using the threshold information of the first access network and/or the threshold information of the second access network is included in the ISRP.

Advantageous Effects of Invention

According to the present invention, the suitable use of a policy by a UE is provided. Moreover, the policy is among a UE policy, a RAN policy from an LTE access network, and an operator policy from a home operator or is a policy that results from combining two or more policies among these policies. Based on the policy, the suitable use of a communication path by a UE 10 is realized.

BRIEF DESCRIPTION OF DRAWINGS

FIG. 2 is a diagram for describing a constitution of an IP mobile communication network according to the first embodiment.

FIG. 4 is a diagram illustrating an example of a functional constitution that is managed in a storage unit of the UE according to the first embodiment.

FIG. 10 is a diagram for describing contents of a message according to the first embodiment.

FIG. 22 is a diagram for describing a flow of processing according to a modification example.

DESCRIPTION OF EMBODIMENTS

Figure 1:
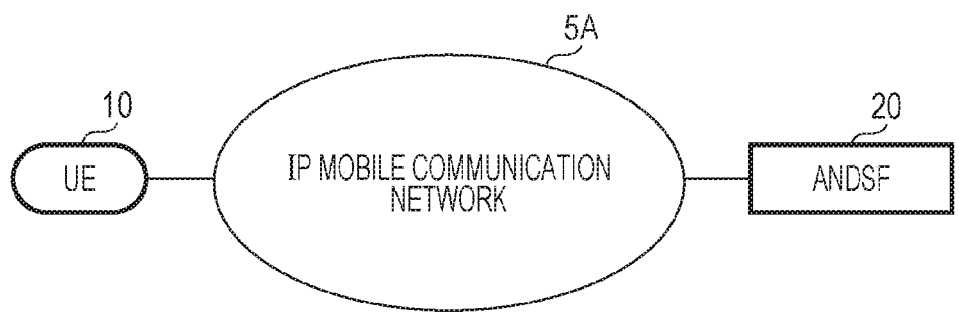
FIG. 1 is a diagram for describing an outline of a communication system according to a first embodiment.

Best aspects of the present invention will be described below referring to the drawings. Moreover, as an example, a mobile communication system according to the present embodiment of the present invention will be described in detail below referring to the drawings.

1. First Embodiment

First, a first embodiment of the present invention is described referring to the drawings. Moreover, in the present invention, the terms access system and access network mean information indicating LTE, WLAN, WiMAX, and the like.

[1.1 Overview of a Mobile Communication System]

FIG. 1 is a diagram for describing an outline of the mobile communication system according to the present embodiment. As illustrated in FIG. 1, the mobile communication system is constituted from a UE (a mobile station apparatus) 10, an IP mobile communication network 5A, and an Access Network Discovery and Selection Function (ANDSF) 20.

The IP mobile communication network 5A, for example, may be a core network may be a broadband network. The core network, as will be described in detail below, is an IP mobile communication network that is operated by a mobile operator.

Furthermore, the broadband network is a wired access network that realizes broadband network, and for example, is set up as an Asymmetric Digital Subscriber Line (ADSL), an optical fiber, or the like. However, the broadband network is not limited to these and may be a wireless access network such as Worldwide Interoperability for Microwave Access (WiMAX).

The UE 10 is a mobile communication terminal that makes a connection to LTE, WLAN, or WiMAX. The UE that, for making a connection, is equipped with a communication interface for 3GPP LTE, a communication interface for WLAN, or for a communication interface for WiMAX is able to make a connection to the IP mobile communication network 5A.

The ANDSF 20 is a server apparatus that performs management of a policy that is configured by the home mobile operator. The policy may be information that is associated with a method of using a communication path, such as switching of the communication path that is established by the UE 10 using a wireless access system, such as LTE or WLAN. Moreover, the ANDSF 20 according to the present embodiment may be a server apparatus that is operated and managed over an H-PLMN. At this point, the H-PLMN may be identification information for identifying a home mobile operator with which the UE 10 has a contract or a Home Operator Network.

Furthermore, the ANDSF 20 makes a connection to the IP mobile communication network 5A over a wired line or the like. For example, the wired line is set up as an Asymmetric Digital Subscriber Line (ADSL) or an optical fiber, or the like. However, the wired line is not limited to these, and may be a wireless access network, such as Long Term Evolution (LTE), Wireless LAN (WLAN), or Worldwide Interoperability for Microwave Access (WiMAX).

[1.1.1 Example of a Constitution of the IP Mobile Communication Network]

Next, an example of a constitution of the IP mobile communication network 5A is described referring to FIG. 2. The IP mobile communication network 5A may be a network that is operated by the home operator. The example of the constitution of the IP mobile communication network is illustrated in FIG. 2.

A PDN 9 is a network over which data is transmitted and received with packets to and from the UE 10, and for example, is a service network, such as the Internet or an IMS, over which a specific service is provided.

The core network 7 is constituted from a Packet Data Network GW (PGW) 30, an SGW 35, an MME 40, an eNB 45, an HSS 50, an AAA 55, a PCRF 60, an ePDG 65, a WLAN 70a, and a WLAN 70b.

FIG. 2 is an example of a detailed constitution of the communication system that is illustrated in FIG. 1. The example of the constitution of the system that is illustrated in FIG. 2 is constituted from the UE 10, the IP mobile communication network 5A, and the PDN 9. It is possible that in addition to the UE 10, multiple UEs make connections to the IP mobile communication network 5A.

The IP mobile communication network 5A is constituted from the core network 7 and wireless access networks (an LTE AN 80, a WLAN ANb 75, and WLAN ANa 70). The core networks 7 is constituted from the Home Subscriber Server (HSS) 50, the Authentication, Authorization, and Accounting (AAA) 55, the Policy and Charging Rules Function (PCRF) 60, the Packet Data Network Gateway (PGW) 30, the enhanced Packet Data Gateway (ePDG) 65, the Serving Gateway (SGW) 35, and the Mobile Management Entity (MME) 40.

Furthermore, the ANSDF 20 that is described referring to FIG. 1 may be constituted to be included in the PDN 9, may be constituted to be independent of the PDN 9 and be included in the IP mobile communication network 5A, and may be constituted to be included in the core network 7.

The wireless access network may be constituted from multiple different access networks. Each of the access networks is connected to the core network 7. Additionally, the UE 10 can make a connection to the wireless access network in a wireless manner.

The wireless access network can be constituted from an LTE access network (the LTE AN 80) to which an LTE access system can make a connection, and access networks (the WLAN ANb 75 and the WLAN ANa 70) that can be connected in a WLAN access system.

Additionally, it is possible that the access network that is connectable in the WLAN access system is constituted from a WLAN access network b (the WLAN ANb 75) that connects to the ePDG 65 that serves as an apparatus for connection to the core network 7 and a WLAN access network a (the WLAN ANa 75) that connects to the PGW 30, the PCRF 60, and the AAA 55.

Moreover, because in the mobile communication system for which an EPS is substituted for the purpose of alternative use, each apparatus has the same constitution as the apparatus in the related art, a detailed description thereof is omitted. Each apparatus will be briefly described below.

The PGW 30 is connected to the PDN 9, the SGW 35, the ePDG 65, and the WLAN ANa 70, and to the PCRF 60 and the AAA 55, and as a gateway apparatus for the PDN 9 and the core network 7, performs delivery of user data.

The SGW 35 is connected to the PGW 30, the MME 40, and the LTE AN 80, and as a gateway apparatus for the core network 7 and the LTE AN 80, performs the delivery of user data.

The MME 40 is connected to the SGW 35, the LTE AN 80, and the HSS 50, and is an access control apparatus that performs access control of the UE 10 over the LTE AN 80.

The HSS 50 is connected to the MME 40 and the AAA 55, and is a management node that performs management of subscriber information. The subscriber information of the HSS 50, for example, is referred to at the time of the access control by the MME 40.

The AAA 55 is connected to the PGW 30, the HSS 50, the PCRF 60, and the WLAN ANa 70, and performs the access control of the UE 10 that makes a connection over the WLAN ANa 70.

The PCRF 60 is connected to the PGW 30, the WLAN ANa 75, the AAA 55, and the PDN 9, and performs QoS management of data delivery. For example, the QoS management of a communication path between the UE 10 and the PDN 9 is performed.

The ePDG 65 is connected to the PGW 30 and the WLAN ANb 75, and as a gateway apparatus for the core network 7 and the WLAN ANb 75, performs the delivery of user data.

Furthermore, as illustrated in FIG. 2(*b*), an apparatus (for example, a base station apparatus or an access point apparatus) to which the UE 10 actually makes a connection, and the like are included in each wireless access network. As an apparatus that is used for connection, an apparatus that adapts to the wireless access network is considered.

According to the present embodiment, the LTE AN 80 is constituted to include the eNB 45. The eNB 45 is a wireless base station to which the UE 10 makes a connection in the LTE access system, and the LTE AN 80 may be constituted to include one or multiple wireless base stations.

The WLAN ANa 70 is constituted to include a WLAN APa 75 and a gateway (GW) 74. The WLAN APa 75 is a wireless base station to which the UE 10 makes a connection in the WLAN access system that is reliable to the home operator who administers the core network 7, and the WLAN ANa 70 may be constituted to include one or multiple wireless base stations. The GW 74 is a gateway apparatus for the core network 7 and the WLAN ANa 70. Furthermore, the WLAN APa 72 and the GW 74 may be constituted to be integrated into a single apparatus.

Even in a case where the home operator who administers the core network 7 and the home operator who administers the WLAN ANa 70 are different, it is possible that this configuration is realized with a contract or an agreement between the home operators.

Furthermore, the WLAN ANb 75 is constituted to include the WLAN APb 76. In a case where a relationship of mutual trust with the home operator who administers the core network 2 is not established, the WLAN APb 76 is a wireless base station to which the UE 10 makes a connection in the WLAN access system, and the WLAN ANb 75 may be constituted to include one or multiple wireless base stations.

In this manner, the WLAN ANb 75 is connected to the core network 7, with the ePDG 65, which is an apparatus included in the core network 7, serving as a gateway. The ePDG 65 has a security function for ensuring security.

Moreover, in the present specification, the UE 10 making a connection to each wireless access network means that the UE 10 makes a connection to a base station apparatus, an access point, or the like that is included in each wireless access network, and data or a signal is also transmitted and received through the base station apparatus or the access point.

[1.2 Apparatus Constitution]

Subsequently, each apparatus is briefly described referring to the drawings.

[1.2.1 Constitution of the UE]

Figure 3:
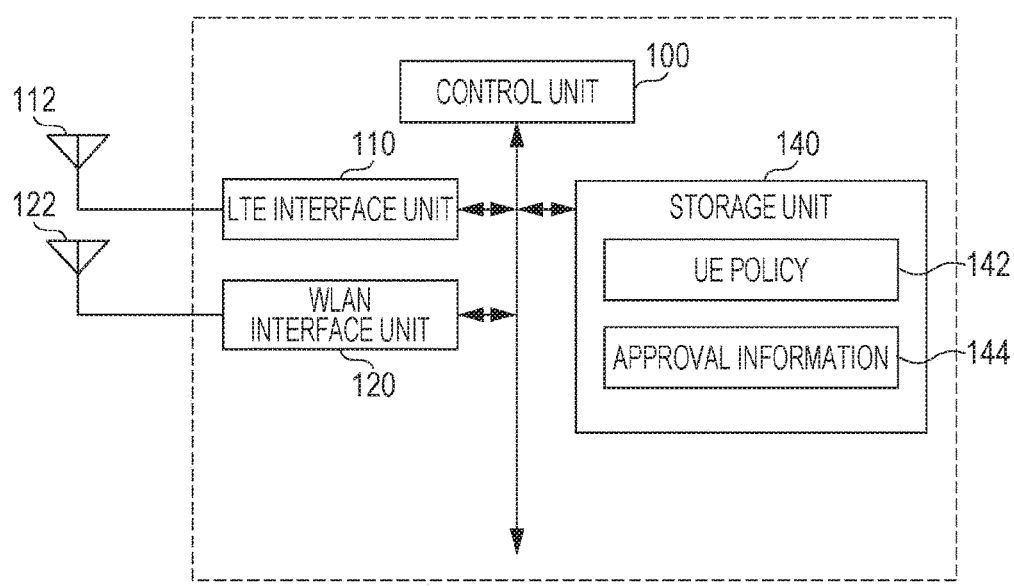
FIG. 3 is a diagram for describing a functional constitution of a UE according to the first embodiment.

FIG. 3 illustrates a constitution of the UE 10 according to the present embodiment. In the UE 10, an LTE interface unit 110, a WLAN interface unit 120, and a storage unit 140 are connected to a control unit 100 through a bus.

The control unit 100 is a functional unit for controlling the UE 10. The control unit 100 realizes various processing operations by reading and executing various programs that are stored in the storage unit 140.

The LTE interface unit 110 is a functional unit that makes it possible for the UE 10 to make a connection to an LTE base station and to make a connection to an IP access network. Furthermore, the external antenna 112 is connected to the LTE interface unit 110.

The WLAN interface unit 120 is a functional unit that makes is possible for the UE 10 to make a connection to a WLAN access point and to make a connection to the IP access network. Furthermore, an external antenna 122 is connected to the WLAN interface unit 120.

The storage unit 140 is a functional unit in which programs and pieces of data that are indispensable for various operations by the UE 10 are stored. Additionally, a UE policy 142 and an approval information 144 are stored in the storage unit 140.

The UE 10 may store multiple pieces of approval information in the approval information 144.

In a case where the UE 10 receives an ANDSF policy that is to be received from the home mobile operator with which the UE 10 has a contract, approval information 1 may be information for approving performing of control that uses the received ANDSF policy. For example, the approval information 1 may be information for approving updating of the UE policy 142 based on information in the received ANDSF policy. Furthermore, the approval information 1 may be information for approving switching of the communication path based on the received ANDSF policy. At this point, the home mobile operator with which the UE 10 has a contract may be a network that is identified as a Home-Public Land Mobile Network (H-PLMN).

At this point, the approval information 1 may be stored in advance in the storage unit of the UE 10 in the factory at the time of terminal manufacturing, and may be configured by a user. Furthermore, the approval information 1 may be received along with the ANDSF policy that is transmitted by the home mobile operator, and may be received as an information element of the ANDSF policy in a state of being included in the ANDSF policy.

Additionally, the approval information 1 may be stored in a state of being associated with information for identifying the home mobile operator, such as a PLMN ID, and multiple pieces of approval information 1 that differ with ANDSF policies that are transmitted by the home mobile operator may be retained.

An information element that is included in the ANDSF policy will be described in detail below, and thus at this point a detailed description thereof is omitted.

When the UE 10 makes a connection to the Home Operator Network with which the UE 10 has a contract, the UE 10 receives a RAN policy from a base station to which the UE 10 makes a connection. In this case, approval information 2 may be information for approving performing of control that uses the received RAN policy. For example, the approval information 2 may be information for approving the updating of the UE policy 142 based on information in the received RAN policy. Furthermore, the approval information 2 may be information for approving the switching of the communication path based on the received RAN policy.

At this point, the approval information 2 may be stored in advance in the storage unit of the UE 10 in the factory at the time of terminal manufacturing, and may be configured by the user. Furthermore, the approval information 2 may be received along with the ANDSF policy that is transmitted by the home mobile operator, and may be received as the information element of the ANDSF policy in the state of being included in the ANDSF policy.

Additionally, the approval information 2 may be stored in a state of being associated with the information for identifying the home mobile operator, such as a PLMN, and multiple pieces of approval information 2 that differ from one home mobile operator to another may be retained.

An information element that is included in the RAN policy will be described in detail below, and thus at this point a detailed description thereof is omitted.

In a case where the UE 10 receives the ANDSF policy that is to be received from a home mobile operation (Visited Mobile Operator) that is a roaming destination, which is different from the home mobile operator with which the UE 10 has a contract, approval information 3 may be information for approving the performing of the control that uses the received ANDSF policy. For example, the approval information 3 may be information for approving the updating of the UE policy 142 based on the information in the received ANDSF policy. Furthermore, the approval information 3 may be information for approving the switching of the communication path based on the received ANDSF policy.

At this point, the home mobile operator that is the roaming destination may be a home mobile operator who has a contractual relationship with the home mobile operator with which the UE 10 has a contract. Additionally, the home mobile operator that is the roaming destination may be a home mobile operator to which the UE 10 makes a connection at the time of roaming. Furthermore, the home mobile operator may be a network that is identified as a Visited-Public Land Mobile Network (V-PLMN).

Furthermore, the approval information 3 may be stored in advance in the storage unit of the UE 10 in the factory at the time of terminal manufacturing, and may be configured by the user. Furthermore, the approval information 3 may be received along with the ANDSF policy that is transmitted by the home mobile operator with which the UE 10 has a contract, and may be received as the information element of the ANDSF policy in the state of being included in the ANDSF policy.

Additionally, the approval information 3 may be stored in the state of being associated with the information for identifying the home mobile operator, such as the PLMN, and multiple pieces of approval information 3 that differ from one home mobile operator to another may be retained. For example, with the approval information 3, it may be managed whether or not multiple certain roaming-available home mobile operators each use the ANDSF policy that is transmitted by the home mobile operator.

An information element that is included in the ANDSF policy will be described in detail below, and thus at this point a detailed description thereof is omitted.

When the UE 10 makes a connection to a Home Operator Network (a Visited Operator Network) that is a roaming destination, the UE 10 receives the RAN policy from the base station to which the UE 10 makes a connection. In this case, approval information 4 may be information for approving the control that uses the received RAN policy. For example, the approval information 4 may be information for approving the updating of the UE policy 142 based on the information in the received RAN policy. Furthermore, the approval information 4 may be information for approving the switching of the communication path based on the received RAN policy. In this manner, the approval information 4 may be a policy of the home mobile operator that is a roaming destination.

At this point, the approval information 4 may be stored in advance in the storage unit of the UE 10 in the factory at the time of terminal manufacturing, and may be configured by the user. Furthermore, the approval information 4 may be received along with the ANDSF policy that is transmitted by the home mobile operator with which the UE 10 has a contract, and may be received as the information element of the ANDSF policy in the state of being included in the ANDSF policy. Furthermore, the approval information 4 may be received along with the RAN policy that is transmitted by the home mobile operator, and may be received as information element of the RAN policy in the state of being included in the ANDSF policy. Furthermore, the UE 10 may receive the approval information 4 along with the ANDSF policy that is transmitted by the home mobile operator (the Visited Mobile Operator) that is a roaming destination, and may receive the approval information 4 as the information element of the ANDSF policy, in the state of being included in the ANDSF policy.

Additionally, the approval information 4 may be stored in the state of being associated with the information for identifying the home mobile operator, such as the PLMN, and multiple pieces of approval information 4 that differ from one home mobile operator to another may be retained. For example, with the approval information 4, it may be managed whether or not multiple certain roaming-available home mobile operators each use the RAN policy that is transmitted by the base station.

An information element that is included in the RAN policy will be described in detail below, and thus at this point a detailed description thereof is omitted.

In a case where the UE 10 receives the approval information 4 that is transmitted by the home mobile operator (the Visited Mobile Operator) which is a roaming destination, approval information 5 may be information for approving the performing of the control that uses the approval information 4. Alternatively, the approval information 5 may be information for approving the control that uses the fact that the RAN policy is used, based on the approval information 4 that is transmitted by the home mobile operator (the Visited Mobile Operator) that is a roaming destination.

At this point, the approval information 5 may be stored in advance in the storage unit of the UE 10 in the factory at the time of terminal manufacturing, and may be configured by the user. Furthermore, the approval information 5 may be received along with the ANDSF policy that is transmitted by the home mobile operator with which the UE 10 has a contract, and may be received as the information element of the ANDSF policy in the state of being included in the ANDSF policy.

Additionally, the approval information 5 may be stored in the state of being associated with the information for identifying the home mobile operator, such as the PLMN, and multiple pieces of approval information 5 that differ from one home mobile operator to another may be retained. For example, it may be managed whether or not multiple certain roaming-available home mobile operators each performs the control that uses the approval information 4 which is transmitted by the home mobile operator that is a roaming destination. Additionally, with the approval information 5, it may be managed whether or not the RAN policy that is transmitted by the base station is used.

An information element that is included in the RAN policy will be described in detail below, and thus at this point a detailed description thereof is omitted.

The UE 10 does not necessarily need to store all pieces of approval information, that is, the approval information 1 to the approval information 5, which are described above, and may store some pieces of approval information. Furthermore, the approval information 1 to the approval information 5 are described as being different pieces of approval information, but one or several pieces of approval information, or all pieces of approval information may be stored as one piece of approval information that has the same meaning as each piece of approval information. For example, the approval information 1 and the approval information 2 may be stored as one piece of approval information, and the approval information 3, the approval information 4, and the approval information 5 may be stored as one piece of approval information.

Furthermore, the UE policy 142 that is stored in the storage unit 140 may be information relating to the use of the communication path, such as when the UE 10 switches the communication path. The ANDSF policy may include multiple information elements for determining a condition for a connection to the access network, and the like, which are received from the ANDSF. Additionally, the RAN policy may include multiple information elements for determining the condition for the connection to the access network, which are received from the base station.

The UE 10 may store information of each information element that is included in the ANDSF policy, in the UE policy 142 in advance. Furthermore, the UE 10 may update the UE policy 142 with the information element that is included in the ANDSF policy or the RAN policy. At this point, the UE 10 may renew one or several information elements that are included in the ANDSF policy or the RAN policy, and may renew all information elements that are received.

Furthermore, the information element that is configured by a user or a terminal may be stored as the UE policy 142, and as illustrated in FIG. 4(*a*), information for each information as the ANDSF policy and the RAN policy may be stored.

Furthermore, each information element of the UE 142 that is configured in advance by the user or the terminal may be renewed, and the ANDSF policy and the RAN policy may be individually retained in the UE policy 142. For example, as illustrated in FIG. 4(*b*), with the ANDSF policy that is received from the ANDSF, the ANDSF policy that is stored by the UE 10 may be updated. Furthermore, with the RAN policy that is received from the base station, the RAN policy that is stored by the UE 10 may be updated.

At this point, this updating may be determined based on any one of the approval information 1 to the approval information 5.

Furthermore, multiple ANDSF policies may be retained as illustrated in FIG. 4(*a*-1). For example, policies may be stored that vary according to communication granularity of each of the communication unit that is associated with an application, the communication unit that is associated with an APN, the communication unit that is associated with a PDN connection, and the like.

Figure 5:
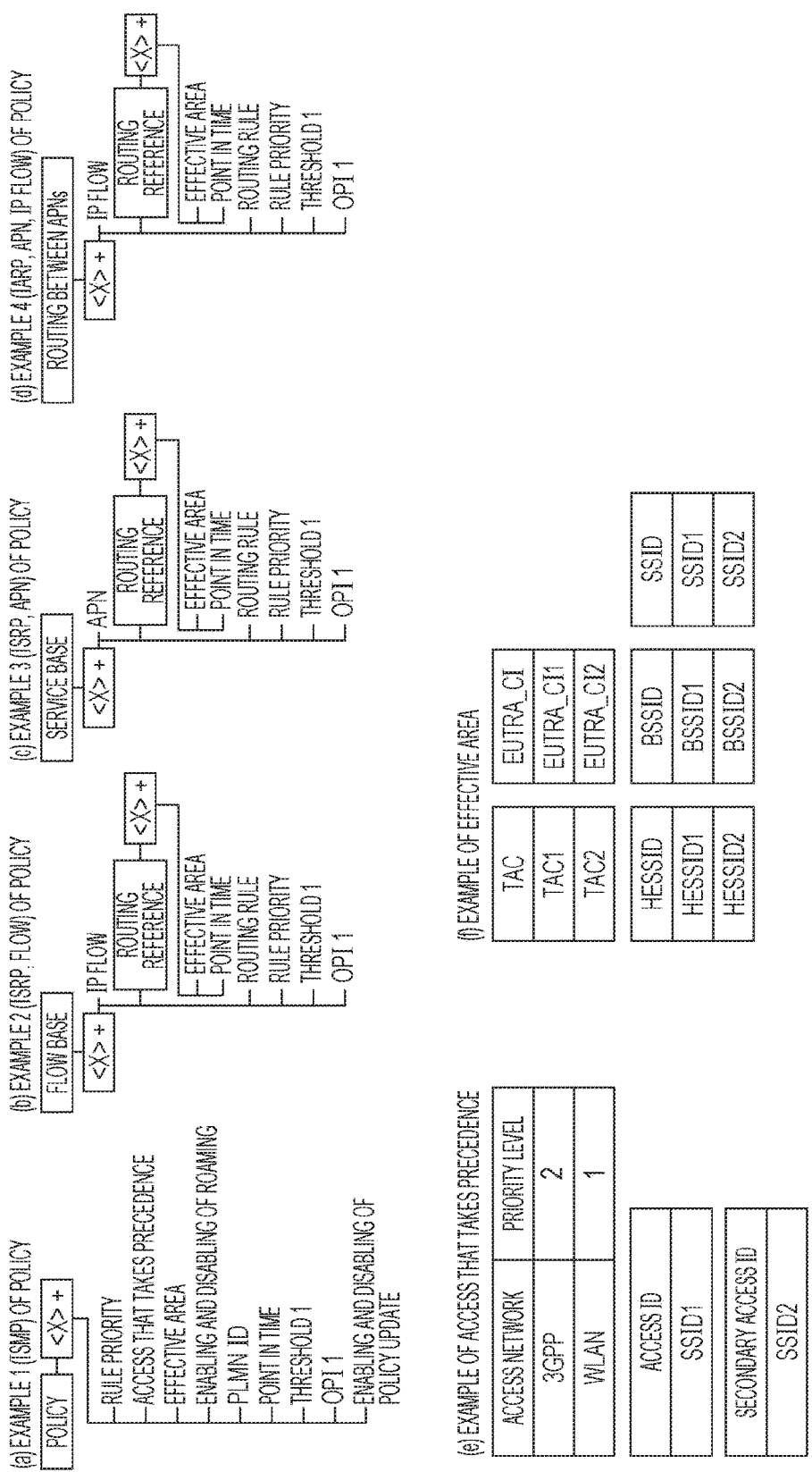
FIG. 5 is a diagram for describing an example of a constitution of a policy according to the first embodiment.

FIG. 5 illustrates a specific example of the policy that is included in the ANDSF policy. Four ANDSF types, that is, a type 1 to a type 4, are illustrated in FIG. 5. So far, the UE 10 is described as being able to store multiple ANDSF policies, but the UE 10 may retain multiple ANDSF policies of the same type, and may retain multiple ANDSF policies of different types.

FIG. 5(*a*) illustrates the type 1, and illustrates a condition for switching the access system with an Inter-System Mobility Policy (ISMP). Included in the ISMP is information relating to the use of communication paths whose targets are all communications that are performed by the UE 10. For example, a condition for switching all the communications that are performed by the UE 10, or each information element that is indispensable for switching the communication path is included.

FIG. 5(*b*) illustrates the type 2, and illustrates a condition for switching the access system with an Inter-System Routing Policy (ISRP). In an example of the ISRP in FIG. 5(*b*), information relating to the use of a communication path whose target is a specific communication, such as a specific flow that is executed by the UE 10 or a communication that corresponds to an application, is included. The specific communication that is designated here can switch between two communication paths that are established based on a single APN. At this point, the two communication paths that are established based on a single APN may be a communication path that is established through an LTE access network which is established based on an APN 1, and a communication path that is established through a WLAN access network which is established based on the APN 1.

FIG. 5(*c*) illustrates the type 3, and illustrates the condition for switching the access system with the Inter-System Routing Policy (ISRP). In an example of the ISRP in FIG. 5(*c*), information relating to the use of the communication path whose target is a specific communication, such as a communication corresponding to a specific APN, which is executed by the UE 10, or a communication that corresponds to the PDN connection is included. The specific communication that is designated here can switch between two communication paths that are established based on a single APN. At this point, the two communication paths that are established based on a single APN may be a communication path that is established through the LTE access network which is established based on the APN 1, and a communication path that is established through the WLAN access network which is established based on the APN 1.

FIG. 5(*d*) illustrates the type 4, and illustrates a condition for switching the access system with an Inter-APN Routing Policy (IARP). In an example of the IARP in FIG. 5(*d*), the information relating to the use of the communication path whose target is a specific communication, such as a specific flow that is executed by the UE 10 or a communication that corresponds to an application, is included. The specific communication that is designated here can switch between two communication paths that are established based on different APNs. At this point, the two communication paths that are established based on different APNs may be the communication path that is established through the LTE access network which is established based on the APN 1, and a communication path that is established through the WLAN access network which is established based on an APN 2. In this manner, the type 4 may be a policy for routing between the APNs.

An example of each information element of the type 1 will be described below referring to FIG. 5(a). Included in the type 1 are at least one or several information elements, among rule priority, access that takes precedence, an effective area, availability and unavailability of roaming, a PLMN ID, time-in-point information, a threshold 1 and an Offload Preference Indicator (OPI) 1 in FIG. 5.

Furthermore, information indicating that the policy is a policy which is applicable to all communications that are performed by the UE 10 may be included, as information indicating the communication granulation, in the type 1. Furthermore, the information indicating that the policy is a policy which is applicable to all communications that are performed by the UE 10 may be included as explicit identification information, such as information indicating the ISMP. With a message type or the like for identifying a control message indicating that the type is the type 1, the ANDSF may be notified to the UE 10.

Moreover, in the ANDSF policy, the rule priority indicates a level of priority in a case where one or more policies are included. The policy to which the smallest value of the rule priority is allocated is a policy that has the highest priority. Moreover, the same rule priority may be assigned, and a selection of the policy in a case where the same rule priority is allocated may be determined with configuration information of the UE or may be determined in a random manner.

The access that takes precedence indicates an access network that takes precedence within a policy. The access that takes precedence, for example, is access to 3GPP or WLAN. Moreover, 3GPP indicates LTE, W-CDMA, GSM (a registered trademark), or the like. Pieces of information indicating 3GPP, WLAN, and the level of priority, which are described above, are associated with the access that takes precedence. Furthermore, an access ID may be included in the access that takes precedence. In the case of WLAN, the access ID is a Service Set Identifier (SSID). The SSID is an identifier of an access point. Furthermore, instead of the SSID, the access ID may be an SSID, as an Extended-SSID (E-SSID), which corresponds to multiple access points. In a case where the SSID or the E-SSID is included in the access that takes precedence, if connections to multiple WLANs can be made, the UE 10 preferentially makes a connection to WLAN that is indicated by the access ID.

Furthermore, a secondary access ID may be included in the access that takes precedence. In a case where the secondary access ID is included, if WLAN that is included in the access ID is not present and WLAN that is included in the secondary access ID is present, the UE 10 preferentially makes a connection to WLAN that is indicated by the secondary access ID.

FIG. 5(e) illustrates an example of the access that takes precedence. In FIG. 5(e), the access networks include 3GPP and WLAN, with a level of priority of 3GPP being associated with 2 and a priority level of WLAN with 1. More precisely, in an example in FIG. 5(e), in a case where connections to both of 3GPP and WLAN are possible, it is indicated that WLAN takes higher precedence for connection than 3GPP. Furthermore, in FIG. 5(e), an SSID 1 is included as an access ID, and an SSID 2 is included as a secondary access ID. In a case where a connection to WLAN with the SSID 1 is possible, the connection to WLAN with the SSID 1 is made. In a case where the connection to WLAN with the SSID 1 cannot be made and a connection to WLAN with the SSID 2 is possible, the connection to WLAN with the SSID 2 is made. In a case where the connection to WLAN with the SSID 1 cannot be made, the connection to WLAN with the SSID 1 cannot be made, and a connection to WLAN that different from WLAN with the SSID 1 or the SSID 2 is possible, the WLAN without the SSID 1 or the SSID 2 is made. Moreover, the description is provided above with the SSID as an example, but the SSID is not necessarily needed, and the E-SSID may be used.

The effective area indicates location information indicating a location where a policy is applicable. Included in the effective area is location information for 3GPP or location information for WLAN. Pieces of location information for 3GPP specifically include a Public Land Mobile Network (PLMN), a Tracking Area Code (TAC), an Evolved Universal Terrestrial Radio Access Cell global Idetity (EUTRA_CI), and the like. The PLMN indicates a mobile communication network that is administered by the home mobile operator, and may include a Home PLMN ID for which the UE 10 contracts, a Visited PLMN ID and the like for identifying the roaming-available Home Operator Network, and multiple PLMN IDs. The TAC is an identifier that is allocated to every group of LTE base station apparatuses, with several LTE base station apparatuses as one group. The EUTRA_CI is an identifier that is allocated to every LTE base station apparatus.

Pieces of location information for WLAN specifically include a Basic SSID (BSSID), an SSID, and Homogeneous Extended SSID (HESSID). The BSSID is identification information for identifying single WLAN. The HESSID is an SSID that is newly stipulated in IEEE 802.11u, and is identification information for identifying WLAN that complies with IEEE 802.11u.

FIG. 5(f) illustrates an example of the effective area. In FIG. 5(f), a TAC 1 and a TAC 2 are included, as effective areas, in the TAC. A EUTRA_CI 1 and a EUTRA_CI 2 are included in the EUTRA_CI. More precisely, the UE 10 provides an indication that a policy is effective in a group of LTE base station apparatuses, which are indicated by the TAC 1 and the TAC 2 for LTE, an LTE base station apparatus which is indicated by the EUTRA_CI 1, and an LTE base station apparatus which is indicated by the EUTRA_CI 2.

Furthermore, an HESSID 1 and an HESSID 2 are included in the HESSID. Furthermore, a BSSID 1 and a BSSID 2 are included in BSSID. Additionally, the SSID 1 and the SSID 2 are included in the SSID. More precisely, the UE 10 indicates that a policy is effective in a group of WLAN which is indicated by the HESSID 1 for WLAN and WLAN which is indicated by the HESSID 2, in WLAN which is indicated by the BSSID 1 and WLAN that is indicated by the BSSID 2, and in WLAN which is indicated by the SSID 1 and WLAN that is indicated by the SSID 2.

Furthermore, these pieces of information may be pieces of information that indicate facilities, such as an airport.

The availability and unavailability of the roaming is information indicating that the policy is a policy which is effective at the roaming destination. In the case of a policy that is not effective in the roaming destination, the policy can apply only to a network of the home mobile operator with which the UE has a contract.

Furthermore, the Home PLMN ID may be included as an identifier of the home mobile operator with which the UE has a contract.

Furthermore, the time-in-point information indicates a start date and time where a policy is effective and a stop date and time where a policy is ineffective. Moreover, the time-in-point information can indicate only the start data and time where the policy is effective, and can indicate being effective after the start data and time. Furthermore, the time-in-point information can indicate only the stop data and time where the policy is ineffective, and can indicate being ineffective after the stop data and time.

Furthermore, information for the UE 10 to determine switching depending on a state of reception between the UE 10 itself and the LTE base station apparatus is included in the threshold 1. For example, Reference Signal Received Power (RSRP), Reference Signal Received Quality (RSRQ), a Basic Service Set (BSS) load 1, and a WLAN Downlink (DL) and Uplink (UL) backhaul data rate 1 are included in the threshold 1. The RSRP indicates a reference for received power of a signal that is received from the LTE access system. Moreover, the UE 10 can make a determination in such a manner that in the case of the received power that is higher than the RSRP, a connection to the LTE access network is made and that in the case of the received power that is lower than the RSRP, a connection to the WLAN access network is made.

Furthermore, the BSS load 1 is information indicating a situation of congestion over the WLAN access network. A maximum value of the situation of congestion is configured for a BSS load, and as long as the situation of congestion is not worst, a connection can be made. Furthermore, a WALN DL and UL backhaul data rate 1 is information indicating a data rate that is available.

The OPI 1 is a threshold for determining that the ANDSF policy or the RAN policy is executed. For example, in a case where the OPI 1 that is included in the ANDSF policy and an OPI 2 that is included in the RAN policy are compared and as a result, the OPI 1 is greater, it may be determined that the ANDSF policy is executed. At this point, the determination that the ANDSF policy is executed in a case where a value of the OPI 1 is greater than a value of the OPI 2 is described as being made, but it may be determined that the ANDSF policy is executed in a case where the value of the OPI 1 is smaller than the value of the OPI 2. Furthermore, the OPI 1 may be information that differs for class that is identified with a contract with the user. For example, according to the contract with the home mobile operator, for management, the user may perform classification into gold class, silver class, and bronze class, and may manage the OPI 1 that differs from class to class. Accordingly, although the value of the OPI 2 that is notified with a RAN policy 4542 is the same among all the UEs, a user who belongs to the gold class is urged to transmit and receive data through LTE, and a user who belongs to the bronze class can be urged to transmit and receive data through WLAN.

Next, an example of each information element of the type 2 is described referring to the example in FIG. 5(*b*). Included in the type 2 are at least one or several pieces of information elements, among the rule priority, the access that takes precedence, the effective area, the availability and unavailability of the roaming, the PLMN ID, the time-in-point information, the threshold 1, and the OPI 1.

Meanings or contents of each of the information elements, that is, the rule priority, the access that takes precedence, the effective area, the availability and unavailability of the roaming, the PLMN ID, the timer information, the threshold 1 and the OPI 1 may be the same as those which are described referring to FIG. 5(*a*). For this reason, detailed descriptions thereof are omitted.

Furthermore, identification information indicating that the information is information relating to the use of the communication path whose target is a specific communication, such as a specific flow that is executed by the UE 10 or a communication that corresponds to an application, is included in the type 2. Additionally, the identification information may be used as identification information indicating switching between two communication paths that are established by the UE 10 for a specific communication based on a single APN. At this point, the two communication paths that are established based on a single APN may be the communication path that is established through the LTE access network which is established based on the APN 1, and the communication path that is established through the WLAN access network which is established based on the APN 1.

Furthermore, the identification information may be information indicating the ISRP, may be identification information that results from combining the ISRP and information for identifying a specific communication, and may be replaced with other pieces of identification information for the purpose of alternative use.

Furthermore, the information for identifying a specific communication is included in the ANDSF policy. The specific communication may be an IP flow, and the IP flow may be specified by at least one or several pieces of information, among an application ID, an address type, a transmission source IP address, a destination IP address, a protocol type, a transmission source port number, a destination port number, QoS, a domain name, and an APN. The UE 10 may store these pieces of information for identifying a specific communication, in the state of being included in the ANDSF policy. The application ID may be information for identifying an Operating System (OS) as an Operating System Identification (OSId). Furthermore, the application ID may be application ID that corresponds to every OS.

The address type includes information indicating a version of an IP address. Pieces of information indicating the version of an IP address include an IPv4 address and an IPv6 address.

The transmission source IP address indicates an IP address of the UE 10. Furthermore, when it comes to the transmission source IP address, the indication of the first transmission source IP address and the last transmission source IP address may be the indication of a range of the transmission source IP address.

The destination IP address indicates an IP address of the UE 10 that is a data transmission destination. Moreover, when it comes to the destination IP address, the indication of the first destination IP address and the last destination IP address may be the indication of a range of the destination source IP address.

The protocol type is a protocol number that is defined by the Internet Assigned Numbers Authority (IANA). For example, the protocol type includes an identifier for identifying a Transmission Control Protocol (TCP), a User Datagram Protocol (UDP) or the like.

The transmission source port number indicates a port number of the UE 10. Moreover, the port number is a number for identifying a program that is used for the UE 10 to transmit and receive data. The destination port number is a port number of the communication counterpart of the UE 10.

The Quality of Service (QoS) includes information communication quality. The domain name includes information a Fully Qualified Domain Name (FQDN). The FQDN is a string of characters (for example, www.example.com or the like) that is used for solving the destination IP address.

The Access Point Name (APN) is identification information indicating a connection destination that is indispensable for a connection to the network of the home mobile operator. The UE 10 stores the APN and a specific communication in a state of being associated with each other, and may identify a specific communication with the APN as the identification information. Moreover, the UE 10 is able to make a connection to a network using multiple APNs, and may store a communication that differs from one APN to another, in a state of being associated with the APN.

Moreover, the UE 10 may store multiple policies. Additionally, specific communications that are stored in each policy may be different communications. More precisely, a policy that differs according to an IP flow, application, or the like may apply.

Next, an example of each information element of the type 3 is described referring to the example in FIG. 5(*c*). Included in the type 3 are at least one or several pieces of information elements among the rule priority, the access that takes precedence, the effective area, the availability and unavailability of the roaming, the PLMN ID, the time-in-point information, the threshold 1, and the OPI 1.

Meanings or contents of each of the information elements, that is, the rule priority, the access that takes precedence, the effective area, the availability and unavailability of the roaming, the PLMN ID, the timer information, the threshold 1 and the OPI 1 may be the same as those which are described referring to FIG. 5(*a*). For this reason, detailed descriptions thereof are omitted.

Furthermore, identification information indicating that the information is information relating to the use of a communication path whose target is a specific communication, such as a communication that is associated with an APN, which is performed by the UE 10, or a communication that is associated with a service is included in the type 3. Additionally, the identification information may be used as identification information indicating the switching between two communication paths that are established by the UE 10 for a specific communication based on a single APN. At this point, the two communication paths that are established based on a single APN may be the communication path that is established through the LTE access network which is established based on the APN 1, and the communication path that is established through the WLAN access network which is established based on the APN 1.

Furthermore, the identification information may be information indicating the ISRP, may be identification information that results from combining the ISRP and the information for identifying a specific communication, and may be replaced with other pieces of identification information for the purpose of alternative use.

Furthermore, the information for identifying a specific communication is included in the ANDSF policy. The specific communication may be a communication that is associated with an APN or a communication that is associated with a specific service. These specific communications may be identified with the APN. Furthermore, the specific communications may be identified with a service ID or a service name. The UE 10 may store these pieces of information for identifying a specific communication, in the state of being included in the ANDSF policy. An APN may be the same as that which is described referring to FIG. 5(*b*), and thus a detailed description thereof is omitted.

Moreover, the UE 10 may store multiple policies. Additionally, specific communications that are stored in each policy may be different communications. More precisely, in a case where the UE 10 makes a connection to a network using multiple APNs, the UE 10 may apply different policies to communications that are associated with the APNs, respectively.

Next, an example of each information element of the type 4 is described referring to the example in FIG. 5(*d*). Included in the type 4 are at least one or several pieces of information elements, among the rule priority, the access that takes precedence, the effective area, the availability and unavailability of the roaming, the PLMN ID, the time-in-point information, the threshold 1, and the OPI 1.

Meanings or contents of each of the information elements, that is, the rule priority, the access that takes precedence, the effective area, the availability and unavailability of the roaming, the PLMN ID, the timer information, the threshold 1 and the OPI 1 may be the same as those which are described referring to FIG. 5(*a*). For this reason, detailed descriptions thereof are omitted.

Furthermore, the identification information indicating that the information is information relating to the use of the communication path whose target is a specific communication, such as a specific flow that is executed by the UE 10 or a communication that corresponds to an application, is included in the type 4. Additionally, the identification information may be used as identification information indicating the switching between two communication paths that are established by the UE 10 for a specific communication based on different APNs. At this point, the two communication paths that are established based on different APNs may be the communication path that is established through the LTE access network which is established based on the APN 1, and a communication path that is established through the WLAN access network which is established based on the APN 2.

Furthermore, the identification information may be information indicating the IARP, may be identification information that results from combining the IARP and the information for identifying a specific communication, may be information on an APN of a switching destination, or the like, and may be replaced with other pieces of identification information for the purpose of alternative use.

Furthermore, the information for identifying a specific communication is included in the ANDSF policy. The specific communication may be an IP flow, and the IP flow may be specified by at least one or several pieces of information, among the application ID, the address type, the transmission source IP address, the destination IP address, the protocol type, the transmission source port number, the destination port number, the QoS, the domain name, and the APN.

Because each element of the pieces of information for identifying these specific communications may be the same as that which is described referring to FIG. 5(*b*), a detailed description thereof is omitted.

At this point, a routing rule may include an APN and APN priority. Because an APN is described referring to FIG. 5(*b*), a detailed description thereof is omitted. IN a case where multiple APNs are included, the APN priority indicates a priority level of an APN for a preferential connection, or an APN that is used for transmitting and receiving data.

Moreover, the UE 10 may store multiple policies. Additionally, specific communications that are stored in each policy may be different communications. More precisely, in the case where the UE 10 makes a connection to a network using multiple APNs, the UE 10 may apply different policies to communications that are associated with the APNs, respectively.

At this point, each information element of the type 1 to the type 4, which is described so far, as described above, may be information that is configured in advance, by the user or the terminal, for the UE 10. Alternatively, the information element may be information that is determined by an operator policy, is received from the ANDSF which is operated by the home operator, and, after the UE 10 determines that the UE policy 142 is updated, is renewed.

Furthermore, for the threshold that is a condition for switching the communication path, or the information element, such as an OPI, which is described with regard to the type 1 to the type 4, as described so far, a value that varies from one policy to another may be stored, and may be stored as an information element that is common to two or more policies. For example, the same threshold and OPI may be stored for all policies. At that time, the same threshold and OPI may be stored independently of each policy.

On the other hand, the RAN policy is information that is received from the LTE access network, and includes a condition for a connection to an access network, such as LTE or WLAN, and the like. Information for identifying a communication path, and information that is a condition for performing switching to the communication path may be stored in the RAN policy. For example, as in the example of the RAN policy in FIG. 4(*a*-2), access network information may be stored as information for identifying a communication path, and at least one of a threshold 2 and the OPI 2 may be stored as information that is a condition for performing the switching to the communication path. The access network information includes information for identifying an access network, and for example, includes information for identifying LTE or WLAN.

The information for identifying the communication is not limited to the access network information, and may be identification information for identifying a communication path. For example, the information for identifying the communication path may be an ID of the PDN connection, a bearer ID, an APN, or the like.

Furthermore, information for the UE 10 to determine the switching depending on the state of reception between the UE 10 itself and the LTE base station apparatus may be included in the threshold 2, and for example, RSRP 2 or RSRQ 2 is included in the threshold 2. The OPI 2 is a value for determining that the ANDSF policy or the RAN policy is executed. By comparing the OPI 2 and the OPI 1, the UE 10 may determine that the RAN policy, not the ANDSF policy, is executed. Furthermore, by comparing the OPI 2 and the OPI 1, the UE 10 may determine that the ANDSF policy, not the RAN policy, is executed.

Furthermore, the OPI 2 may be information that differs for class that is identified with the contract with the user. For example, according to the contract with the home mobile operator, for management, the user may perform classification into gold class, silver class, and bronze class, and may manage the OPI 2 that differs from class to class. Accordingly, a user who belongs to the gold class is urged to transmit and receive data through LTE, and a user who belongs to the bronze class can be urged to transmit and receive data through WLAN.

Furthermore, for each element that is retained in the RAN policy, in a case where the same information element is stored in the ANDSF policy, each of the ANDSF policy and the RAN policy may be stored, any one may be selected and stored based on a UE policy, such as a terminal configuration or a user configuration, and the other one may be deleted.

For example, in a case where each of the ANDSF policy and the RAN policy is stored, a value of the ANDSF policy may be used as a default value, and in a case where the RAN policy is stored, the RAN policy may be preferentially used, and so on.

Alternatively, in a case where any one of the ANDSF policy and the RAN policy is stored, the value of the ANDSF policy may be used as a default value. When the RAN policy is stored, the ANDSF policy may be deleted, and thus the RAN policy may be used, and so on. More precisely, with the information elements of the RAN policy, the UE 10 may renew one or several of the information elements of the ANDSF.

Furthermore, in a case where the information element of the ANDSF, which is not present, as an information element, in the RAN policy, the UE 10 may make a determination as to the use of the communication path, such as the switching of the communication path, using both of the information element of the RAN policy and the information element of the ANDSF, which is not present, as an information element, in the RAN policy.

Furthermore, among the approval information 1 to the approval information 5, the UE 10 may store at least one or several pieces of approval information, in a state of being associated with every policy. Additionally, the UE 10 may store the approval information that differs from one policy to another. For example, in a case where two ANDSF policies are stored, for the first policy, the approval information 1 may be stored as being approved, and for the second policy, the approval information 1 may be stored as being approved. In this manner, the UE 10 may store the approval information that differs from one policy to another, and may renew contents of each information element of every policy based on these pieces of approval information.

[1.2.2 Constitution of the ANDSF]

Figure 6:
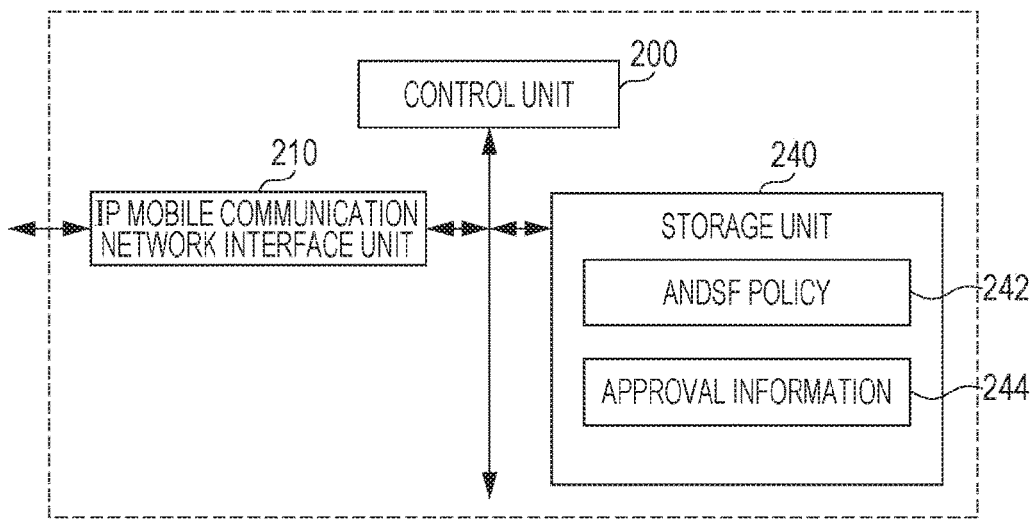
FIG. 6 is a diagram for describing a functional constitution of an ANDSF according to the first embodiment.

Subsequently, a constitution of the ANDSF 20 according to the present embodiment is illustrated in FIG. 6(*a*). In the ANDSF 20, an IP mobile communication network interface unit 210 and a storage unit 240 are connected to a control unit 200 through a bus.

The control unit 200 is a functional unit for controlling the ANDSF 20. The control unit 200 realizes various processing operations by reading and executing various programs that are stored in the storage unit 240.

The IP mobile communication network interface unit 210 is a functional unit that is indispensable for the ANDSF 20 to make a connection to the IP mobile communication network 5A.

The storage unit 240 is a functional unit in which programs, pieces of data, and the like that are indispensable for various operations by the ANDSF 20 are stored. Additionally, an ANDSF policy 242 and approval information 244 are stored in the storage unit 240.

In FIG. 6(*b*), multiple ANDSF policies 242 may be stored as illustrated in an example of the ANDSF policy 242. In the same manner as for the ANDSF policy that is retained by the UE 10, for the ANDSF policy, categorization into 4 types, that is, the type 1 to the type 4 can take place.

Meaning of each type and information elements of the ANDSF of each type may be the same as those the ANDSF policy that is retained by the UE 10, which are described referring to FIG. 5. For this reason, a detailed description of the type of each ANDSF policy, and a detailed description of each information element are omitted.

Furthermore, the ANDSF policy in the ANDSF may be created or updated according to the operator policy. More specifically, the contents of each element of the ANDSF may be created or updated by an administrator for the home operator who operates the ANDSF. Furthermore, the creating or updating by the operator may be performed for every policy, and only a specific information element may be renewed.

Furthermore, the ANDSF 20 may store multiple pieces of approval information in the approval information 244.

The approval information 1 may be information for approving the performing of the control that uses the ANDSF policy that is received from the home mobile operator with which the UE 10 has a contract. For example, the approval information 1 may be information for approving the updating of the UE policy 142 by the UE 10 based on the information in the received ANDSF policy. Furthermore, the approval information 1 may be information for approving the switching of the communication path by the UE 10 based on the received ANDSF policy. At this point, the home mobile operator with which the UE 10 has a contract may be a network that is identified as a Home-Public Land Mobile Network (H-PLMN).

Additionally, the approval information 1 may be stored in the state of being associated with the information for identifying the home mobile operator, such as the PLMN ID, and may be notified to the UE 10 in a state of being associated with the approval information 1 and the information for identifying the home mobile operator.

Moreover, the approval information 1 may be determined based on the operator policy. For example, the approval information 1 may be configured or renewed by an operator of an Operator Network.

When the UE 10 makes a connection to the Home Operator Network with which the UE 10 has a contract, the UE 10 receives the RAN policy from the base station to which the UE 10 makes a connection. In this case, the approval information 2 may be information for approving the performing of the control that uses the received RAN policy. For example, the approval information 2 may be information for approving the updating of the UE policy 142 based on the information in the received RAN policy. Furthermore, the approval information 2 may be information for approving the switching of the communication path based on the received RAN policy.

Moreover, the approval information 2 may be determined based on the operator policy. For example, the approval information 2 may be configured or renewed by the operator of the Operator Network.

At this point, the approval information 2 may be stored in the state of being associated with the information for identifying the home mobile operator, such as the PLMN ID, and may be notified to the UE 10 in a state of being associated with the approval information 2 and the information for identifying the home mobile operator. Accordingly, the ANDSF 20 stores the PLMN for identifying the H-PLMN and the approval information 2 in a state of being associated with each other, and thus notifies the UE 10 that the RAN policy which is transmitted by the base station that makes a connection to the H-PLMN can be used.

At this point, the ANDSF 20 may store the approval information 2 in a state of being associated with the ANDSF policy. Additionally, the ANDSF 20 may store the approval information 2 that differs from one ANDSF policy to another. For example, for the ANDSF policy 1, the approval information 2 may be stored as being approved, and for the ANDSF policy 2, the approval information 2 may be stored as being disapproved.

In the case where the UE 10 receives the ANDSF policy that is to be received from the home mobile operator (Visited Mobile Operator) that is a roaming destination, which is different from the home mobile operator with which the UE 10 has a contract, the approval information 3 may be information for approving the performing of the control that uses the ANDSF policy that is received by the UE 10. For example, the approval information 3 may be information for approving the updating of the UE policy 142 by the UE 10 based on the information in the received ANDSF policy. Furthermore, the approval information 3 may be information for approving the switching of the communication path by the UE 10 based on the received ANDSF policy.

At this point, the home mobile operator that is the roaming destination may be a home mobile operator that who has a contractual relationship with the home mobile operator with which the UE 10 has a contract. Additionally, the home mobile operator that is the roaming destination may be the home mobile operator to which the UE 10 makes a connection at the time of roaming. Furthermore, the home mobile operator may be a network that is identified as the Visited-Public Land Mobile Network (V-PLMN).

Moreover, the approval information 3 may be determined based on the operator policy. For example, the approval information 3 may be configured or renewed by the operator of the Operator Network.

At this point, the approval information 3 may be stored in a state of being associated with the information for identifying the home mobile operator such as the PLMN ID. Additionally, the approval information 3 and the information for identifying the home mobile operator may be notified to the UE 10 in a state of being associated with each other. Accordingly, information on whether or not it is possible to use the ANSDF that is transmitted by the ANDSF of a specific V-PLMN is stored for the UE 10, and this information can be notified to the UE 10.

When the UE 10 makes a connection to the Home Operator Network (the Visited Operator Network) that is a roaming destination, the UE 10 receives the RAN policy from the base station to which the UE 10 makes a connection. In this case, the approval information 4 may be information for approving the control that uses the received RAN policy. For example, the approval information 4 may be information for approving the updating of the UE policy 142 based on the information in the received RAN policy. Furthermore, the approval information 4 may be information for approving the switching of the communication path based on the received RAN policy.

Moreover, the approval information 4 may be determined based on the operator policy. For example, the approval information 4 may be configured or renewed by the operator of the Operator Network.

At this point, the approval information 4 may be stored in the state of being associated with the information for identifying the home mobile operator, such as the PLMN ID, and may be notified to the UE 10 in the state of being associated with the approval information 4 and the information for identifying the home mobile operator. Accordingly, the ANDSF 20 stores a PLMN for identifying a specific V-PLMN and the approval information 4 in a state of being associated with each other, and thus notifies the UE 10 that the RAN policy which is transmitted by the base station that makes a connection to a specific V-PLMN can be used.

Furthermore, the ANDSF 20 may store the approval information 4 in the state of being associated with the ANDSF policy. Additionally, the ANDSF 20 may store the approval information 4 that differs from one ANDSF policy to another. For example, for the ANDSF policy 1, the approval information 4 may be stored as being approved, and for the ANDSF policy 2, the approval information 4 may be stored as being disapproved.

In the case where the UE 10 receives the approval information 4 that is transmitted by the home mobile operator (the Visited Mobile Operator) which is a roaming destination, the approval information 5 may be information for approving the performing of the control that uses the approval information 4. Alternatively, the approval information 5 may be information for approving the control that uses the fact that the RAN policy is used, based on the approval information 4 that is transmitted by the home operator (the Visited Mobile Operator) that is a roaming destination.

Moreover, the approval information 5 may be determined based on the operator policy. For example, the approval information 5 may be configured or renewed by the operator of the Operator Network.

At this point, the approval information 5 may be stored in the state of being associated with the information for identifying the home mobile operator, such as the PLMN ID, and may be notified to the UE 10 in the state of being associated with the approval information 2 and the information for identifying the home mobile operator. Accordingly, the ANDSF 20 stores the PLMN for identifying a specific V-PLMN and the approval information 5 in a state of being associated with each other, and thus notifies the UE 10 whether or not control can be performed based on the approval information 4 which is transmitted by the ANDSF 2 of a specific V-PLMN.

Furthermore, the ANDSF 20 may store the approval information 5 in the state of being associated with the ANDSF policy. Additionally, the ANDSF 20 may store the approval information 5 that differs from one ANDSF policy to another. For example, for the ANDSF policy 1, the approval information 5 may be stored as being approved, and for the ANDSF policy 2, the approval information 5 may be stored as being disapproved.

The ANDSF 20 does not necessarily need to store all pieces of approval information, that is, the approval information 1 to the approval information 5, which are described above, and may store some pieces of approval information. Furthermore, the approval information 1 to the approval information 5 are described as being different pieces of approval information, but one or several pieces of approval information, or all pieces of approval information may be stored as one piece of approval information that has the same meaning as each piece of approval information. For example, the approval information 1 and the approval information 2 may be stored as one piece of approval information, and the approval information 3, the approval information 4, and the approval information 5 may be stored as one piece of approval information.

Furthermore, the ANDSF that is operated in the H-PLMN of the Operator Network with which the UE 10 has a contract may store at least one or several pieces of approval information, among the approval information 1 to the approval information 5.

Furthermore, the ANDSF that is operated in the V-PLMN of the Home Operator Network that is a roaming destination may store at least one piece of approval information, among the approval information 3 and the approval information 4.

[1.2.3 Example of a Constitution of the eNB]

Figure 7:
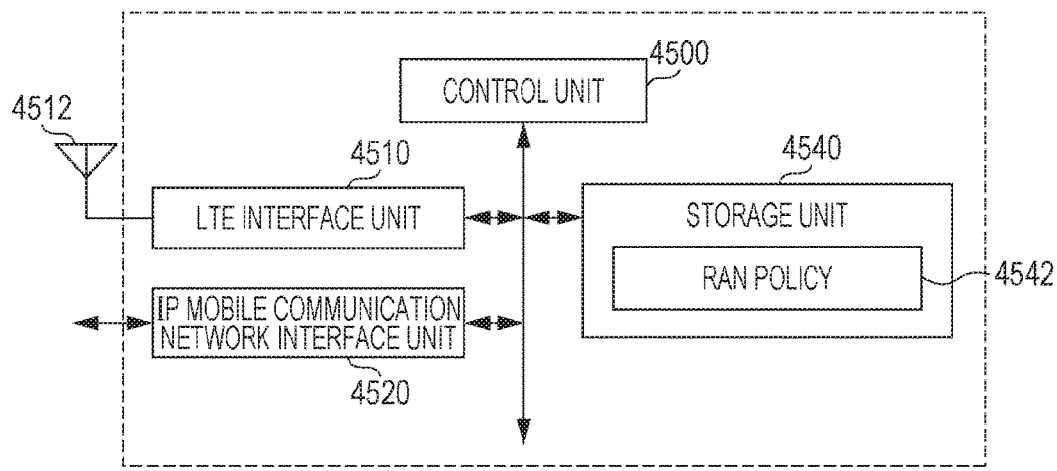
FIG. 7 is a diagram for describing a functional constitution of an eNB according to the first embodiment.

FIG. 7(*a*) illustrates an example of a constitution of the eNB 45. In the eNB 45, an LTE interface unit 4510, an IP mobile communication network interface unit 4520, and a storage unit 4540 are connected to a control unit 4500 through a bus.

The control unit 4500 is a functional unit for controlling the eNB 45. The control unit 4500 realizes various processing operations by reading and executing various programs that are stored in the storage unit 4540.

The LTE interface unit 4510 is a functional unit that transmits data which is transmitted by the eNB 45 from the IP mobile communication network 5A, to the UE 10, and that transfers data which is transmitted from the UE 10, to the IP mobile communication network 5A. Furthermore, an external antenna 4512 is connected to the LTE interface unit 4510.

The IP mobile communication network interface unit 4520 is a functional unit that is indispensable for the eNB 45 to make a connection to the IP mobile communication network 5A.

The storage unit 4540 is a functional unit in which programs or pieces of data that are indispensable for various operations by the eNB 45 are stored. Additionally, the RAN policy 4542 is stored in the storage unit 4540.

FIG. 7(*b*) illustrates an example of the RAN policy 4542. In FIG. 7(*b*), the access network information and the threshold 2, or the OPI 2 are included. The access network information includes information for identifying an access network, and for example, includes information for identifying LTE or WLAN. Furthermore, the information for the UE 10 to determine the switching depending on the state of reception between the UE 10 itself and the LTE base station apparatus may be included in the threshold 2, and for example, the RSRP 2 or the RSRQ 2, a BSS load element 2, and a WLAN DL and UL backhaul data rate 2 are included in the threshold 2. The OPI 2 is a value for determining that the ANDSF policy or the RAN policy is executed.

Moreover, the OPI 1 and the OPI 2 may be compared, and any one of the threshold 1 that is included in the ANDSF policy 242 and the threshold 2 that is included in the RAN policy 4542 may be preferentially used as information for a threshold and may be used for determining switching of an access network.

[1.2.4 Example of a Constitution of the MME]

Subsequently, a constitution of the MME 40 according to the present embodiment is illustrated in FIG. 6(*a*). In the MME 40, an IP mobile communication network interface unit 420 and a storage unit 440 are connected to a control unit 400 through a bus.

The control unit 400 is a functional unit for controlling the MME 40. The control unit 400 realizes various processing operations by reading and executing various programs that are stored in the storage unit 440.

The IP mobile communication network interface unit 420 is a functional unit that is indispensable for the MME 40 to make a connection to the IP mobile communication network 5A.

The storage unit 440 is a functional unit in which programs, pieces of data, and the like that are indispensable for various operations by the MME 40 are stored. Additionally, an approval information 442 is stored in the storage unit 440.

Figure 8:
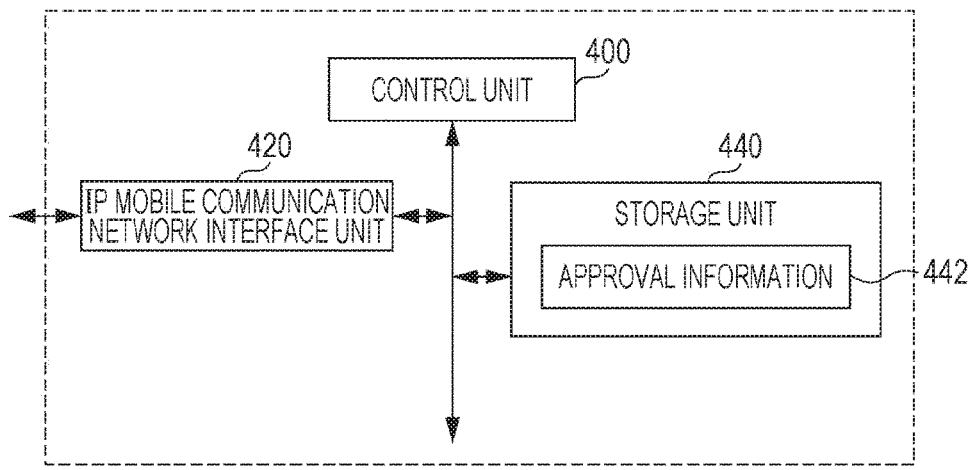
FIG. 8 is a diagram for describing a functional constitution of an MME according to the first embodiment.

FIG. 8(*b*) illustrates an example of the approval information 442. In the network (H-PLMN) of the home mobile operator with which a user of the UE 10 has a contract, the approval information 1 is approval information for approving the switching of the access network, using the ANDSF policy and the RAN policy that are included in the UE policy 142. Moreover, the approval information 1 may be information for receiving the ANDSF policy 242 that is transmitted from the ANDSF 20 of the H-PLMN and rewriting the received ANDSF policy 242 to the UE policy 142. Additionally, the approval information 1 may be information for receiving the RAN policy that is transmitted from the eNB 45 of the H-PLMN and rewriting the received RAN policy to the UE policy 142.

On the other hand, in the network (V-PLMN) of the home mobile operator that is a destination where the user of the UE 10 roams, the approval information 2 is approval information for approving the switching of the access network, using the ANDSF policy and the RAN policy that are included in the UE policy 142. Moreover, the approval information 2 may be information for receiving the ANDSF policy 242 that is transmitted from the ANDSF 20 of the V-PLMN and rewriting the received ANDSF policy 242 to the UE policy 142. Additionally, the approval information 2 may be information for receiving the RAN policy that is transmitted from the eNB 45 of the V-PLMN and rewriting the received RAN policy to the UE policy 142.

Furthermore, the approval information 2 may be information for receiving the ANDSF policy 242 that is transmitted from the ANDSF 20 of the H-PLMN and rewriting the received ANDSF policy 242 to the UE policy 142.

Moreover, because the PGW 30, the SGW 35, the HSS 50, the AAA 55, the PCRF 60, the ePDG 65, and the WLAN 70a, the WLAN 70b have the same constitutions as those of the apparatuses in the related art in the mobile communication system that uses the EPS, detailed descriptions thereof are omitted.

[1.3 Processing Description]

According to the present embodiment, a procedure in which the UE 10 switches a communication path using the UE policy 142 is described.

[1.3.1 Control Procedure in which a Policy of the Type 2 is Used]

The present example, that is, an example in which the UE 10 switches a communication path using the ANDSF policy and the RAN policy of the type 2, which are illustrated in a second example of the policy in FIG. 5(*b*), is described.

First, an LTE attachment procedure, a WLAN_ANa attachment procedure, a WLAN_ANb attachment procedure, and an attachment procedure in which a DSMIP is used, all of which lead to an initial state of the UE 10 where a control procedure in which the policy according to the present embodiment is used is executed, are described.

[1.3.1.1 LTE Attachment Procedure]

Figure 11:
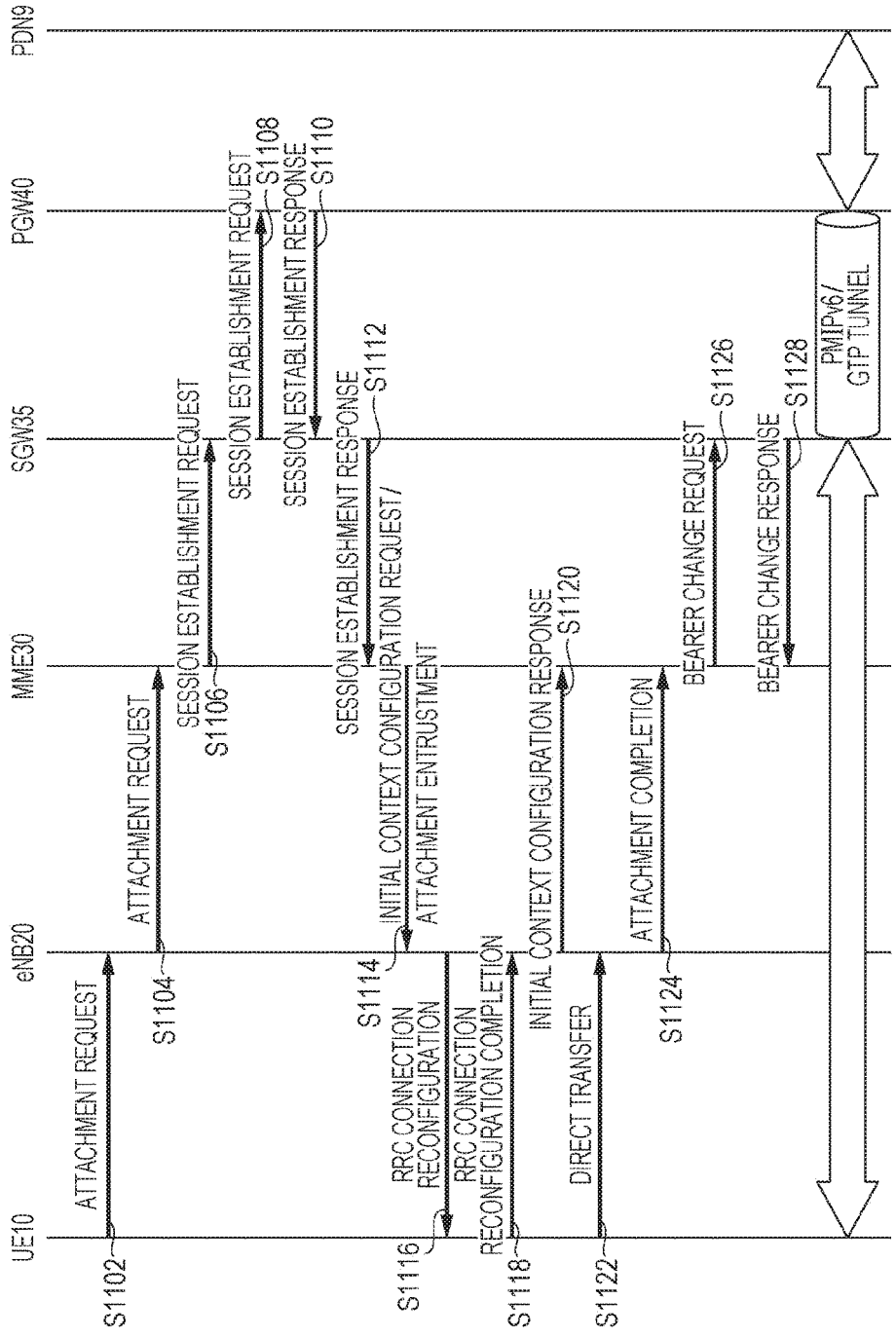
FIG. 11 is a diagram for describing a procedure for establishing a communication path through LTE in the UE according to the first embodiment.

The LTE attachment procedure in which the UE 10 establishes a communication path through an LTE access system (LTE_AN 80) is described referring to FIG. 11. The UE 10 executes the LTE attachment procedure, makes a connection to the core network 7, and establishes a communication path through LTE.

An attachment procedure will be described in detail below referring to FIG. 11.

The UE 10 transmits an attachment request to the eNB 45, and starts the attachment procedure (S1102). The attachment procedure may be executed as an initial procedure, such as when the UE 10 is powered on by the user.

Furthermore, the UE 10 may transmit identification information for identifying the UE 10, and the APN, in a state of being included in an attachment request message.

With the APN, the UE 10 can specify the PDN 9 that is a connection destination. In other words, by transmitting the APN, the UE 10 may designate the PDN that is a connection destination. Furthermore, with the APN, a PGW 40 may be designated.

Furthermore, with transmission of the attachment request, the UE 10 may request a connection to a core network 9. Furthermore, with the transmission of the attachment request the UE 10 may request establishment of a communication path to a PGW 9. Furthermore, with the transmission of the attachment request, the UE 10 may request an IP address of the UE 10, which is used for a communication that uses the established communication path. Furthermore, with the transmission of the attachment request, the UE 10 may request establishment of a PDN connection between the UE 10 itself and the PGW.

The eNB 45 receives the attachment request from the UE 10. Additionally, an APN and UE identification information that are included in the attachment request message may be received. Additionally, the eNB 45 transmits the attachment request to an MME 30 (S1104).

The MME 30 receives the attachment request that is transmitted by the eNB 45. the MME 30 may receive the UE identification information and the APN that are included in the attachment request.

Alternatively, the MME 30 does not necessarily need to receive the APN, based on the attachment request message. During a period of time from when the UE 10 transmits the attachment request message and the attachment procedure is started to when the communication path is established and the attachment procedure is completed, within the attachment procedure, the UE 10 may transmit the APN in a state of being included in control information that is transmitted by the UE 10 to the MME 30. Accordingly, the MME 30 may receive the APN.

Based on the received APN, the MME 30 determines the SGW 35 and the PGW 40. Accordingly, a gateway that is a relay apparatus on the communication path between the UE 10 and the PDN 9 is determined.

The MME 30 transmits a session establishment request to the SGW 35 (S1106). The MME 30 may transmit the UE identification information and information for identifying the PGW 40, in a state of being included in the session establishment request. Moreover, with the transmission of the session establishment request, the MME 30 may request establishment of a PDN connection between the UE 10 and the PGW 40.

The SGW 35 receives the session establishment request from the MME 30. the SGW 35 may receive the UE identification information and the PGW identification information that are included in the session establishment request.

Additionally, the SGWE 35 transmits the session establishment request to the PGW 40 (S1108). The SGW 35 may transmit the UE identification information and the information for identifying the PGW 40, in the state of being included in the session establishment request. Moreover, with the transmission of the session establishment request, the SGW 35 may request the establishment of the PDN connection between the UE 10 and the PGW 40.

The PGW 40 receives the session establishment request that is transmitted by the SGW 35. The PGW 40 may receive the UE identification information that is included in the session establishment request.

Based on the reception of the session establishment request, the PGW 40 may allocate an IP address to the UE 10.

The PGW 40 transmits a session establishment response message, as a response message to the session establishment request, to the SGW 35 (S1110). The PGW 40 may transmit the UE identification information and the IP address that is allocated to the UE, in a state of being included in the session establishment response message.

Next, the SGW 35 receives the session establishment response message that is transmitted by the PGW 40. With a session establishment response, the SGW may receive the UE identification information and the IP address that is allocated to the UE.

At this point, with the transmission of the session establishment request and the session establishment response, the SGW 35 and the PGW 40 may establish a communication path along which user data of the UE 10 is delivered between the SGW 35 and the PGW 40. Moreover, the communication path may be a GTP tunnel that is established with a GTP protocol. Alternatively, the communication path may be a PMIP tunnel that is established with a PMIP protocol.

Furthermore, with the operator policy, it may be determined whether the GTP tunnel is established or the PMIP tunnel is established. Furthermore, with the session establishment request that is transmitted by the SGW 35, it may be identified whether the GTP tunnel is established or the PMIP tunnel is established. More specifically, in a case where the PMIP tunnel is established, the SGW 35 may transmit a binding request message that is based on the PMIP protocol, as the session establishment request message. Furthermore, the PGW 40 may transmit a binding response message that is based on the PMIP protocol, as the session establishment response message. In this manner, the SGW 35 and the PGW 40 may determine whether the GTP tunnel is established or the PMIP tunnel is established, depending on whether a session request message and a session response message are based on the GTP protocol or based on the PMIP protocol.

Furthermore, following the establishment of the communication path, the PGW 40 establishes connectivity to the PDN 9 together as well. Next, an SGW 30 transmits the session establishment response message to the MME 30 (S1112), as a response to the session establishment request that is received from the MME 30. The PGW 40 may transmit the UE identification information and the IP address that is allocated to the UE, in the state of being included in the session establishment response message.

Next, the MME 30 receives the session establishment response message that is transmitted by the SGW 35 (S1112). Additionally, the MME 30 may receive the UE identification information and the IP address that is allocated to the UE, which are included in the session establishment response message.

The MME 30 transmits an attachment entrustment message, as a response message to the attachment request message that is transmitted by the eNB 45, to the eNB 45 (S1114). The UE identification information, the IP address that is allocated to the UE, and information for identifying the APN for a connection, may be transmitted in a state of being included in the attachment entrustment message.

At this point, the IP address that is allocated to the UE may be an IP address that is allocated by the PGW 40, and may be an IP address that is allocated by the MME 30.

Furthermore, the attachment entrustment message may be transmitted in a state of being included in an initial context configuration request message. Additionally, among the UE identification information, the IP address that is allocated to the UE, and the information for identifying the APN for the connection, at least one or two pieces of information may be transmitted as information elements of the initial context configuration request message.

Next, the eNB 45 receives the attachment entrustment message. The eNB may receive the UE identification information, the IP address that is allocated to the UE, and the information for identifying the APN for the connection, which are included in the attachment entrustment message.

Furthermore, the eNB 45 may receive the initial context configuration request message in which the attachment entrustment message is included. Additionally, among the UE identification information, the IP address that is allocated to the UE, and the information for identifying the APN for the connection, at least one or two pieces of information may be received as information elements of the initial context configuration request message.

Based on this reception, the eNB 45 may allocate a resource for a wireless communication path that is established between the eNB 45 itself and the UE 10.

Additionally, the eNB 45 may transmit an RRC connection reconfiguration message, as a response to the attachment request that is transmitted by the UE 10, to the UE 10 (S1116). The UE identification information, the IP address that is allocated to the UE, the information for identifying the APN for the connection, information relating to the resource, and the like may be transmitted in state of being included in the RRC connection reconfiguration message.

The UE 10 receives the RRC connection reconfiguration message. The UE 10 may receive the UE identification information, the IP address that is allocated to the UE, the information for identifying the APN for the connection, and the information relating to the resource, which are included in the RRC connection reconfiguration message.

Accordingly, the UE 10 may detect that the connectivity to the APN is established. Additionally, the UE 10 may detect that a communication path for performing a communication which corresponds to the APN is established. Furthermore, the UE 10 may acquire an IP address that is used for communication that uses a communication path for performing the communication which corresponds to the APN.

Next, the UE 10 transmits an RRC connection reconfiguration completion message to the eNB 45 (S1118). Additionally, a direct transfer message is transmitted to the eNB 45 (S1122).

Following the reception of the RRC connection reconfiguration completion message, the eNB 45 transmits an initial context configuration response message to the MME 30 (S1120). Furthermore, following the reception of the direct transfer message, the eNB 45 transmits an attachment complement message to the MME 30 (S1124).

Following the reception of the attachment completion message, the MME 30 may transmit a bearer change request to the SGW 35 (S1126).

Additionally, following the reception of the bearer change request, the SGW 35 may transmit a bearer change response message to the MME 30 (S1128).

With the attachment procedure described above, the UE 10 and the PGW 40 may establish the PDN connection. The PDN connection between the UE 10 and the PGW 40 is a communication path between the UE 10 and the PDN 9 through the LTE access network. The communication path may be constituted from connectivity between the PGW 40 and the PDN, a communication path between the SGW 35 and the PGW 40, a communication path between the SGW and eNB 45, and a wireless link between the UE and the eNB 45. At this point, a tunnel that is based on a PMIP or a GTP between the SGW 35 and the PGW 40 may be available. Furthermore, a communication path between the eNB 45 and the SGW 35 may be a GTP tunnel or a bearer communication path. Furthermore, a wireless link between the eNB 45 and the UE 10 may be a radio bearer.

Additionally, a communication path between each node may be established with transmission and reception of a control message in the attachment procedure that is described so far.

Furthermore, nodes, that is, the UE 10, the eNB 45, the SGW 35, and the PGW 40, may store information for identifying a communication path between the UE 10 and the PGW 40 through the LTE access network, and information for identifying a communication, in a state of being associated with each other.

The information for identifying the communication may be information for identifying a specific-flow communication or a specific-application communication. Accordingly, for example, when performing a specific-flow communication, the UE can perform transmission and reception using an associated communication path.

More specifically, the information for identifying the communication may be identification information with which identification can be performed using at least one or several pieces of information, among a transmission source IP address of a packet, a transmission destination IP address, a transmission source port number, a transmission destination port number, a protocol number, and an application name. Furthermore, the information for identifying the communication may be configured as a Traffic Flow Template (TFT) or the like.

Moreover, the information for identifying the communication may be transmitted in a state of being included in a control message that is generated by the UE 10 and is transmitted by the UE 10 in the attachment procedure, such as an attachment request. Additionally, each apparatus that is involved in the attachment procedure may transmit received information relating to the communication, in a state of being included in control information in a subsequent attachment procedure.

Furthermore, the information for identifying the communication may be transmitted in a state of being included in a control message that is generated by the MME 30 and that is transmitted by the MME 30 in the attachment procedure, such as the session establishment request. Additionally, each apparatus that is involved in the attachment procedure may transmit the received information relating to the communication, in the state of being included in the control information in the subsequent attachment procedure. Furthermore, the information for identifying the communication may be transmitted in a state of being included in a control message that is generated by the PGW 40 and that is transmitted by the PGW 40 in the attachment procedure, such as a session establishment response. Additionally, each apparatus that is involved in the attachment procedure may transmit the received information relating to the communication, in the state of being included in the control information in the subsequent attachment procedure. Accordingly, the nodes, that is, the UE 10, the eNB 45, the MME 30, the SGW 35, and the PGW 40, can store a communication path and the information for identifying the communication, in a state of being associated with each other.

With the attachment procedure described above, the UE 10 can establish a communication path through the LTE access network and can make a connection to the core network 7.

Moreover, with the attachment procedure, the UE 10 may establish multiple communication paths. The UE 10 may transmit multiple APNs in a state of being included in an attachment request or a control message that is transmitted to the MME 30. Accordingly, when completing the attachment procedure, the UE 10 can establish multiple communication paths that are associated with APNs, respectively. Additionally, the UE 10 may acquire multiple IP addresses that correspond to communication paths which are associated with the APNs, respectively.

Furthermore, means that establishes the communication path through the LTE access network is not limited to the attachment procedure, and this communication path may be established other procedures.

For example, after the attachment procedure is completed, the UE 10 may execute a PDN connectivity procedure and may establish the communication path through the LTE access network.

More specifically, the UE 10 may transmit a PDN connectivity request message that includes an APN, to the MME 30, and may start the PDNPDN connectivity procedure. Accordingly, establishment of a communication path through a TE access network for the APN may be requested. Additionally, an IP address that is used for a communication that uses the communication path through the TE access network for the APN may be requested.

The MME 30 may transmit the APN and the IP address in a state of being included in a response to a PDN connectivity request.

Accordingly, the UE 10 may establish the communication path through the TE access network for the APN and may acquire the IP address that is used for the communication which uses the communication path through the TE access network for the APN.

Furthermore, the PDN connectivity procedure may be executed in a detailed manner based on the usage that is set forth in the use of 3GPP.

[1.3.1.2 WLAN_ANa Attachment Procedure]

Figure 12:
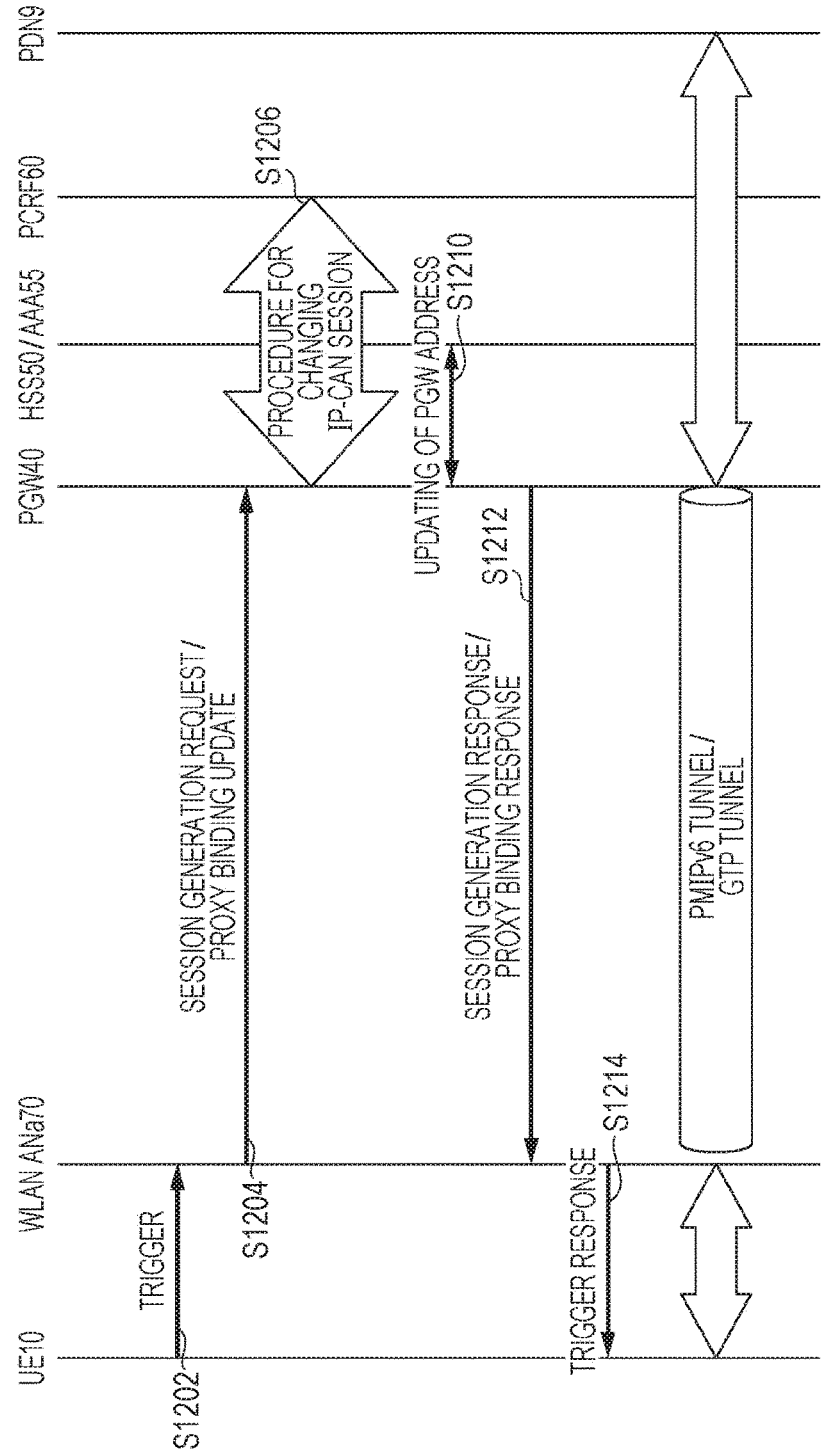
FIG. 12 is a diagram for describing a procedure for establishing a communication path through WLAN in the UE according to the first embodiment.

Next, the WLAN_ANa attachment procedure in which the UE 10 establishes a communication path through an access system on a WLAN_ANa 70 is described referring to FIG. 12.

The UE 10 transmits a trigger message to the WLAN_ANa 70 and starts the WLAN_ANa attachment procedure (S1202). The UE 10 may transmit a message that is a trigger to start a procedure, at an arbitrary timing. For example, the arbitrary timing may be when the UE 10 is powered on and may be a timing at which an access point to a wireless LAN is detected. Transmission may be performed based on a user or terminal configuration.

The UE 10 may transmit the trigger with an L2 message such as a control message that is stipulated in an authentication procedure such as Extensible Authentication Protocol (EAP).

Alternatively, the UE 10 may transmit the trigger with a control message that complies with a protocol such as a DHCP or a WLCP.

The UE 10 may transmit the identification information for identifying the UE 10 and the APN in a state of being included in the trigger message.

With the APN, the UE 10 can specify the PDN 9 that is a connection destination. In other words, by transmitting the APN, the UE 10 may designate the PDN that is a connection destination. Furthermore, with the APN, the PGW 40 may be designated.

Furthermore, with the transmission of the trigger, the UE 10 may request the connection to the core network 9. Furthermore, with the transmission of trigger, the UE 10 may request the establishment of the communication path to the PGW 9. Furthermore, with the transmission of the trigger, the UE 10 may request the IP address of the UE 10, which is used for the communication that uses the established communication path. Furthermore, with the trigger, the UE 10 may request the establishment of the PDN connection between the UE 10 itself and the PGW. Furthermore, with the trigger, the UE 10 may request the establishment of the PDN connection between the UE 10 itself and the PGW or updating of a routing rule for a communication path.

Furthermore, with transmission of the trigger, the UE 10 may request the WLAN_ANa to transmit a control message for requesting establishment of a communication path to the PGW 40 or the updating of the routing rule. At this point, a request message that is transmitted by the WLAN_ANa may be a session generation request message that is based on the GTP protocol. Alternatively, the request message may be a proxy binding request message that is based on a PMIPv6 protocol.

Next, the WLAN_ANa receives the trigger. Additionally, the WLAN_ANa may receive the identification information for identifying the UE and the APN, which are included in the trigger.

Based on the transmission of the trigger, the WLAN_ANa transmits a request message for establishing a communication path, to the PGW 40 (S1204). Furthermore, the request message may include the identification information for identifying the UE and the APN. With the transmission of the request message, the WLAN_ANa may request establishment of a communication path for the UE to deliver user data between the WLAN_ANa and the PGW 40.

At this point, the WLAN_ANa may perform transmission, with an APN retained in advance being included. Furthermore, in a case where with a trigger, the APN is not received from the UE 10, the WLAN_ANa may transmit the APN that is retained in advance. Furthermore, the APN that is retained in advance may be a default APN or the like that is configured by the home operator.

Furthermore, the request message may be a session generation request message that is based on the GTP protocol. Alternatively, the request message may be a proxy binding update message that is based on the PMIPv6 protocol.

Whether the WLAN_ANa makes a communication path establishment request using the session generation request message or makes a communication path establishment request using the proxy binding update message may be configured in advance to be in the WLAN_ANa. Furthermore, this configuration may be determined by an access network operator or a core network operations operator, and, based on this determination, a configuration may be performed. Furthermore, this configuration may be a configuration that differs for every PGW 40 that transmits a communication path establishment request.

Next, the PGW 40 and the PCRF 60 start an IP-CAN session change procedure (S1206).

The PGW 40 starts the IP-CAN session change procedure and establishes an IP-CAN session with the PCRF 60. The IP-CAN session here may be a session for managing a communication path for the UE 10 to deliver the user data, which is established by the PGW 40 and the WLAN_ANa. Additionally, performance information on a communication path, such as access system information or QoS information, may be included in management information.

The PGW 40 may transmit to the PCRF 60 a control message within the IP-CAN session change procedure, which includes the identification information for identifying the UE, the APN, information relating to an access system on the WLAN_ANa, or the like.

The PCRF 60 may transmit to the PGW 40 the control message within the IP-CAN session change procedure, which includes the identification information for identifying the UE, the APN, the information relating to the access system on the WLAN_ANa, the QoS information on the communication path or the like.

In this manner, by executing the IP-CAN session change procedure, the PGW 40 may determine a QoS for the communication path between the PGW 40 itself and the WLAN_ANa. Furthermore, by executing the IP-CAN session change procedure, the PCRF 60 may determine the QoS for the communication path between the WLAN_ANa and the PGW 40 and may notify the PGW 40 of this QoS.

Furthermore, the PGW 40 may allocate the IP address of the UE 10. The PGW 40 may allocate the IP address based on the reception of the session generation request. Furthermore, the PGW 40 may allocate the IP address of the UE 10 based on the reception of the proxy binding update message.

Furthermore, the PGW 40 may execute a PGW address update procedure for notifying an HSS 60 or an AAA 66 of an IP address of the PGW 40 (S1210).

The PGW 40 may transmit to the WLAN_ANa 70 a response message to a request that is transmitted by the WLAN_ANa 70 (S1212). Furthermore, the identification information for identifying the UE, the APN, the QoS information, the IP address that is allocated to the UE 10, and the like may be transmitted in a state of being in the response massage.

Furthermore, in a case where the session generation request message is received, the PGW 40 may transmit a session generation response message as a response message. Furthermore, in a case where a proxy binding update is received, the PGW 40 may transmit a proxy binding response message as a response message.

Next, the WLAN_ANa 70 receives the response message. With the transmission and reception of the request message and the response message, the WLAN_ANa and the PGW 40 can establish or renew the communication path for the UE 10 to deliver the user data between a WLAN_AN 70 and the PGW 40.

At this point, in a case where the session generation request and the session generating response are transmitted and received, the WLAN_ANa and the PGW 40 may establish the GTP tunnel as the communication path for the UE 10 to deliver the user data between the WLAN_AN 70 and the PGW 40. At this point, the GTP tunnel is a transfer path that is based on the GTP protocol. Furthermore, the GTP tunnel may be a bearer communication path that is identified with a bearer ID.

Furthermore, in a case where the proxy binding update and a proxy binding response are transmitted and received, the WLAN_ANa and the PGW 40 may establish the PMIP tunnel as the communication path for the UE 10 to deliver the user data between the WLAN_AN 70 and the PGW 40. At this point, the PMIP tunnel is a transfer path that is based on the PMIP protocol. Furthermore, the PMIP tunnel may be a bearer communication path that is identified with a bearer ID.

Additionally, in addition to the establishment of the communication path between the PGW 40 itself and the WLAN_ANa, the PGW 40 may establish connectivity to the PDN 9.

Furthermore, the WLAN_ANa 70 may transmit to the UE 10 a trigger response message, as a response to the trigger that is transmitted by the UE 10 (S1214). The UE identification information, the APN, and the IP address that is allocated to the UE 10 may be transmitted in a state of being included in the trigger response.

The UE 10 receives the trigger response. Additionally, the UE identification information, the APN, and the IP address that is allocated to the UE 10, which are included in the trigger response, may be acquired.

With the transmission and reception of the trigger and the trigger response, the UE 10 and the WLAN_ANa 70 establish a communication path between the UE 10 and the WLAN_ANa 70. Moreover, this communication path may be a bearer communication path that is identified with a bearer ID.

This communication path is connected to a communication path that is established between the WLAN_ANa 70 and the PGW 40, and as a result, the UE 10 can establish a communication path between the UE 10 itself and the PGW 40. Moreover, the UE 10 and the PGW 40 may manage the communication path between the UE 10 and the PGW 40, as a PDN connection, may allocate a bearer ID or the like to the communication path, and may manage the communication path, as a bearer communication path.

In addition to the communication path between the UE 10 itself and the PGW 40, with the connectivity to the PDN 9, which is secured by the PGW 40, the UE 10 can make a connection to the PDN 9.

Furthermore, the nodes, that is, the UE 10, the WLAN_ANa, and the PGW 40, may store information for identifying a communication path between the UE 10 and the PGW 40 through the WLAN_ANa that is an access network, and the information for identifying the communication, in a state of being associated with each other.

The information for identifying the communication may be information for identifying a specific-flow communication or a specific-application communication. Accordingly, for example, when performing a specific-flow communication, the UE can perform the transmission and reception using an associated communication path.

More specifically, the information for identifying the communication may be identification information with which the identification can be performed using at least one or several pieces of information, among the transmission source IP address of a packet, the transmission destination IP address, the transmission source port number, the transmission destination port number, the protocol number, and the application name. Furthermore, the information for identifying the communication may be configured as a Traffic Flow Template (TFT) or the like.

Moreover, the information for identifying the communication may be transmitted in the state of being included in the control message that is generated by the UE 10 and is transmitted by the UE 10 in the attachment procedure, such as a trigger message. Additionally, each apparatus that is involved in the attachment procedure may transmit the received information relating to the communication, in the state of being included in the control information in the subsequent attachment procedure.

Furthermore, the information for identifying the communication may be transmitted in the state of being included in the control message that is generated by the PGW 40 and that is transmitted by the PGW 40 in the attachment procedure, such as the session establishment response. Additionally, each apparatus that is involved in the attachment procedure may transmit the received information relating to the communication, in the state of being included in the control information in the subsequent attachment procedure. Accordingly, the nodes, that is, the UE 10, the WLAN_ANa, and the PGW 40, can store a communication path and the information for identifying the communication, in a state of being associated with each other.

With the procedure described above, the UE 10 completes the WLAN_ANa attachment procedure. Moreover, the processing by the WLAN_ANa and the transmission and reception of the message in the procedure described so far may be performed by the GW 74 that is configured to be on the WLAN_ANa.

[1.3.1.3 WLAN_ANb Attachment Procedure]

Figure 13:
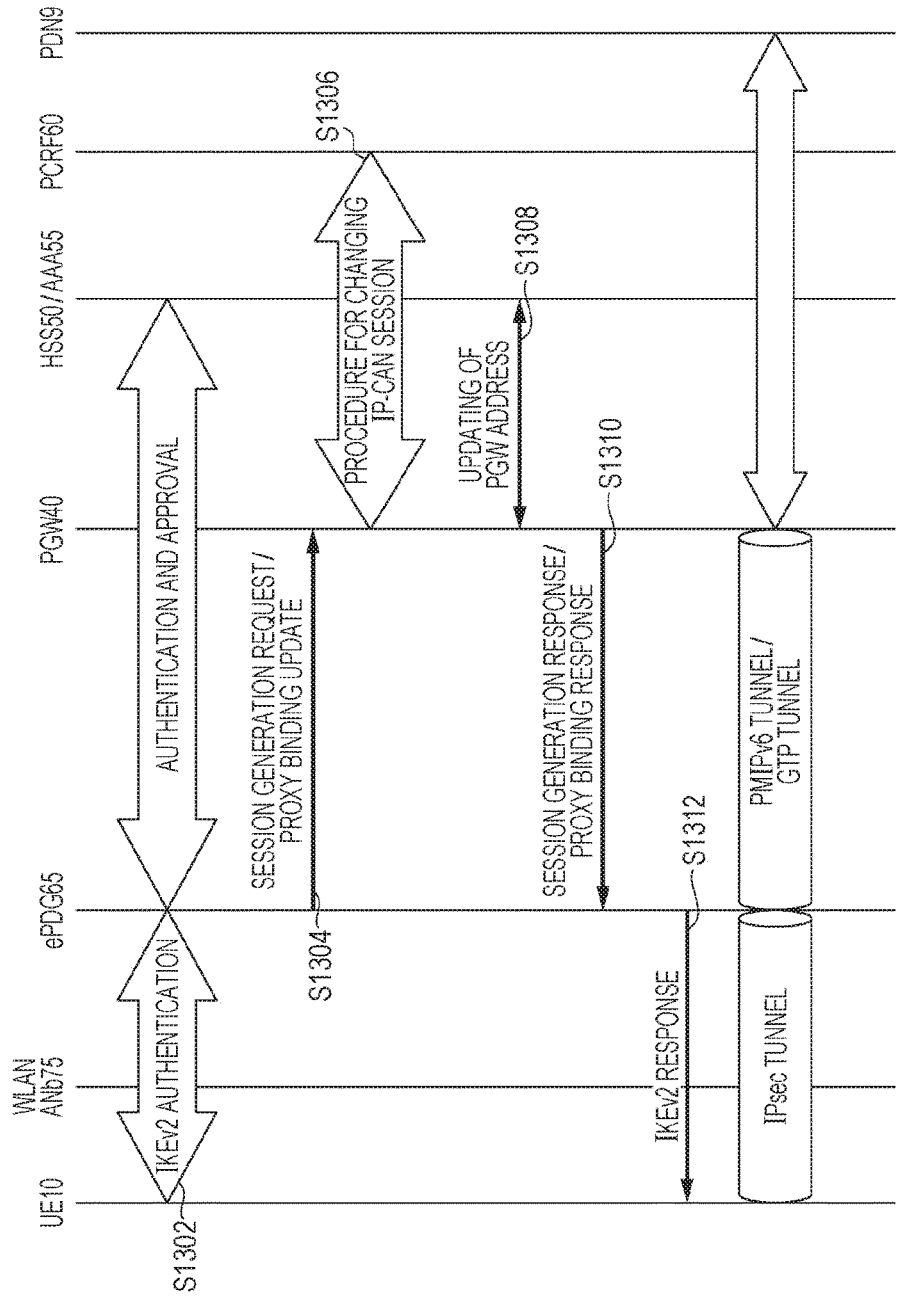
FIG. 13 is a diagram for describing the procedure for establishing the communication path through WLAN in the UE according to the first embodiment.

Next, the WLAN_ANb attachment procedure in which the UE 10 establishes a communication path through an access system on a WLAN_ANb 75 is described referring to FIG. 13.

First, the UE 10 establishes a security association between the UE 10 itself and the ePDG 65 (S1302). The security association may be established by executing an IKE v2 authentication procedure. Furthermore, with the establishment of the security association, the UE 10 and the ePDG 65 may establish a secure communication path for the UE 10 to transmit the user data between the UE 10 and the ePDG 65. Additionally, the secure communication path may be an IPSec tunnel.

The UE 10 starts a procedure for establishing the security association. The UE 10 may transmit a message that is a trigger to start a procedure, at an arbitrary timing. For example, the arbitrary timing may be when the UE 10 is powered on and may be a timing at which an access point to a wireless LAN is detected. Transmission may be performed based on a user or terminal configuration. Furthermore, the message that is a trigger may be a control message for starting the IKE v2 authentication procedure.

Moreover, the transmission and reception of the control message for the procedure for establishing the security association such as the IKE v2 authentication procedure may be transmission and reception through the WLAN_ANb.

Furthermore, the UE 10 may transmit the identification information for identifying the UE 10 and the APN in a state of being included in the message that is a trigger.

With the APN, the UE 10 can specify the PDN 9 that is a connection destination. In other words, by transmitting the APN, the UE 10 may designate the PDN 9 that is a connection destination. Furthermore, with the APN, the PGW 40 may be designated.

Furthermore, with the transmission of the trigger, the UE 10 may request the connection to the core network 9. Furthermore, with the transmission of trigger, the UE 10 may request the establishment of the communication path to the PGW 9. Furthermore, with the transmission of the trigger, the UE 10 may request the IP address of the UE 10, which is used for the communication that uses the established communication path. Furthermore, with the trigger, the UE 10 may request the establishment of the PDN connection between the UE 10 itself and the PGW. Furthermore, with the trigger, the UE 10 may request the establishment of the PDN connection between the UE 10 itself and the PGW or the updating of the routing rule for the communication path.

Furthermore, with the transmission of the trigger, the UE 10 may request the ePDG 65 to transmit a control message that requests the establishment of the communication path to the PGW 40 or the updating of the routing rule. At this point, the request message that is transmitted by the ePDG 65 may be a session generation request message that is based on the GTP protocol. Alternatively, the request message may be a proxy binding request message that is based on the PMIPv6 protocol.

Next, the ePDG 64 receives a control message that is a trigger which is transmitted by the UE 10. Additionally, the ePDG 65 may receive the identification information for identifying the UE and the APN, which are included in the control message.

At this point, an ePGD 65 may request the HSS 50 or the AAA 55 to authenticate or approve a connection to the UE 10. Additionally, the HSS 50 or the AAA 55 may perform authentication and approval based on the request, and, as a response, may notify the ePDG 65 whether or not the connection is approved.

The ePDG 65 transmits the request message for establishing a communication path, to the PGW 40, based on the reception of the trigger from the UE 10 (S1304). Moreover, the ePDG 65 may determine whether or not to transmit the request message for establishing a communication path, based on a result of the authentication by the HSS 50 or the AAA 55.

Furthermore, the request message may include the identification information for identifying the UE and the APN. With the transmission of the request message, the ePDG 65 may request the establishment of the communication path for the UE to deliver the user data between the ePDG 65 and the PGW 40.

At this point, the ePDG 65 may perform transmission, with an APN retained in advance being included. Furthermore, in the case where with a trigger, the APN is not received from the UE 10, the ePDG 65 may transmit the APN that is retained in advance. Furthermore, the APN that is retained in advance may be a default APN or the like that is configured by the home operator.

Furthermore, the request message may be a session generation request message that is based on the GTP protocol. Alternatively, the request message may be a proxy binding update message that is based on the PMIPv6 protocol.

Whether the ePDG 65 makes a communication path establishment request using the session generation request message or makes a communication path establishment request using the proxy binding update message may be configured in advance to be in the ePDG 65. Furthermore, this configuration may be determined by the access network operator or the core network operations operator, and, based on this determination, a configuration may be performed. Furthermore, this configuration may be a configuration that differs for every PGW 40 that transmits the communication path establishment request.

Next, the PGW 40 and the PCRF 60 start an IP-CAN session change procedure (S1306).

The PGW 40 starts the IP-CAN session change procedure and establishes the IP-CAN session with the PCRF 60. The IP-CAN session here may be a session for managing the communication path for the UE 10 to deliver the user data, which is established by the PGW 40 and the ePDG 65. Additionally, the performance information on a communication path, such as the access system information or the QoS information, may be included in management information.

The PGW 40 may transmit to the PCRF 60 the control message within the IP-CAN session change procedure, which includes the identification information for identifying the UE, the APN, information relating to an access system on the WLAN_ANb, or the like.

The PCRF 60 may transmit to the PGW 40 the control message within the IP-CAN session change procedure, which includes the identification information for identifying the UE, the APN, the information relating to the access system on the WLAN_ANb, the QoS information on the communication path or the like.

In this manner, by executing the IP-CAN session change procedure, the PGW 40 may determine a QoS for the communication path between the PGW 40 itself and the ePDG 65. Furthermore, by executing the IP-CAN session change procedure, the PCRF 60 may determine the QoS for the communication path between the ePDG 65 and the PGW 40 and may notify the PGW 40 of this QoS.

Furthermore, the PGW 40 may allocate the IP address of the UE 10. The PGW 40 may allocate the IP address based on the reception of the session generation request. Furthermore, the PGW 40 may allocate the IP address of the UE 10 based on the reception of the proxy binding update message.

Furthermore, the PGW 40 may execute the PGW address update procedure for notifying the HSS 60 or the AAA 66 of the IP address of the PGW 40 (S1308).

The PGW 40 may transmit to the ePDG 65 a response message to a request that is transmitted by the ePDG 65 (S1310). Furthermore, the identification information for identifying the UE, the APN, the QoS information, the IP address that is allocated to the UE 10, and the like may be transmitted in the state of being in the response massage.

Furthermore, in the case where the session generation request message is received, the PGW 40 may transmit the session generation response message as a response message. Furthermore, in the case where the proxy binding update is received, the PGW 40 may transmit the proxy binding response message as a response message.

Next, the ePDG 65 receives the response message. With the transmission and reception of the request message and the response message, the ePDG 65 and the PGW 40 can establish or renew the communication path for the UE 10 to deliver the user data between the ePDG 65 and the PGW 40.

At this point, in the case where the session generation request and the session generating response are transmitted and received, the ePDG 65 and the PGW 40 may establish the GTP tunnel as the communication path for the UE 10 to deliver the user data between the ePDG 65 and the PGW 40. At this point, the GTP tunnel is a transfer path that is based on the GTP protocol. Furthermore, the GTP tunnel may be a bearer communication path that is identified with a bearer ID.

Furthermore, in the case where the proxy binding update and the proxy binding response are transmitted and received, the ePDG 65 and the PGW 40 may establish the PMIP tunnel as the communication path for the UE 10 to deliver the user data between the ePDG 65 and the PGW 40. At this point, the PMIP tunnel is a transfer path that is based on the PMIP protocol. Furthermore, the PMIP tunnel may be a bearer communication path that is identified with a bearer ID.

Additionally, in addition to the establishment of the communication path between the PGW 40 itself and the EPDG 65, the PGW 40 may establish the connectivity to the PDN 9.

Furthermore, the ePDG 65 may transmit to the UE 10 a trigger response message, as a response to the trigger that is transmitted by the UE 10 (S1312). The UE identification information, the APN, and the IP address that is allocated to the UE 10 may be transmitted in the state of being included in the trigger response.

The UE 10 receives the trigger response. Additionally, the UE identification information, the APN, and the IP address that is allocated to the UE 10, which are included in the trigger response, may be acquired. Moreover, the response message may be an IKE v2 response message.

With the transmission and reception of the trigger and the trigger response, the UE 10 and the ePDG 65 establish a communication path between the UE 10 and the EPDG 65. Moreover, this communication path may be an IPSec tunnel. Additionally, the communication path may be a bearer communication path that is identified with a bearer ID.

This communication path is connected to a communication path that is established between the ePDG 65 and the PGW 40, and as a result, the UE 10 can establish the communication path between the UE 10 itself and the PGW 40. Moreover, the UE 10 and the PGW 40 may manage the communication path between the UE 10 and the PGW 40, as a PDN connection, may allocate a bearer ID or the like to the communication path, and may manage the communication path, as a bearer communication path.

In addition to the communication path between the UE 10 itself and the PGW 40, with the connectivity to the PDN 9, which is secured by the PGW 40, the UE 10 can make a connection to the PDN 9.

Furthermore, the nodes, that is, the UE 10, the ePDG 65, and the PGW 40, may store information for identifying a communication path between the UE 10 and the PGW 40 through the WLAN_ANb 75 that is an access network, and the information for identifying the communication, in a state of being associated with each other.

The information for identifying the communication may be information for identifying a specific-flow communication or a specific-application communication. Accordingly, for example, when performing a specific-flow communication, the UE can perform the transmission and reception using an associated communication path.

More specifically, the information for identifying the communication may be identification information with which the identification can be performed using at least one or several pieces of information, among the transmission source IP address of a packet, the transmission destination IP address, the transmission source port number, the transmission destination port number, the protocol number, and the application name. Furthermore, the information for identifying the communication may be configured as a Traffic Flow Template (TFT) or the like.

Moreover, the information for identifying the communication may be transmitted in the state of being included in the control message that is generated by the UE 10 and is transmitted by the UE 10 in the attachment procedure, such as the trigger message. Additionally, each apparatus that is involved in the attachment procedure may transmit the received information relating to the communication, in the state of being included in the control information in the subsequent attachment procedure.

Furthermore, the information for identifying the communication may be transmitted in the state of being included in the control message that is generated by the PGW 40 and that is transmitted by the PGW 40 in the attachment procedure, such as the session establishment response. Additionally, each apparatus that is involved in the attachment procedure may transmit the received information relating to the communication, in the state of being included in the control information in the subsequent attachment procedure. Accordingly, the nodes, that is, the UE 10, the ePDG 65, and the PGW 40, can store a communication path and the information for identifying the communication, in a state of being associated with each other.

With the procedure described above, the UE 10 completes the WLAN_ANb 75 attachment procedure.

[1.3.1.4 Attachment Procedure in which the DSMIP is Used]

Next, the attachment procedure in which the UE 10 uses a DSMIPv6 protocol is described referring to FIG. 13. With the attachment procedure in which the DSMIP is used, the UE 10 can establish a communication path through the WLAN_ANa 70 or a communication path through the WLAN_ANb 75.

An example of a procedure in which the UE 10 establishes the communication path through the WLAN_ANb 75 will be described below.

First, the UE 10 establishes the security association between the UE 10 itself and the ePDG 65 (S1402). The security association may be established by executing the IKE v2 authentication procedure. Furthermore, with the establishment of the security association, the UE 10 and the ePDG 65 may establish a secure communication path for the UE 10 to transmit the user data between the UE 10 and the ePDG 65. Additionally, the secure communication path may be an IPSec tunnel.

The UE 10 starts a procedure for establishing the security association. The UE 10 may transmit a message that is a trigger to start a procedure, at an arbitrary timing. For example, the arbitrary timing may be when the UE 10 is powered on and may be a timing at which an access point to a wireless LAN is detected. Transmission may be performed based on a user or terminal configuration. Furthermore, the message that is a trigger may be a control message for starting the IKE v2 authentication procedure.

Moreover, the transmission and reception of the control message for the procedure for establishing the security association such as the IKE v2 authentication procedure may be transmission and reception through the WLAN_ANb.

At this point, the ePGD 65 may request the HSS 50 or the AAA 55 to authenticate or approve the connection to the UE 10. Additionally, the HSS 50 or the AAA 55 may perform the authentication and the approval based on the request, and, as a response, may notify the ePDG 65 whether or not the connection is approved.

Furthermore, the ePDG 65 may transmit to the UE 10 a trigger response message, as a response to the trigger that is transmitted by the UE 10 (S1404).

With the transmission and reception of the trigger and the trigger response, the UE 10 and the ePDG 65 establish the communication path between the UE 10 and the EPDG 65. Moreover, this communication path may be an IPSec tunnel. Additionally, the communication path may be a bearer communication path that is identified with a bearer ID.

The IKE v2 response message is received from the UE 10, and, based on the reception, a binding update message for establishing a communication path is transmitted to the PGW 40 (S1404). Furthermore, the identification information for identifying the UE and the APN may be included in the binding update message.

With the APN, the UE 10 can specify the PDN 9 that is a connection destination. In other words, by transmitting the APN, the UE 10 may designate the PDN 9 that is a connection destination. Furthermore, with the APN, the PGW 40 may be designated.

Furthermore, with the transmission of the binding update, the UE 10 may request the connection to the core network 9. Furthermore, with the transmission of the binding update, the UE 10 may request the establishment of the communication path to the PGW 9. Furthermore, with the transmission of the binding update, the UE 10 may request the IP address of the UE 10, which is used for the communication that uses the established communication path. Furthermore, with the binding update, the UE 10 may request the establishment of the PDN connection between the UE 10 itself and the PGW. Furthermore, with the binding update, the UE 10 may request the establishment of the PDN connection between the UE 10 itself and the PGW or the updating of the routing rule for the communication path.

The PGW 40 receives the binding update message that is transmitted by the UE 10, and the PGW 40 and the PCRF 60 starts the procedure for changing the IP-CAN session (S1408).

The PGW 40 starts the IP-CAN session change procedure and establishes the IP-CAN session with the PCRF 60. The IP-CAN session here may be a session for managing the communication path for the UE 10 to deliver the user data, which is established by the PGW 40 and the UE 10. Additionally, the performance information on a communication path, such as the access system information or the QoS information, may be included in management information.

The PGW 40 may transmit to the PCRF 60 the control message within the IP-CAN session change procedure, which includes the identification information for identifying the UE, the APN, information relating to the access system on the WLAN_ANb, or the like.

The PCRF 60 may transmit to the PGW 40 the control message within the IP-CAN session change procedure, which includes the identification information for identifying the UE, the APN, the information relating to the access system on the WLAN_ANb, the QoS information on the communication path or the like.

In this manner, by executing the IP-CAN session change procedure, the PGW 40 may determine a QoS for the communication path between the PGW 40 itself and the ePDG 65. Furthermore, by executing the IP-CAN session change procedure, the PCRF 60 may determine the QoS for the communication path between the UE 10 and the PGW 40 and may notify the PGW 40 of this QoS.

Furthermore, the PGW 40 may allocate the IP address of the UE 10. The PGW 40 may allocate the IP address based on the reception of the session generation request. Furthermore, the PGW 40 may allocate the IP address of the UE 10 based on the reception of the proxy binding update message.

Furthermore, the PGW 40 may execute the PGW address update procedure for notifying the HSS 60 or the AAA 66 of the IP address of the PGW 40 (S1408).

The PGW 40 may transmit to the UE 10 the binding response message as a response to the request that is transmitted by the ePDG 65 (S1410). Furthermore, the identification information for identifying the UE, the APN, the QoS information, the IP address that is allocated to the UE 10, and the like may be transmitted in the state of being in the response massage.

The UE 10 receives the binding response. By transmitting and receiving the proxy binding update and the proxy binding response, the UE 10 and the PGW 40 establish the PMIP tunnel as the communication path for the UE 10 to deliver the user data between the UE 10 and the PGW 40.

Figure 14:
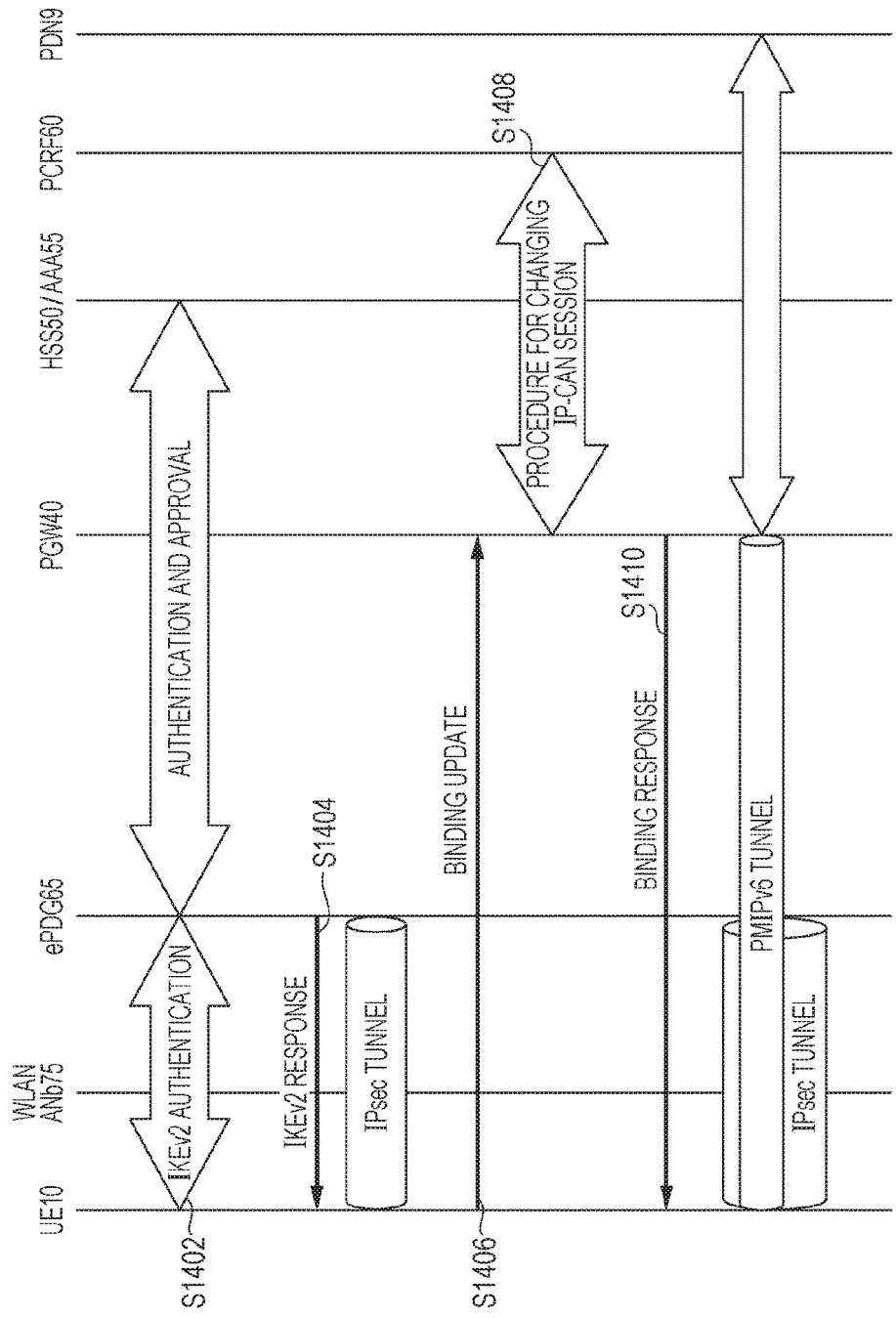
FIG. 14 is a diagram for describing the procedure for establishing the communication path through WLAN in the UE according to the first embodiment.

Moreover, as illustrated in FIG. 14, on the communication path between the UE 10 and the PGW 40, such as the PMIP tunnel, when it comes to delivery between the UE 10 and the ePDG, the deliver is performed through the IPSec tunnel that is established the UE 10 and the ePDG 65.

At this point, the PMIP tunnel is a transfer path that is based on the PMIP protocol. Furthermore, the PMIP tunnel may be a bearer communication path that is identified with a bearer ID.

Additionally, in addition to the establishment of the communication path between the PGW 40 itself and the UE 10, the PGW 40 may establish the connectivity to the PDN 9.

The UE 10 can establish the communication path between the UE itself and the PGW 40. Moreover, the UE 10 and the PGW 40 may manage the communication path between the UE 10 and the PGW 40, as a PDN connection, may allocate a bearer ID or the like to the communication path, and may manage the communication path, as a bearer communication path.

In addition to the communication path between the UE 10 itself and the PGW 40, with the connectivity to the PDN 9, which is secured by the PGW 40, the UE 10 can make a connection to the PDN 9.

Furthermore, the nodes, that is, the UE 10 and the PGW 40, may store the information for identifying the communication path between the UE 10 and the PGW 40 through the WLAN_ANb 75 that is an access network, and the information for identifying the communication, in the state of being associated with each other.

The information for identifying the communication may be information for identifying a specific-flow communication or a specific-application communication. Accordingly, for example, when performing a specific-flow communication, the UE can perform the transmission and reception using an associated communication path.

More specifically, the information for identifying the communication may be identification information with which the identification can be performed using at least one or several pieces of information, among the transmission source IP address of a packet, the transmission destination IP address, the transmission source port number, the transmission destination port number, the protocol number, and the application name. Furthermore, the information for identifying the communication may be configured as a Traffic Flow Template (TFT) or the like.

Moreover, the information for identifying the communication may be transmitted in the state of being included in the control message that is generated by the UE 10 and is transmitted by the UE 10 in the attachment procedure, such as a binding update message. Additionally, each apparatus that is involved in the attachment procedure may transmit the received information relating to the communication, in the state of being included in the control information in the subsequent attachment procedure.

Furthermore, the information for identifying the communication may be transmitted in the state of being included in the control message that is generated by the PGW 40 and is transmitted by the PGW 40 in the attachment procedure, such as the binding response message. Additionally, each apparatus that is involved in the attachment procedure may transmit the received information relating to the communication, in the state of being included in the control information in the subsequent attachment procedure. Accordingly, the nodes, that is, the UE 10, the ePDG 65, and the PGW 40, can store a communication path and the information for identifying the communication, in a state of being associated with each other.

With the procedure described above, the UE 10 completes the attachment procedure in which the DSMIPv6 is used. Accordingly, the UE 10 can establish the communication path to the PGW 40 through the WLAN_ANb 75.

[1.3.1.5 First Example of a Switching Procedure in which the Policy of the Type 2 is Used]

Figure 15:
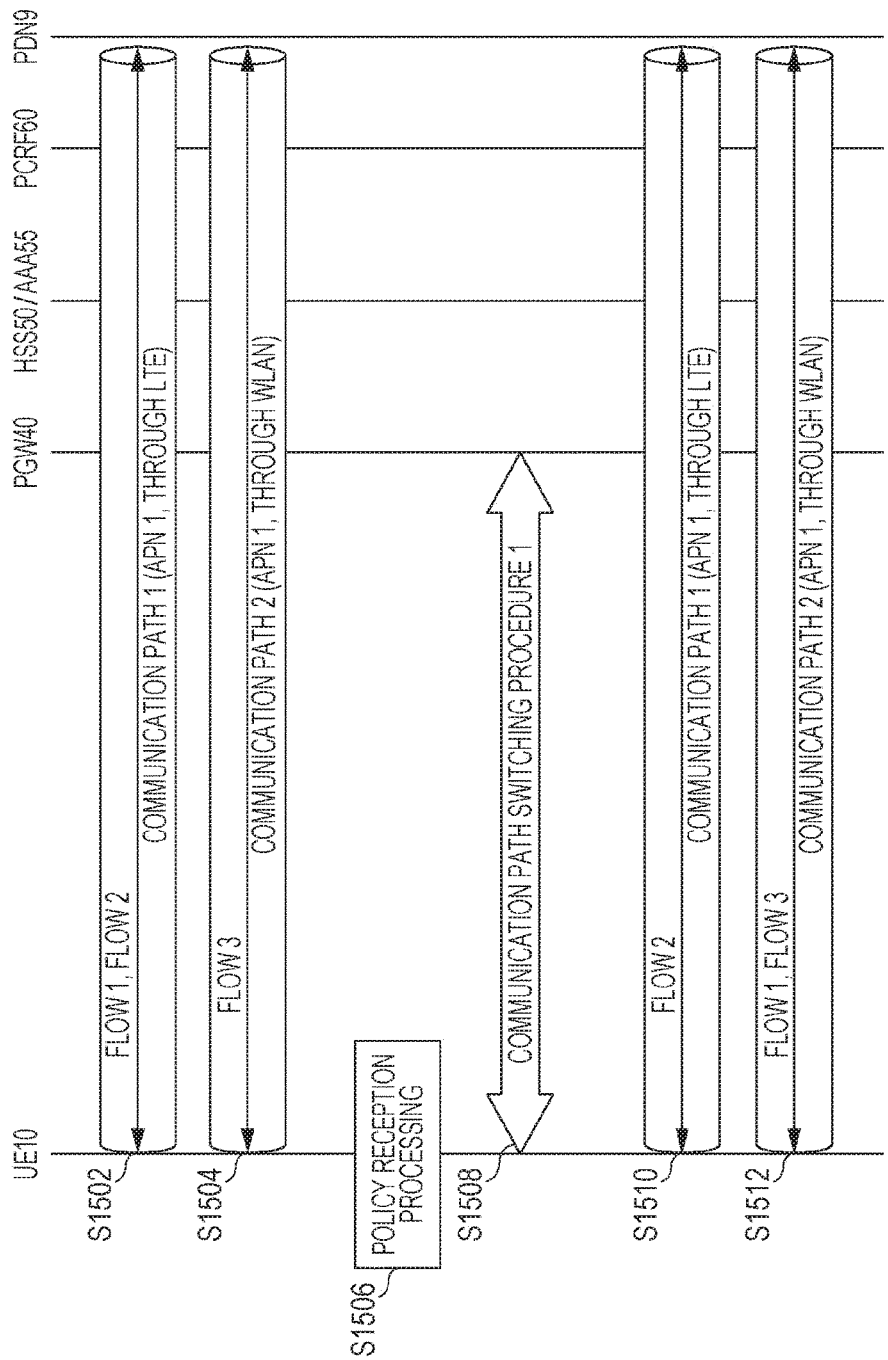
FIG. 15 is a diagram for describing a procedure for switching an access network according to the first embodiment.

Next, a switching procedure in which the UE 10 uses the policy of the type 2 is described referring to FIG. 15.

As illustrated in FIG. 15, the UE 10 in an initial state, establishes a communication path 1, and performs communications in a flow 1 and a flow 2 (S1502). Additionally, the UE 10 establishes a communication path 2 in addition to the communication path 1, and performs a communication in a flow 3 (S1504). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in a state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which identification information for identifying a communication and the communication path 1 correspond to each other are described when the LTE access procedure or a PDN connection establishment procedure is described in 1.3.1.1, detailed descriptions thereof are omitted.

Furthermore, the communication path 2 may be a communication path for the connection to the PGW 40 through the WLAN_ANa 70. Additionally, the UE 10 may establish the communication path 1 in the state of being associated with the APN 1. In this manner, in the UE 10 and the PGW 40, the APN 1 and the communication path 2 are associated with each other, and the identification information for identifying a communication in the flow 3 and the communication path 1 are associated with each other.

Moreover, because a specific method of establishing the communication path 2, a management method in which the APN 1 and the communication path 2 correspond to each other, and a management method in which the identification information for identifying a communication and the communication path 1 correspond to each other are described when the WLAN_ANa access procedure is described in 1.3.1.2, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Figure 9:
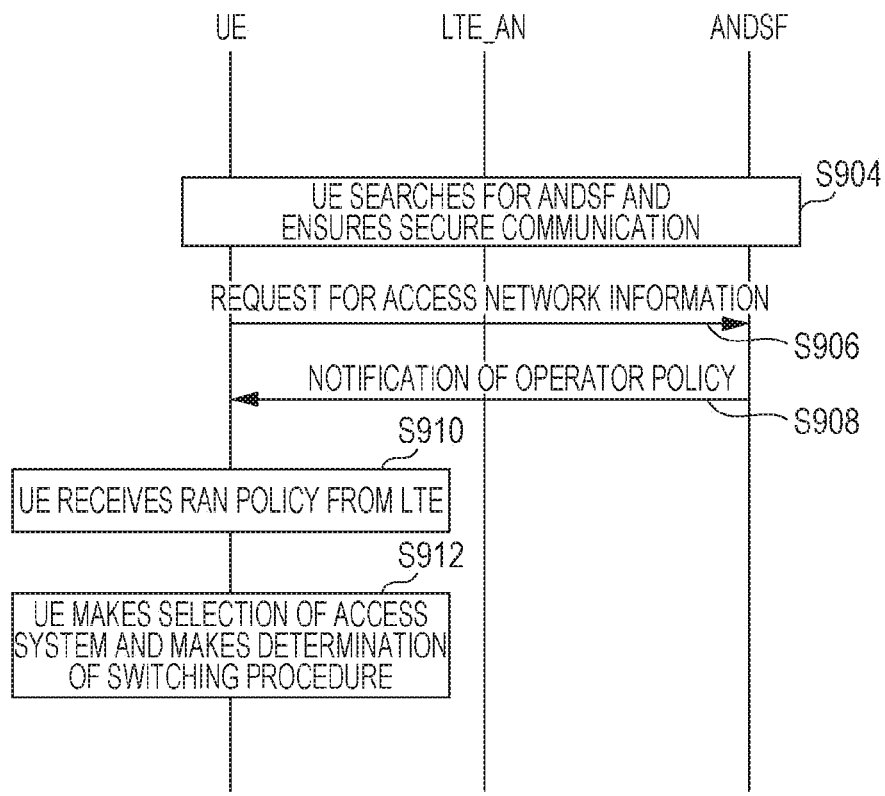
FIG. 9 is a diagram for describing a flow of processing according to the first embodiment.

Next, the UE 10 performs policy reception processing (S1506). An example of the policy reception processing will be described below referring to FIG. 9.

First, the UE 10 executes a procedure for receiving the operator policy. Moreover, whether or not to receive the operator policy may be determined based on the approval information 1 of the approval information 144. More precisely, in a case where the approval information 1 is set to be "APPROVED", the operator policy may be received. Furthermore, in a case where the approval information 1 is set to be "DISAPPROVED", the present procedure may be ended without receiving the operator policy.

A specific example for receiving the operator policy will be described below. The UE 10 searches for the ANDSF 20 and ensures a secure communication with the ANDSF 20 that is found as a result of the search (S904). Various methods in which the UE 10 searches for the ANDSF 20 are considered, and for example, the ANDSF 20 can be searched for by the UE 10 making an inquiry to a DNS server that is installed on the PDN. Various methods in which the UE 10 and the ANDSF 20 ensures a secure communication are considered and for example, IPSec may be used.

Moreover, based on the approval information 1, the UE 10 may search for the ANDSF 20 or may transmit a control message for establishing a secure communication path to the ANDSF 20.

When ensuring the secure communication path between the UE 10 itself and the ANDSF 20, the UE 10 transmits a request for the access network information to the ANDSF 20 (S906).

At this time, as illustrated in FIG. 10(*a*), location information of an access system that is available for the UE 10 or of the UE 10 may be included in the request for the access network information. At this point, as capability information (capability) of the UE 10, information indicating LTE that is an available access system and information indicating WLAN may be included. Pieces of location information include location information 1, and without being limited to this, may include a Cell ID or a Tracking Area ID (TAI) of an LTE base station apparatus and Global Positioning System (GPS) information.

Moreover, based on the approval information 1, the UE 10 may transmit the request message. The ANDSF 20 transmits an operator policy notification to the UE 10 (S908). Based on reception of the request message that is transmitted from the UE 10, the ANDSF 20 may notify the UE 10 of the operator policy notification or may perform transmission at a timing at which the operator policy is updated or at an arbitrary timing.

The ANDSF 20 may transmit the operator policy with the ANDSF policy and the approval information being included. At this point, the ANDSF policy may be a policy for the UE 10, which is stored in the ANDSF policy 242, and multiple policies are included in every piece of information for identifying a communication such as a flow communication. Additionally, policies of multiple types, such as the type 1 to the type 4, may be included.

Furthermore, the approval information may be the approval information 2 of the approval information 244. The UE 10 receives the operator policy notification and acquires the ANDSF policy and the approval information. Accordingly, based on the approval information 1, the UE 10 can receive the operator policy.

Furthermore, based on the approval information 1, the UE 10 may store the received ANDSF policy in the UE policy 142, or by performing updating and so on, may manage the received ANDSF policy as a UE policy. Additionally, based on the approval information 1, the UE 10 may store the approval information 2 that is received from the ANDSF 20, as approval information of the approval information 144, and, by performing renewal and so on, may manage the received approval information 2, as approval information of the UE.

Next, the UE 10 determines whether or not to receive the RAN policy from the LTE_AN 80. At this point, based on the approval information 2 of the approval information 144, the UE 10 may receive the RAN policy. For example, in a case where the approval information 2 is "APPROVED", the RAN policy may be received. Furthermore, in a case where the approval information 2 is "DISAPPROVED", a configuration, such as one in which the reception of the RAN policy is not performed, may be performed.

Furthermore, based on the approval information 2 that is received from the ANDSF 20, the UE 10 may receive the RAN policy, and, based on renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the home mobile operator with which the UE 10 has a contract.

Moreover, the eNB 45 may transmit the RAN policy to multiple terminals in a manner that performs broadcasting to a base station area, and may transmit the RAN policy only to the UE 10. Accordingly, based on the approval information 2, the UE 10 can receive the RAN policy.

Figure 19:
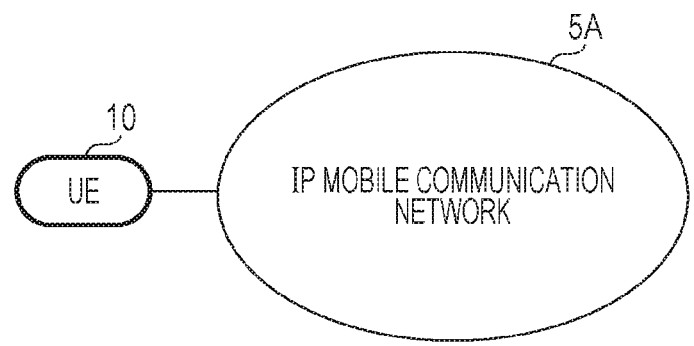
FIG. 19 is a diagram for describing the outline of the communication system according to the first embodiment.

Moreover, because the approval information 2 does not need necessarily to be transmitted from the ANDSF 20, the RAN policy can be received based on the UE policy, not based on the operator policy. For example, as illustrated in FIG. 19, even in a communication system for which the ANDSF is not configured, the UE 10 can control whether or not to use the RAN policy, based on the approval information 2.

Based on this determination, the UE 10 may receive the RAN policy 4542 from LTE (the eNB 45) (S910). Next, using the operator policy, the RAN policy, or both, the UE 10 makes a selection of an access system and makes a determination of a communication path switching procedure (S912).

In the present example, based on the policy of the type 2 whose target is the flow 1, which is stored by the UE 10 in the UE policy 142, and on the RAN policy that is transmitted by the eNB 45, an example of switching a communication path in the flow 1 is described.

Moreover, the ANDSF policy that is stored in the UE policy 142 is the policy of the type 2. This means that, based on the approval information 1, although the UE policy 142 is updated with what is received from the ANDSF 20, any that is stored in the UE policy 142 may be available.

Furthermore, as described so far, the information for identifying the communication, the access network information, a priority level of an access network, and a threshold are stored in the ANDSF policy, in a state of being associated with one another. Additionally, the access network information and the threshold are stored in the RAN policy, in a state of being associated with each other. Specifically, the information for identifying the communication is information for identifying the flow 1, is information indicating LTE and WLAN in the access network information, and is information indicating that LTE takes precedence in terms of a priority level of the access network.

Based on the RAN policy, the UE 10 may determine the switching of the communication path based on the RAN policy. The UE 10 may determine the switching, based on at least one or two pieces of information, among the RSRP, the RSRQ, and the OPI, which are included in the RAN policy.

Furthermore, a communication path to a switching destination and communication data for performing the switching may be determined based on the ANDSF policy. Specifically, because information for identifying a communication for the ANDSF policy is information for identifying the flow 1, WLAN is stored as an available access network, it may be determined that a communication in the flow 1 is switched to a communication path that uses WLAN.

Furthermore, from the fact that the ANDSF policy is the policy of the type 2, the switching means may determine that switching of a flow base is performed.

With the procedure described above, the policy reception processing (S1506) is completed.

In the case of the policy of the type 2 that is illustrated in the second example of the policy in FIG. 5(b), as an example of a policy which the ANDSF 20 notifies the UE 10 of, an IP flow and a routing rule may be included. With the inclusion of the IP flow and the routing rule, the ANDSF 20 can cause the UE 10 to switch an access system according to the IP flow. More precisely, with the IP flow that is included in the ANDSF policy from the ANDSF 20, the UE 10 can switch the access system.

With the inclusion of the application ID in the IP flow, the ANDSF 20 can cause the UE 10 to identify data transmission and reception for every application and can cause the UE 10 to switch the access system. More precisely, the UE 10 can switch the access system for every application ID in the IP flow, which is included in the ANDSF policy from the ANDSF 20.

With the inclusion of the address type in the IP flow, the ANDSF 20 can cause the UE 10 to identify the data transmission and reception for every version for the IP address and can switch the UE 10 to switch the access system. More precisely, the UE 10 can identify the data transmission and reception for every address type in the IP flow that is included in the ANDSF policy from the ANDSF 20, and can switch the access system.

With the inclusion of the transmission source IP address in the IP flow, the ANDSF 20 can cause the UE 10 to recognize the data transmission and reception for every transmission source IP address and can cause the UE 10 to switch the access system. More precisely, the UE 10 can identify the data transmission and reception for every transmission source IP address in the IP flow that is included in the ANDSF policy from the ANDSF 20, and can switch the access system. Moreover, when it comes to the transmission source IP address, the indication of the first transmission source IP address and the last transmission source IP address may be the indication of the range of the transmission source IP address.

With the inclusion of the destination IP address in the IP flow, the ANDSF 20 can cause the UE 10 to recognize the data transmission and reception for every destination IP address and can cause the UE 10 to switch the access system. More precisely, the UE 10 can identify the data transmission and reception for every destination IP address in the IP flow that is included in the ANDSF policy from the ANDSF 20, and can switch the access system. Moreover, when it comes to the destination IP address, the indication of the first destination IP address and the last destination IP address may be the indication of the range of the destination IP address.

With the inclusion of the protocol type in the IP flow, the ANDSF 20 can cause the UE 10 to identify the data transmission and reception for every protocol type and can cause the UE 10 to switch the access system. More precisely, the UE 10 can identify the data transmission and reception for every protocol type in the IP flow that is included in the ANDSF policy from the ANDSF 20, and can switch the access system.

With the inclusion of the transmission source port number in the IP flow, the ANDSF 20 can cause the UE 10 to recognize the data transmission and reception for every transmission source port number and can cause the UE 10 to switch the access system. More precisely, the UE 10 can identify the data transmission and reception for every transmission source port number in the IP flow that is included in the ANDSF policy from the ANDSF 20, and can switch the access system.

With the inclusion of the destination port number in the IP flow, the ANDSF 20 can cause the UE 10 to recognize the data transmission and reception for every destination port number and can cause the UE 10 to switch the access system. More precisely, the UE 10 can identify the data transmission and reception for every destination port number in the IP flow that is included in the ANDSF policy from the ANDSF 20, and can switch the access system.

With the inclusion of the QoS in the IP flow, the ANDSF 20 can cause the UE 10 to recognize the data transmission and reception for every QoS and can cause the UE 10 to switch the access system. More precisely, the UE 10 can identify the data transmission and reception for every QoS in the IP flow that is included in the ANDSF policy from the ANDSF 20, and can switch the access system.

With the inclusion of the domain name in the IP flow, the ANDSF 20 can cause the UE 10 to recognize the data transmission and reception for every domain name and can cause the UE 10 to switch the access system. More precisely, the UE 10 can identify the data transmission and reception for every domain name in the IP flow that is included in the ANDSF policy from the ANDSF 20, and can switch the access system.

With the inclusion of the APN in the IP flow, the ANDSF 20 can cause the UE 10 to recognize the data transmission and reception for every APN and can cause the UE 10 to switch the access system. More precisely, the UE 10 can identify the data transmission and reception for every APN in the IP flow that is included in the ANDSF policy from the ANDSF 20, and can switch the access system.

Moreover, the ANDSF 20 is described as including in the IP flow one piece of information among pieces of information indicating the application ID, the address type, the transmission source IP address, the destination IP address, the protocol type, the transmission source port number, the destination port number, the QoS, the domain name, and the APN, but with the inclusion in the IP flow of multiple pieces of information among the application ID, the address type, the transmission source IP address, the destination IP address, the protocol type, the transmission source port number, the destination port number, the QoS, the domain name, and the APN, may cause the UE 10 to identify the data transmission and reception using the multiple pieces of information and may switch the access system.

More precisely, the UE 10 can identify the data transmission and reception using the multiple pieces of information, among the application ID, the address type, the transmission source IP address, the destination IP address, the protocol type, the transmission source port number, the destination port number, the QoS, the domain name, and the APN, in the IP flow that is included in the ANDSF policy from the ANDSF 20, and can switch the access system.

On the other hand, information indicating the access network that takes precedence within a policy is included in the routing rule. With the inclusion of the IP flow and the routing rule, the ANDSF 20 can cause the UE 10 to switch the data transmission and reception that is identified with the IP flow, to an access system in accordance with the routing rule. More precisely, with the IP flow and the routing rule that are included in the ANDSF policy from the ANDSF 20, the UE 10 can switch the data transmission and reception that is identified with the IP flow, to the access system in accordance with the routing rule.

Furthermore, in a case where the access ID is included in the routing rule, the ANDSF 20 can cause the UE 10 to preferentially first switch the data transmission and reception that is identified with the IP flow, to WLAN that is indicated by the access ID. More precisely, with the IP flow that is included in the ANDSF policy from the ANDSF 20 and the access ID that is included in the routing rule, the UE 10 can switch the data transmission and reception that is identified with the IP flow, to WLAN that is indicated by the access ID.

Furthermore, in a case where the secondary access ID is included in the routing rule, the ANDSF 20 can cause the UE 10 to preferentially second switch the data transmission and reception that is identified with the IP flow, to WLAN that is indicated by the secondary access ID. More precisely, with the IP flow that is included in the ANDSF policy from the ANDSF 20 and the secondary access ID that is included in the routing rule, the UE 10 can switching the data transmission and reception that is identified with IP flow, to WLAN that is indicated by the secondary access ID.

Furthermore, in the case of the case policy of the type 2, the ANDSF 20 may cause a routing reference, rule priority, the threshold 1 and the OPI 1 to be included, in addition to the IP flow and the routing rule.

The routing reference is constructed from an effective area and point-in-time information. In a case where the PLMN is included in the effective area in the routing reference, if the UE 10 serves an area that is indicated by the PLMN, the ANDSF 20 can cause the UE 10 to make the policy effective and to switch the access system. More precisely, with the PLMN in the effective area that is included in the routing reference which is included in the ANDSF policy from the ANDSF 20, in a case where the UE 10 serves the area that is indicated by the PLMN, the UE 10 can make the policy effective and can switch the access system.

Furthermore, in a case where the TAC is included in the effective area in the routing reference, if the UE 10 serves an area that is indicated by the TAC, the ANDSF 20 can cause the UE 10 to make the policy effective and to switch the access system. More precisely, with the TAC in the effective area that is included in the routing reference which is included in the ANDSF policy from the ANDSF 20, in a case where the UE 10 serves the area that is indicated by the TAC, the UE 10 can make the policy effective and can switch the access system.

Furthermore, in a case where the EUTRA_CI is included in the effective area in the routing reference, if the UE 10 serves an area that is indicated by the EUTRA_CI, the ANDSF 20 can cause the UE 10 to make the policy effective and to switch the access system. More precisely, with the EUTRA_CI in the effective area that is included in the routing reference which is included in the ANDSF policy from the ANDSF 20, in a case where the UE 10 serves the area that is indicated by the EUTRA_CI, the UE 10 can make the policy effective and can switch the access system.

Furthermore, in a case where the BSSID is included in the effective area in the routing reference, if the UE 10 serves an area that is indicated by the BSSID, the ANDSF 20 can cause the UE 10 to make the policy effective and to switch the access system. More precisely, with the BSSID in the effective area that is included in the routing reference which is included in the ANDSF policy from the ANDSF 20, in a case where the UE 10 serves the area that is indicated by the BSSID, the UE 10 can make the policy effective and can switch the access system.

Furthermore, in a case where the SSID is included in the effective area in the routing reference, if the UE 10 serves an area that is indicated by the SSID, the ANDSF 20 can cause the UE 10 to make the policy effective and to switch the access system. More precisely, with the SSID in the effective area that is included in the routing reference which is included in the ANDSF policy from the ANDSF 20, in a case where the UE 10 serves the area that is indicated by the SSID, the UE 10 can make the policy effective and can switch the access system.

Furthermore, in a case where the HESSID is included in the effective area in the routing reference, if the UE 10 serves an area that is indicated by the HESSID, the ANDSF 20 can cause the UE 10 to make the policy effective and to switch the access system. More precisely, with the HESSID in the effective area that is included in the routing reference which is included in the ANDSF policy from the ANDSF 20, in a case where the UE 10 serves the area that is indicated by the HESSID, the UE 10 can make the policy effective and can switch the access system.

Furthermore, in a case where the point-in-time information is included in the effective area in the routing reference, if a current point in time is earlier than the time that is indicated by the point-in-time information, the ANDSF 20 can cause the UE 10 to make the policy effective and to switch the access system. More precisely, in a case where with the time-in-point-in-time information that is included in the routing reference which is included in the ANDSF policy from the ANDSF 20, the current point in time is earlier than the time that is indicated by the time-in-point-in-time information, the UE 10 can make the policy effective and can switch the access system.

Furthermore, in a case where the rule priority is included, the ANDSF 20 can cause the UE 10 to provide an indication of priority levels of other ANDSF policies, to change the ANDSF policy that takes precedence, and to switch the access system. More precisely, with the rule priority that is included in the ANDSF policy from the ANDSF 20, the UE 10 can change the ANDSF policy that takes precedence, and can switch the security system.

Furthermore, in a case where the RSRP is included in the threshold 1, if the RSRP is exceeded, the ANDSF 20 can cause the UE 10 to switch to the data transmission and reception through LTE. More precisely, in a case where with the RSRP that is included in the threshold 1 in the ANDSF policy from the ANDSF 20, the RSRP is exceeded, the UE 10 can switch to the data transmission and reception through LTE.

Furthermore, in a case where the RSRQ is included in the threshold 1, if the RSRQ is exceeded, the ANDSF 20 can cause the UE 10 to switch to the data transmission and reception through LTE. More precisely, in a case where with the RSRQ that is included in the threshold 1 in the ANDSF policy from the ANDSF 20, the RSRQ is exceeded, the UE 10 can switch to the data transmission and reception through LTE.

Furthermore, in a case where the BSS load is included in the threshold 1, if the BSS load is exceeded, the ANDSF 20 can cause the UE 10 to switch to the data transmission and reception through WLAN. More precisely, in a case where with the BSS load that is included in the threshold 1 in the ANDSF policy from the ANDSF 20, the BSS load is exceeded, the UE 10 can switch to the data transmission and reception through WLAN.

Furthermore, in a case where the OPI 1 is included, the ANDSF 20 can cause the UE 10 to provide an indication of priority levels of the ANDSF policy and the RAN policy, to preferentially execute the ANDSF policy or the RAN policy, and to switch the access system. More precisely, with the OPI 1 that is included in the ANDSF policy from the ANDSF 20, the UE 10 can preferentially execute the ANDSF policy or the RAN policy, and can switch the security system.

Among the routing reference, the rule priority, the threshold 1 and the OPI 1 in addition to the IP flow and the routing rule, any one is described above as being included, but with the inclusion of multiple pieces of information among the routing reference, the rule priority, the threshold 1, and the OPI 1 in addition to the IP flow and the routing rule, the UE 10 may be caused to execute the ANDSF policy and to switch the access system.

More precisely, with the multiple pieces of information among the routing reference, the rule priority, the threshold 1, and the OPI 1, in addition to the IP flow and the routing rule, which are included in the ANDSF policy from the ANDSF 20, the UE 10 can switch the access system.

Furthermore, the eNB 45 may include the threshold in the RAN policy, and may cause the UE 10 to switch the access system. More precisely, with the threshold that is included in the RAN policy from the eNB 45, the UE 10 may switch the access system.

Furthermore, in a case where the RSRP is included in the threshold in the RAN policy, in response to the RSRP, the eNB 45 can cause the UE 10 to switch to the data transmission and reception through LTE. More precisely, with the RSRP that is included in the threshold in the RAN policy from the eNB 45, in response to the RSRP, the UE 10 can switch to the data transmission and reception through LTE.

Furthermore, in a case where the RSRQ is included in the threshold in the RAN policy, in response to the RSRQ, the eNB 45 can cause the UE 10 to switch to the data transmission and reception through LTE. More precisely, with the RSRQ that is included in the threshold in the RAN policy from the eNB 45, in response to the RSRQ, the UE 10 can switch to the data transmission and reception through LTE.

Furthermore, in a case where the BSS load is included in the threshold in the RAN policy, in response to the BSS load, the eNB 45 can cause the UE 10 to switch to the data transmission and reception through LTE. More precisely, with the BSS load that is included in the threshold in the RAN policy from the eNB 45, in response to the BSS load, the UE 10 can switch to the data transmission and reception through LTE.

Furthermore, in a case where the OPI is included in the RAN policy, with the OPI, the eNB 45 can cause the UE 10 to provide the indication of the priority levels of the ANDSF policy and the RAN policy, to preferentially execute the ANDSF policy or the RAN policy, and to switch the access system. Furthermore, with the OPI that is included the RAN policy from the eNB 45, the UE 10 can provide the indication of the priority levels of the ANDSF policy and the RAN policy, can preferentially execute the ANDSF policy or the RAN policy, and can switch the access system.

At this point, in a case where the threshold is included in the ANDSF policy and the threshold is included in the RAN policy, the UE 10 may give precedence to the threshold in the ANDSF policy and may give precedence to the RAN policy. Moreover, when it comes to a determination of the priority levels of the ANDSF policy and the RAN policy, the determination may be made using the OPI that is included in the ANDSF policy and the OPI that is included in the RAN policy. Furthermore, in a case where the OPI is included neither in the ANDSF policy, nor in the RAN policy, the UE 10 may arbitrarily determine the priority levels of the ANDSF policy and the RAN policy.

Communication path switching processing will be described below as a communication path switching procedure 1 (S1508).

Based on at least one or two policies among the UE policy, the operator policy, and the RAN policy, the UE 10 switches a communication path that is used for the communication in the flow 1 from the communication path 1 to the communication path 2.

A specific switching procedure and processing by each apparatus that is involved in the procedure may be almost the same as those in the WLAN_ANa attachment procedure, which are described in 1.3.1.2. For this reason, descriptions are provided with an emphasis on a difference with the attachment procedure, referring to FIG. 12 that is used when the WLAN_ANa attachment procedure is described.

When it comes to a timing at which a trigger message that is to be transmitted by the UE 10 is transmitted, the transmission may be performed based on the determination of the switching by the policy reception processing (S1506).

The UE 10 may transmit the information for identifying the communication, in a state of being further included in the trigger message. Furthermore, identification information indicating switching means may be transmitted in a state of being further included.

The WLAN_ANa 70 may transmit the information for identifying the communication, in a state of being further included in the session generation request or the proxy binding update. Furthermore, the identification information indicating the switching means may be transmitted in the state of being further included.

The PGW 40 may transmit the information for identifying the communication, in a state of being further included in the session response or the proxy binding response. Furthermore, the identification information indicating the switching means may be transmitted in the state of being further included.

The WLAN_ANa 70 may transmit the information for identifying the communication, in a state of being further included in the trigger response. Furthermore, the identification information indicating the switching means may be transmitted in the state of being further included.

Moreover, the information for identifying the communication may be information for identifying the flow 1. Furthermore, the identification information indicating the switching means may be identification information indicating that a specific flow is switched without changing an IP address. Alternatively, the identification information indicating the switching means may be identification information indicating switching means such as Network Based IP Flow Mobility (NB_IFOM).

Furthermore, because the UE 10, the WLAN_ANa, and the PGW 40 already establish the communication path 2, with this procedure, a communication path may not be newly established. More specifically, a communication resource and the like do not need to be newly allocated.

The UE 10, the WLAN_ANa, and the PGW 40 already perform the communication in the flow 3 using the communication path 2, and with the present procedure, performs the communications in the flow 2 and the flow 3 using the communication path 2.

More specifically, in the present procedure, the UE 10, the WLAN_ANa, and the PGW 40 perform a path configuration in order that a communication in the flow 2 is performed using the communication path 2. In other words, with the present procedure, the UE 10, the WLAN_ANa, and the PGW 40 acquire information for identifying a communication that is indispensable for the path configuration, and performs the communication in the flow 2 using the communication path 2.

With the procedure described above, the UE 10 can continue the communication in the flow 1 using the communication path 2 (S1512). Moreover, the UE 10 continues the communication in the flow 3 using the communication path 2. Moreover, the UE 10 continues the communication in the flow 2 using the communication path 1 (S1510).

[1.3.1.6 Second Example of the Switching Procedure in which the Policy of the Type 2 is Used]

In the first example of the switching procedure in which the policy of the type 2 is used, which is described in 1.3.1.5, as an example, the communication path 2 is described as being the communication path for the connection to the PGW 40 through the WLAN_ANa 70.

Furthermore, the communication path 2 may be a communication path for the connection to the PGW 40 through the WLAN_ANb 75.

A switching procedure in which the UE 10 uses the policy of the type 2 will be described below referring to FIG. 15.

As illustrated in FIG. 15, the UE 10 in an initial state, establishes the communication path 1, and performs the communications in the flow 1 and the flow 2 (S1502). Additionally, the UE 10 establishes the communication path 2 in addition to the communication path 1, and performs a communication in a flow 3 (S1504). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the WLAN_ANb 75. Additionally, the UE 10 may establish the communication path 1 in the state of being associated with the APN 1. In this manner, in the UE 10 and the PGW 40, the APN 1 and the communication path 2 are associated with each other, and identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying a communication and the communication path 1 correspond to each other are described when the WLAN_ANb access procedure is described in 1.3.1.3, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Next, the UE 10 performs the policy reception processing (S1506). This policy reception processing may be the same processing and procedure as the policy reception processing that is described in 1.3.1.5. For this reason, detailed descriptions thereof are omitted.

Communication path switching processing will be described below as a communication path switching procedure 1 (S1508). Based on at least one or two policies among the UE policy, the operator policy, and the RAN policy, the UE 10 switches a communication path that is used for the communication in the flow 1 from the communication path 1 to the communication path 2.

A specific switching procedure and processing by each apparatus that is involved in the procedure may be almost the same as those in the WLAN_ANb attachment procedure that is described in 1.3.1.3. For this reason, descriptions are provided with an emphasis on a difference with the attachment procedure, referring to FIG. 13 that is used when the WLAN_ANb attachment procedure is described.

When it comes to a timing at which a control message that is a trigger to start a procedure for establishing the security association, which is to be transmitted by the UE 10, is transmitted, the transmission may be performed based on the determination of the switching by the policy reception processing (S1506).

Furthermore, the UE 10 may transmit the information for identifying the communication, in a state of being further included in the message that is a trigger. Furthermore, the identification information indicating the switching means may be transmitted in the state of being further included.

At this point, the message that is a trigger is as described in 1.3.1.3, and may be a control message that is transmitted by the UE 10 to the ePDG 65 in the IKE v2 authentication procedure.

The ePDG 65 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in a state of being further included in the response message that is a trigger. Furthermore, the identification information indicating the switching means may be transmitted in the state of being further included.

Moreover, the response message that is a trigger is as described in 1.3.1.3, and may be an IKE v2 response message.

Moreover, the information for identifying the communication may be information for identifying the flow 1. Furthermore, the identification information indicating the switching means may be identification information indicating that a specific flow is switched without changing the IP address. Alternatively, the identification information indicating the switching means may be identification information indicating switching means such as the Network Based IP Flow Mobility (NB_IFOM).

Furthermore, because the UE 10, the ePDG 65, and the PGW 40 already establish the communication path 2, with this procedure, the communication path may not be newly established. More specifically, the communication resource and the like do not need to be newly allocated.

The UE 10, the ePDG 65, and the PGW 40 already perform the communication in the flow 3 using the communication path 2, and with the present procedure, performs the communications in the flow 2 and the flow 3 using the communication path 2.

More specifically, in the present procedure, the UE 10, the ePDG 65, and the PGW 40 perform the path configuration in order that the communication in the flow 2 is performed using the communication path 2. In other words, with the present procedure, the UE 10, the ePDG 65, and the PGW 40 acquire the information for identifying the communication that is indispensable for the path configuration, and performs the communication in the flow 2 using the communication path 2.

With the procedure described above, the UE 10 can continue the communication in the flow 1 using the communication path 2 (S1512). Moreover, the UE 10 continues the communication in the flow 3 using the communication path 2. Moreover, the UE 10 continues the communication in the flow 2 using the communication path 1 (S1510).

[1.3.1.7 Third Example of the Switching Procedure in which the Policy of the Type 2 is Used]

In the first example of the switching procedure in which the policy of the type 2 is used, which is described in 1.3.1.5, as an example, the communication path 2 is described as being the communication path for the connection to the PGW 40 through the WLAN_ANa 70.

Furthermore, the communication path 2 may be a communication path that is established using the DSMIP.

A switching procedure in which the UE 10 uses the policy of the type 2 will be described below referring to FIG. 15.

As illustrated in FIG. 15, the UE 10 in an initial state, establishes the communication path 1, and performs the communications in the flow 1 and the flow 2 (S1502). Additionally, the UE 10 establishes the communication path 2 in addition to the communication path 1, and performs a communication in a flow 3 (S1504). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying the communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 using the DSMIP. Additionally, the UE 10 may establish the communication path 1 in the state of being associated with the APN 1. In this manner, in the UE 10 and the PGW 40, the APN 1 and the communication path 2 are associated with each other, and identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying a communication and the communication path 1 correspond to each other are described when the attachment procedure in which the DSMIP is used is described in 1.3.1.4, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Next, the UE 10 performs the policy reception processing (S1506). This policy reception processing may be the same processing and procedure as the policy reception processing that is described in 1.3.1.5. For this reason, detailed descriptions thereof are omitted.

Communication path switching processing will be described below as a communication path switching procedure 1 (S1508).

Based on at least one or two policies among the UE policy, the operator policy, and the RAN policy, the UE 10 switches a communication path that is used for the communication in the flow 1 from the communication path 1 to the communication path 2.

A specific switching procedure and processing by each apparatus that is involved in the procedure may be almost the same as those in the attachment procedure in which the DSMIP is used, which are described in 1.3.1.4. For this reason, descriptions are provided with an emphasis on a difference with the attachment procedure, referring to FIG. 14 that is used when the WLAN_ANb attachment procedure is described.

In the case of a state where the security association that is established in the attachment procedure is established, the UE 10 does not need to newly establish a security association. However, in a case where the security association needs to be anew established, such as a case where a timer or the like that is associated with the security association is managed and where the timer expires, the UE 10 again establishes the security association. An establishment procedure may be the same as the procedure or processing that is described in 1.3.1.4.

Moreover, in a case where the security association is reestablished, when it comes to a timing at which a control message that is a trigger to start the security association, which is transmitted by the UE 10, is transmitted, the transmission may be performed based on the determination of the switching by the policy reception processing (S1506).

The UE 10 may transmit the information for identifying the communication, in a state of being further included in the binding update message. Furthermore, the identification information indicating the switching means may be transmitted in the state of being further included.

Moreover, when it comes to a timing at which the binding update message that is transmitted by the UE 10 is transmitted, the transmission may be performed based on the determination of the switching by the policy reception processing (S1506), and the transmission may be performed based on the reestablishment of the security association.

The ePDG 65 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the trigger response. Furthermore, the identification information indicating the switching means may be transmitted in the state of being further included.

Moreover, the information for identifying the communication may be information for identifying the flow 1. Furthermore, the identification information indicating the switching means may be identification information indicating that a specific flow is switched without changing the IP address. Alternatively, the identification information indicating the switching means may be identification information indicating switching means such as IP Flow Mobility (IFOM).

Furthermore, because the UE 10, the ePDG 65, and the PGW 40 already establish the communication path 2, with this procedure, the communication path may not be newly established. More specifically, the communication resource and the like do not need to be newly allocated.

The UE 10, the ePDG 65, and the PGW 40 already perform the communication in the flow 3 using the communication path 2, and with the present procedure, performs the communications in the flow 2 and the flow 3 using the communication path 2.

More specifically, in the present procedure, the UE 10, the ePDG 65, and the PGW 40 perform the path configuration in order that the communication in the flow 2 is performed using the communication path 2. In other words, with the present procedure, the UE 10, the ePDG 65, and the PGW 40 acquire the information for identifying the communication that is indispensable for the path configuration, and performs the communication in the flow 2 using the communication path 2. With the procedure described above, the UE 10 can continue the communication in the flow 1 using the communication path 2 (S1512). Moreover, the UE 10 continues the communication in the flow 3 using the communication path 2. Moreover, the UE 10 continues the communication in the flow 2 using the communication path 1 (S1510).

[1.3.2. Control Procedure in which a Policy of the Type 3 is Used]

The present example, that is, an example in which the UE 10 switches a communication path using the ANDSF policy and the RAN policy of the type 3, which are illustrated in a third example of the policy in FIG. 5(c), is described.

First, an LTE attachment procedure, a WLAN_ANa attachment procedure, a WLAN_ANb attachment procedure, and an attachment procedure in which the DSMIP is used, all of which lead to the initial state of the UE 10 where the control procedure in which the policy according to the present embodiment is used is executed, are described.

[1.3.2.1 LTE Attachment Procedure]

The UE 10 establishes a communication path through the LTE access system (LTE_AN 80). An LTE attachment procedure may be the same as the LTE attachment procedure that is described in 1.3.1.1 referring to FIG. 11. Moreover, processing by each apparatus that is involved in the attachment procedure may also be the same as that which is described in 1.3.1.1 referring to FIG. 11. For this reason, a detailed description thereof is omitted.

[1.3.2.2 WLAN_ANa Attachment Procedure]

The UE 10 establishes a communication path through the WLAN_ANa 70. A WLAN_ANa 70 attachment procedure may be the same as the WLAN_ANa 70 attachment procedure that is described in 1.3.1.2 referring to FIG. 12. Moreover, processing by each apparatus that is involved in the attachment procedure may also be the same as that which is described in 1.3.1.2 referring to FIG. 12. For this reason, a detailed description thereof is omitted.

[1.3.2.3 WLAN_ANb Attachment Procedure]

The UE 10 establishes a communication path through the WLAN_ANb 70. A WLAN_ANb 70 attachment procedure may be the same as the WLAN_ANa 70 attachment procedure that is described in 1.3.1.3 referring to FIG. 13. Moreover, processing by each apparatus that is involved in the attachment procedure may also be the same as that which is described in 1.3.1.3 referring to FIG. 13. For this reason, a detailed description thereof is omitted.

[1.3.2.4 Attachment Procedure in which the DSMIP is Used]

The UE 10 establishes the communication path using the DSMIP. An attachment procedure in which the DSMIP is used is the same as the attachment procedure in which the DSMIP is used, which is described in 1.3.1.4 referring to FIG. 13. Moreover, processing by each apparatus that is involved in the attachment procedure may also be the same as that which is described in 1.3.1.4 referring to FIG. 13. For this reason, a detailed description thereof is omitted.

With the attachment procedure in which the DSMIP is used, the UE 10 can establish the communication path through the WLAN_ANa 70 or the communication path through the WLAN_ANb 75.

[1.3.2.5 First Example of a Switching Procedure in which the Policy of the Type 3 is Used]

Figure 16:
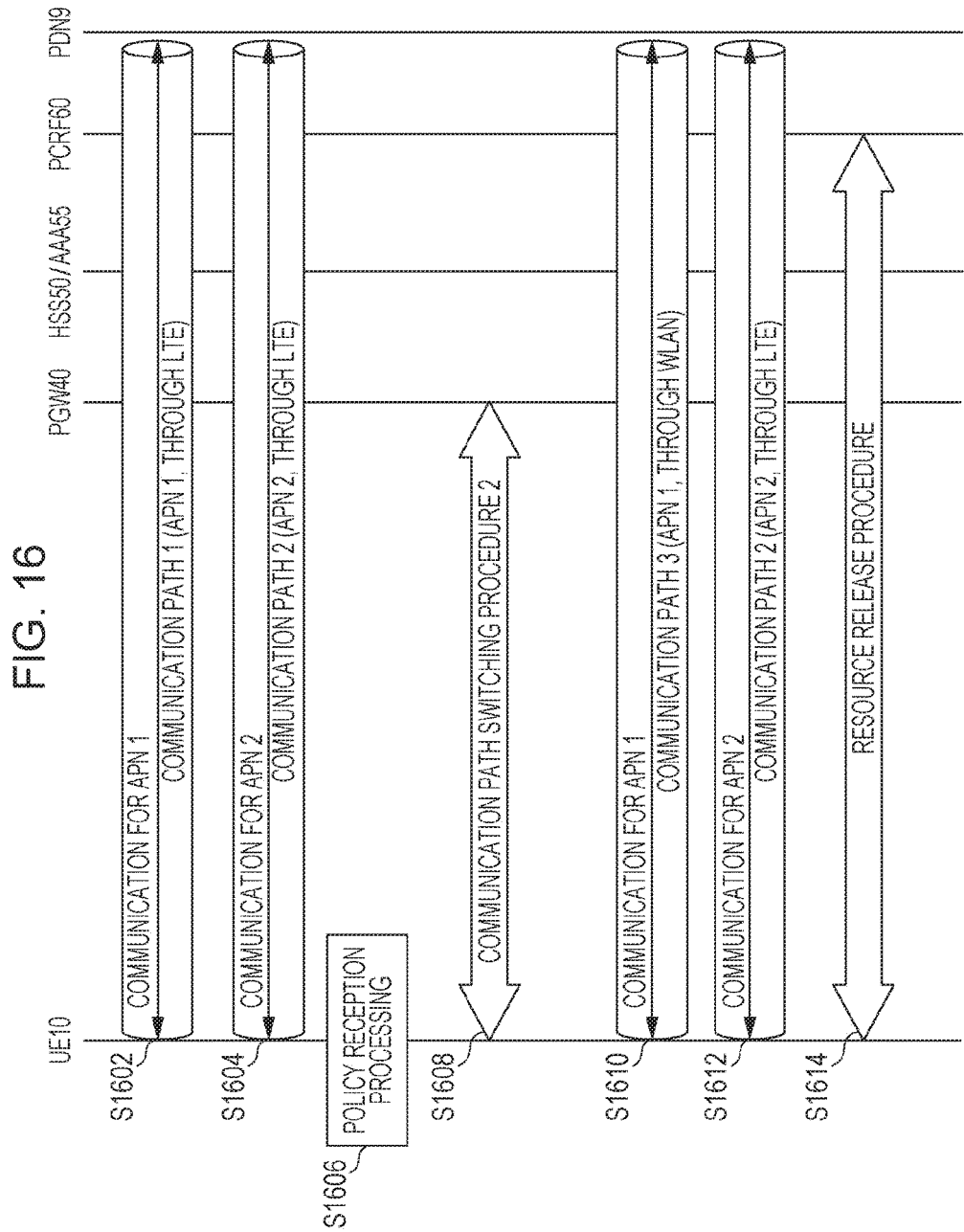
FIG. 16 is a diagram for describing the procedure for switching the access network according to the first embodiment.

Next, a switching procedure in which the UE 10 uses the policy of the type 3 is described referring to FIG. 16.

As illustrated in FIG. 16, the UE 10 in the initial state establishes the communication path 1, and performs the communication that is associated with the APN (S1602). For example, the UE 10 may perform a communication using the communication path 1, in the state of being associated with the APN 1. Additionally, the UE 10 establishes the communication path 2 in addition to the communication path 1, and performs the communication that is associated with the APN (S1604). For example, the UE 10 may manage the communication path 2 in the state of being associated with the APN 2, and may perform these communications using the communication path 2.

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 1 in the state of being associated with the APN 2. In this manner, in the UE 10 and the PGW 40, the APN 2 and the communication path 2 are associated with each other.

Moreover, because a specific method of establishing the communication path 2, a management method in which the APN 2 and the communication path 2 correspond to each other, and a management method in which the identification information for identifying a communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1606). An example of the policy reception processing will be described below referring to FIG. 9.

First, the UE 10 executes the procedure for receiving the operator policy. Moreover, whether or not to receive the operator policy may be determined based on the approval information 1 of the approval information 144. More precisely, in the case where the approval information 1 is set to be "APPROVED", the operator policy may be received. Furthermore, in the case where the approval information 1 is set to be "DISAPPROVED", the present procedure may be ended without receiving the operator policy.

A specific example for receiving the operator policy will be described below. The UE 10 searches for the ANDSF 20 and ensures the secure communication with the ANDSF 20 that is found as a result of the search (S904). Various methods in which the UE 10 searches for the ANDSF 20 are considered, and for example, the ANDSF 20 can be searched for by the UE 10 making an inquiry to the DNS server that is installed on the PDN. Various methods in which the UE 10 and the ANDSF 20 secure a secure communication are considered and for example, the IPSec may be used.

Moreover, based on the approval information 1, the UE 10 may search for the ANDSF 20 or may transmit the control message for establishing a secure communication path to the ANDSF 20.

When ensuring the secure communication path between the UE 10 itself and the ANDSF 20, the UE 10 transmits the request for the access network information to the ANDSF 20 (S906).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the UE 10 may transmit the request message. The ANDSF 20 transmits the operator policy notification to the UE 10 (S908). Based on the reception of the request message that is transmitted from the UE 10, the ANDSF 20 may notify the UE 10 of the operator policy notification or may perform the transmission at the timing at which the operator policy is updated or at an arbitrary timing.

The ANDSF 20 may include the operator policy with the ANDSF policy and the approval information being included. At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included. Furthermore, the approval information may be the approval information 2 of the approval information 244.

The UE 10 receives the operator policy notification and acquires the ANDSF policy and the approval information. Accordingly, based on the approval information 1, the UE 10 can receive the operator policy. Furthermore, based on the approval information 1, the UE 10 may store the received ANDSF policy in the UE policy 142, or by performing the updating and so on, may manage the received ANDSF policy as a UE policy. Additionally, based on the approval information 1, the UE 10 may store the approval information 2 that is received from the ANDSF 20, as approval information of the approval information 144, and, by performing the renewal and so on, may manage the received approval information 2, as approval information of the UE.

Next, the UE 10 determines whether or not to receive the RAN policy from the LTE_AN 80. At this point, based on the approval information 2 of the approval information 144, the UE 10 may receive the RAN policy. For example, in the case where the approval information 2 is "APPROVED", the RAN policy may be received. Furthermore, in the case where the approval information 2 is "DISAPPROVED", a configuration, such as one in which the reception of the RAN policy is not performed, may be performed.

Furthermore, based on the approval information 2 that is received from the ANDSF 20, the UE 10 may receive the RAN policy, and, based on renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the home mobile operator with which the UE 10 has a contract.

Moreover, the eNB 45 may transmit the RAN policy to multiple terminals in a manner that performs the broadcasting to the base station area, and may transmit the RAN policy only to the UE 10.

Accordingly, based on the approval information 2, the UE 10 can receive the RAN policy.

Moreover, because the approval information 2 does not need necessarily to be transmitted from the ANDSF 20, the RAN policy can be received based on the UE policy, not based on the operator policy. For example, as illustrated in FIG. 19, even in the communication system for which the ANDSF is not configured, the UE 10 can control whether or not to use the RAN policy, based on the approval information 2.

Next, using the operator policy, the RAN policy, or both, the UE 10 makes a selection of the access system and makes a determination of the communication path switching procedure (S912).

In the present example, that is, an example in which, based on the policy of the type 3 whose target is a communication that is associated with the APN 1, which is stored by the UE 10 in the UE policy 142, and on the RAN policy that is transmitted by the eNB 45, a communication path for the communication that is associated with the APN 1 is switched is described.

Moreover, the ANDSF policy that is stored in the UE policy 142 is the policy of the type 3. This means that, based on the approval information 1, although the UE policy 142 is updated with what is received from the ANDSF 20, any that is stored in the UE policy 142 may be available.

Furthermore, as described so far, the information for identifying the communication, the access network information, the priority level of the access network, and the threshold are stored in the ANDSF policy, in the state of being associated with one another. Additionally, the access network information and the threshold are stored in the RAN policy, in the state of being associated with each other. Specifically, the information for identifying the communication is information for identifying the APN 1, is information indicating LTE and WLAN in the access network information, and is information indicating that LTE takes precedence in terms of the priority level of the access network. Moreover, specifically, the information for identifying the communication may be an APN for identifying the APN 1.

Based on the RAN policy, the UE 10 may determine the switching of the communication path based on the RAN policy. The UE 10 may determine switching, based on at least one or two pieces of information, among the RSRP, the RSRQ, and the OPI, which are included in the RAN policy.

Furthermore, the communication path to the switching destination and the communication data for performing the switching may be determined based on the ANDSF policy.

Specifically, because the information for identifying the communication for the ANDSF policy is information for identifying the APN 1, WLAN is stored as an available access network, it may be determined that communication which is associated with to the APN 1 is switched to the communication path that uses WLAN. Furthermore, from the fact that the ANDSF policy is the policy of the type 3, the switching means may determine that switching of an APN base is performed.

With the procedure described above, the policy reception processing (S1606) is completed.

In the case of the policy of the type 3 that is illustrated in the third example of the policy in FIG. 5(c), as an example of the policy which the ANDSF 20 notifies the UE 10 of, the APN and the routing rule may be included.

With the inclusion of the APN and the routing rule, the ANDSF 20 can cause the UE 10 to switch the access system according to the APN. More precisely, for every APN that is included in the ANDSF policy from the ANDSF 20, the UE 10 can switch the access system.

On the other hand, the information indicating the access network that takes precedence within the policy is included in the routing rule. Because a routing rule is the same as for the policy of the type 2 that is illustrated in the second example of the policy in FIG. 5(b), which is described in 1.3.1.5, a detailed description thereof is omitted.

Furthermore, in the case of the policy of the type 3, the ANDSF 20 may cause the routing reference, the rule priority, the threshold 1 and the OPI 1 to be included, in addition to the APN and the routing rule.

Moreover, because a routing reference is the same as for the policy of the type 2 that is described in 1.3.1.5, a detailed description thereof is omitted. Furthermore, because rule priority is the same as for the policy of the type 2 that is described in 1.3.1.5, a detailed description thereof is omitted. Furthermore, because the threshold 1 is the same as for the policy of the type 2, a detailed description thereof is omitted. Furthermore, because the OPI 1 is the same as for the policy of the type 2 that is described in 1.3.1.5, a detailed description thereof is omitted.

Among the routing reference, the rule priority, the threshold 1 and the OPI 1 in addition to the APN and the routing rule, any one is described above as being included, but with the inclusion of multiple pieces of information among the routing reference, the rule priority, the threshold 1, and the OPI 1 in addition to the APN and the routing rule, the UE 10 may be caused to execute the ANDSF policy and to switch the access system.

More precisely, with the multiple pieces of information among the routing reference, the rule priority, the threshold 1, and the OPI 1, in addition to the APN and the routing rule, which are included in the ANDSF policy from the ANDSF 20, the UE 10 can switch the access system.

Furthermore, with the threshold that is included in the RAN policy from the eNB 45, the UE 10 may switch the access system. Moreover, because the method that is described in 1.3.1.5 can be used for determination of the switching of the access system in the RAN policy, a detailed description thereof is omitted.

More precisely, the threshold in the RAN policy is the same as that in the policy of the type 2. Furthermore, the OPI in the RAN policy is the same as that in the policy of the type 2, which is described in 1.3.1.5.

Moreover, in the case where the threshold is included in the ANDSF policy and the threshold is included in the RAN policy, the UE 10 may give precedence to the threshold in the ANDSF policy and may give precedence to the RAN policy. Moreover, when it comes to the determination of the priority levels of the ANDSF policy and the RAN policy, the determination may be made using the OPI that is included in the ANDSF policy and the OPI that is included in the RAN policy. Furthermore, in the case where the OPI is included neither in the ANDSF policy, nor in the RAN policy, the UE 10 may arbitrarily determine the priority levels of the ANDSF policy and the RAN policy.

The communication path switching processing will be described below as a communication path switching procedure 2 (S1608). Based on at least one or two policies among the UE policy, the operator policy, and the RAN policy, the UE 10 switches the communication path that is used for a communication for the APN 1, from the communication path 1 to the communication path 3. Moreover, in the switching, the UE 10 newly establishes a communication path 3. Moreover, the UE 10 establishes the communication path 3 based on the APN 1. At this point, the APN 1 is the same as the APN that is associated with the communication path 1.

A specific procedure for establishing the communication path 3 and processing by each apparatus that is involved in the procedure may be almost the same as those in the WLAN_ANa attachment procedure, which are described in 1.3.1.2. For this reason, descriptions are provided with an emphasis on a difference with the attachment procedure, referring to FIG. 12 that is used when the WLAN_ANa attachment procedure is described.

When it comes to the timing at which the trigger message that is to be transmitted by the UE 10 is transmitted, the transmission may be performed based on the determination of the switching by the policy reception processing (S1606).

The UE 10 may transmit the information for identifying the communication, in the state of being further included in the trigger message. Furthermore, the identification information indicating the switching means may be transmitted in the state of being further included.

The WLAN_ANa 70 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the trigger response. Furthermore, the identification information indicating the switching means may be transmitted in the state of being further included.

Moreover, the information for identifying the communication may be information for identifying the APN 1. Furthermore, the identification information indicating the switching means may be identification information indicating that a communication path for a communication that is associated with a specific APN is switched. Alternatively, the identification information indicating the switching means may be identification information indicating switching means, such as Multi Access PDN connectivity (MAPCON).

Moreover, information for identifying a specific communication, such as information for identifying the flow, as well as the APN, may be transmitted in a state of being included in the information for identifying the communication.

With the present procedure, the UE 10, the WLAN_ANa, and the PGW 40 perform the communication that is associated with the APN 1, using the communication path 3.

Moreover, in the present procedure, the UE 10, the WLAN_ANa, and the PGW 40 perform the path configuration in order that the communication which is associated with the APN 1 is performed using the communication path 3. In other words, with the present procedure, the UE 10, the WLAN_ANa, and the PGW 40 acquire the information for identifying the communication that is indispensable for the path configuration, and performs the communication that is associated with the APN 1, using the communication path 3. Moreover, the communication that is associated with the APN 1 may be communications in the flow 1 and the flow 2.

With the procedure described above, the UE 10 can continue the communication that is associated with the APN 1, using the communication path 3 (S1610). Moreover, the UE 10 continues the communication that is associated with the APN 2, using the communication path 2 (S1612).

Additionally, the UE 10 and the PGW 10 may execute a resource release procedure (S1614). With the resource release procedure, the UE 10 and the PGW 10 may execute communication path deletion processing such as release of a resource for the communication path 1 or deletion of communication path information.

[1.3.2.6 Second Example of the Switching Procedure in which the Policy of the Type 3 is Used]

In the first example of the switching procedure in which the policy of the type 2 is used, which is described in 1.3.2.5, as an example, the communication path 3 is described as being the communication path for the connection to the PGW 40 through the WLAN_ANa 70.

Furthermore, the communication path 3 may be a communication path for the connection to the PGW 40 through the WLAN_ANb 75.

The switching procedure in which the UE 10 uses the policy of the type 3 will be described below referring to FIG. 16. As illustrated in FIG. 16, the UE 10 in the initial state establishes the communication path 1, and performs the communication that is associated with the APN (S1602). For example, the UE 10 may manage the communication path 1 in the state of being associated with is associated with the APN 1 and may perform the communication using the APN 1. Additionally, the UE 10 establishes the communication path 2 in addition to the communication path 1, and performs the communication that is associated with the APN (S1604). For example, the UE 10 may manage the communication path 2 in the state of being associated with the APN 2, and may perform these communications using the APN 2.

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 2 in the state of being associated with the APN 2. In this manner, in the UE 10 and the PGW 40, the APN 2 and the communication path 2 are associated with each other.

Moreover, because a specific method of establishing the communication path 2, a management method in which the APN 2 and the communication path 2 correspond to each other, and a management method in which the identification information for identifying a communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1606). This policy reception processing may be the same processing and procedure as the policy reception processing that is described in 1.3.2.5. For this reason, detailed descriptions thereof are omitted.

The communication path switching processing will be described below as a communication path switching procedure 2 (S1608).

Based on at least one or two policies among the UE policy, the operator policy, and the RAN policy, the UE 10 switches the communication path that is used for the communication for the APN 1, from the communication path 1 to the communication path 3. Moreover, in the switching, the UE 10 newly establishes the communication path 3. Moreover, the UE 10 establishes the communication path 3 based on the APN 1. At this point, the APN 1 is the same as the APN that is associated with the communication path 1.

A specific procedure for establishing the communication path 3 and processing by each apparatus that is involved in the procedure may be almost the same as those in the WLAN_ANb attachment procedure, which are described in 1.3.1.3. For this reason, descriptions are provided with an emphasis on a difference with the attachment procedure, referring to FIG. 13 that is used when the WLAN_ANb attachment procedure is described.

When it comes to the timing at which the control message that is the trigger to start the procedure for establishing the security association, which is transmitted by the UE 10, the transmission may be performed based on the determination of the switching by the policy reception processing (S1606).

Furthermore, the UE 10 may transmit the information for identifying the communication, in the state of being further included in the message that is a trigger. Furthermore, the identification information indicating the switching means may be transmitted in the state of being further included.

At this point, the message that is a trigger is as described in 1.3.1.3, and may be a control message that is transmitted by the UE 10 to the ePDG 65 in the IKE v2 authentication procedure.

The ePDG 65 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the response message that is a trigger. Furthermore, the identification information indicating the switching means may be transmitted in the state of being further included.

Moreover, the response message that is a trigger is as described in 1.3.1.3, and may be an IKE v2 response message.

Moreover, the information for identifying the communication may be information for identifying the APN 1. Furthermore, the identification information indicating the switching means may be identification information indicating that the communication path for the communication that is associated with a specific APN is switched. Alternatively, the identification information indicating the switching means may be identification information indicating switching means, such as the Multi Access PDN connectivity (MAPCON).

With the present procedure, the UE 10, the ePDG 65, and the PGW 40 perform the communication that is associated with the APN 1, using the communication path 3. In more detail, the UE 10 performs a communication along with the communication path 3 that is associated with the APN 1, using the communication path 3.

Moreover, in the present procedure, the UE 10, the ePDG 65, and the PGW 40 perform the path configuration in order that the communication which is associated with the APN 1 is performed using the communication path 3. In other words, with the present procedure, the UE 10, the ePDG 65, and the PGW 40 acquire the information for identifying the communication that is indispensable for the path configuration, and performs the communication that is associated with the APN 1, using the communication path 3. Moreover, the communication that is associated with the APN 1 may be communications in the flow 1 and the flow 2.

With the procedure described above, the UE 10 can continue the communication that is associated with the APN 1, using the communication path 3 (S1610). Moreover, the UE 10 continues the communication that is associated with the APN 2, using the communication path 2 (S1612).

Additionally, the UE 10 and the PGW 10 may execute a resource release procedure (S1614). With the resource release procedure, the UE 10 and the PGW 10 may execute the communication path deletion processing such as the release of the resource for the communication path 1 or the deletion of the communication path information.

[1.3.2.7 Third Example of the Switching Procedure in which the Policy of the Type 3 is Used]

In the first example of the switching procedure in which the policy of the type 2 is used, which is described in 1.3.2.5, as an example, the communication path 3 is described as being the communication path for the connection to the PGW 40 through the WLAN_ANa 70.

Furthermore, the communication path 3 may be a communication path that is established using the DSMIP.

The switching procedure in which the UE 10 uses the policy of the type 3 will be described below referring to FIG. 16.

As illustrated in FIG. 16, the UE 10 in the initial state establishes the communication path 1, and performs the communication that is associated with the APN (S1602). For example, the UE 10 may manage the flow 1 and the flow 2 in the state of being associated with the APN 1, and may perform these communications using the communication path 1. Additionally, the UE 10 establishes the communication path 2 in addition to the communication path 1, and performs the communication that is associated with the APN (S1604). For example, the UE 10 may manage the flow 3 in the state of being associated with the APN 2, and may perform these communications using the communication path 1.

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 1 in the state of being associated with the APN 2. In this manner, in the UE 10 and the PGW 40, the APN 2 and the communication path 2 are associated with each other.

Moreover, because a specific method of establishing the communication path 2, a management method in which the APN 2 and the communication path 2 correspond to each other, and a management method in which the identification information for identifying the communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1606). This policy reception processing may be the same processing and procedure as the policy reception processing that is described in 1.3.2.5. For this reason, detailed descriptions thereof are omitted.

The communication path switching processing will be described below as the communication path switching procedure 1 (S1608).

Based on at least one or two policies among the UE policy, the operator policy, and the RAN policy, the UE 10 switches a communication path that is used for the communication that is associated with the APN 1, from the communication path 1 to the communication path 3. Moreover, in the switching, the UE 10 newly establishes the communication path 3. Moreover, the UE 10 establishes the communication path 3 based on the APN 1. At this point, the APN 1 is the same as the APN that is associated with the communication path 1.

A specific procedure for establishing the communication path 3, and processing by each apparatus that is involved in the procedure may be almost the same as those in the attachment procedure in which the DSMIP is used, which are described in 1.3.1.4. For this reason, descriptions are provided with an emphasis on a difference with the attachment procedure, referring to FIG. 14 that is used when the WLAN_ANb attachment procedure is described.

The transmission may be performed based on the trigger for the UE 10 to start the security association and on the determination of the switching by the policy reception processing (S1506). When it comes to a timing at which a control message that is a trigger for the UE 10 to start the security association is transmitted, the transmission may be performed based on the determination of the switching by the policy reception processing (S1506).

Furthermore, the UE 10 may transmit the information for identifying the communication, in the state of being further included in the binding update message. Furthermore, the identification information indicating the switching means may be transmitted in the state of being further included.

Moreover, when it comes to the timing at which the binding update message that is transmitted by the UE 10 is transmitted, the transmission may be performed based on the determination of the switching by the policy reception processing (S1606), and the transmission may be performed based on the establishment of the security association.

The UE 10 may transmit the information for identifying the communication, in the state of being further included in the binding update. Furthermore, the identification information indicating the switching means may be transmitted in the state of being further included.

The PGW 40 may transmit the information for identifying the communication, in a state of being further included in the binding response. Furthermore, the identification information indicating the switching means may be transmitted in the state of being further included.

Moreover, the information for identifying the communication may be information for identifying the APN 1. Furthermore, the identification information indicating the switching means may be identification information indicating that the communication path for the communication that is associated with a specific APN is switched. Alternatively, the identification information indicating the switching means may be identification information indicating switching means, such as the Multi Access PDN connectivity (MAPCON).

With the present procedure, the UE 10, the ePDG 65, and the PGW 40 perform the communication that is associated with the APN 1, using the communication path 3. In more detail, the UE 10 performs the communication along with the communication path 3 that is associated with the APN 1.

Moreover, in the present procedure, the UE 10, the ePDG 65, and the PGW 40 perform the path configuration in order that the communication which is associated with the APN 1 is performed using the communication path 3. In other words, with the present procedure, the UE 10, the ePDG 65, and the PGW 40 acquire the information for identifying the communication that is indispensable for the path configuration, and performs the communication that is associated with the APN 1, using the communication path 3. Moreover, the communication that is associated with the APN 1 may be communications in the flow 1 and the flow 2.

With the procedure described above, the UE 10 can continue the communication that is associated with the APN 1, using the communication path 3 (S1610). Moreover, the UE 10 continues the communication that is associated with the APN 2, using the communication path 2 (S1612).

Additionally, the UE 10 and the PGW 10 may execute the resource release procedure (S1614). With the resource release procedure, the UE 10 and the PGW 10 may execute the communication path deletion processing such as the release of the resource for the communication path 1 or the deletion of the communication path information.

[1.3.3 Control Procedure in which a Policy of the Type 1 is Used]

The present example, that is, an example in which the UE 10 switches a communication path using the ANDSF policy and the RAN policy of the type 1, which are illustrated in a first example of the policy in FIG. 5(*a*), is described.

First, an LTE attachment procedure, a WLAN_ANa attachment procedure, a WLAN_ANb attachment procedure, and an attachment procedure in which the DSMIP is used, all of which lead to the initial state of the UE 10 where the control procedure in which the policy according to the present embodiment is used is executed, are described.

[1.3.3.1 LTE Attachment Procedure]

The UE 10 establishes the communication path through the LTE access system (the LTE_AN 80). An LTE attachment procedure may be the same as the LTE attachment procedure that is described in 1.3.1.1 referring to FIG. 11. Moreover, processing by each apparatus that is involved in the attachment procedure may also be the same as that which is described in 1.3.1.1 referring to FIG. 11. For this reason, a detailed description thereof is omitted.

[1.3.3.2 WLAN_ANa Attachment Procedure]

The UE 10 establishes the communication path through the WLAN_ANa 70. A WLAN_ANa 70 attachment procedure may be the same as the WLAN_ANa 70 attachment procedure that is described in 1.3.1.2 referring to FIG. 12. Moreover, processing by each apparatus that is involved in the attachment procedure may also be the same as that which is described in 1.3.1.2 referring to FIG. 12. For this reason, a detailed description thereof is omitted.

[1.3.3.3 WLAN_ANb Attachment Procedure]

The UE 10 establishes a communication path through the WLAN_ANb 70. A WLAN_ANb 70 attachment procedure may be the same as the WLAN_ANa 70 attachment procedure that is described in 1.3.1.3 referring to FIG. 13. Moreover, processing by each apparatus that is involved in the attachment procedure may also be the same as that which is described in 1.3.1.3 referring to FIG. 13. For this reason, a detailed description thereof is omitted.

[1.3.3.4 Attachment Procedure in which the DSMIP is Used]

The UE 10 establishes the communication path using the DSMIP. An attachment procedure in which the DSMIP is used is the same as the attachment procedure in which the DSMIP is used, which is described in 1.3.1.4 referring to FIG. 13. Moreover, processing by each apparatus that is involved in the attachment procedure may also be the same as that which is described in 1.3.1.4 referring to FIG. 13. For this reason, a detailed description thereof is omitted.

With the attachment procedure in which the DSMIP is used, the UE 10 can establish the communication path through the WLAN_ANa 70 or the communication path through the WLAN_ANb 75.

[1.3.3.5 First Example of a Switching Procedure in which the Policy of the Type 1 is Used]

Figure 17:
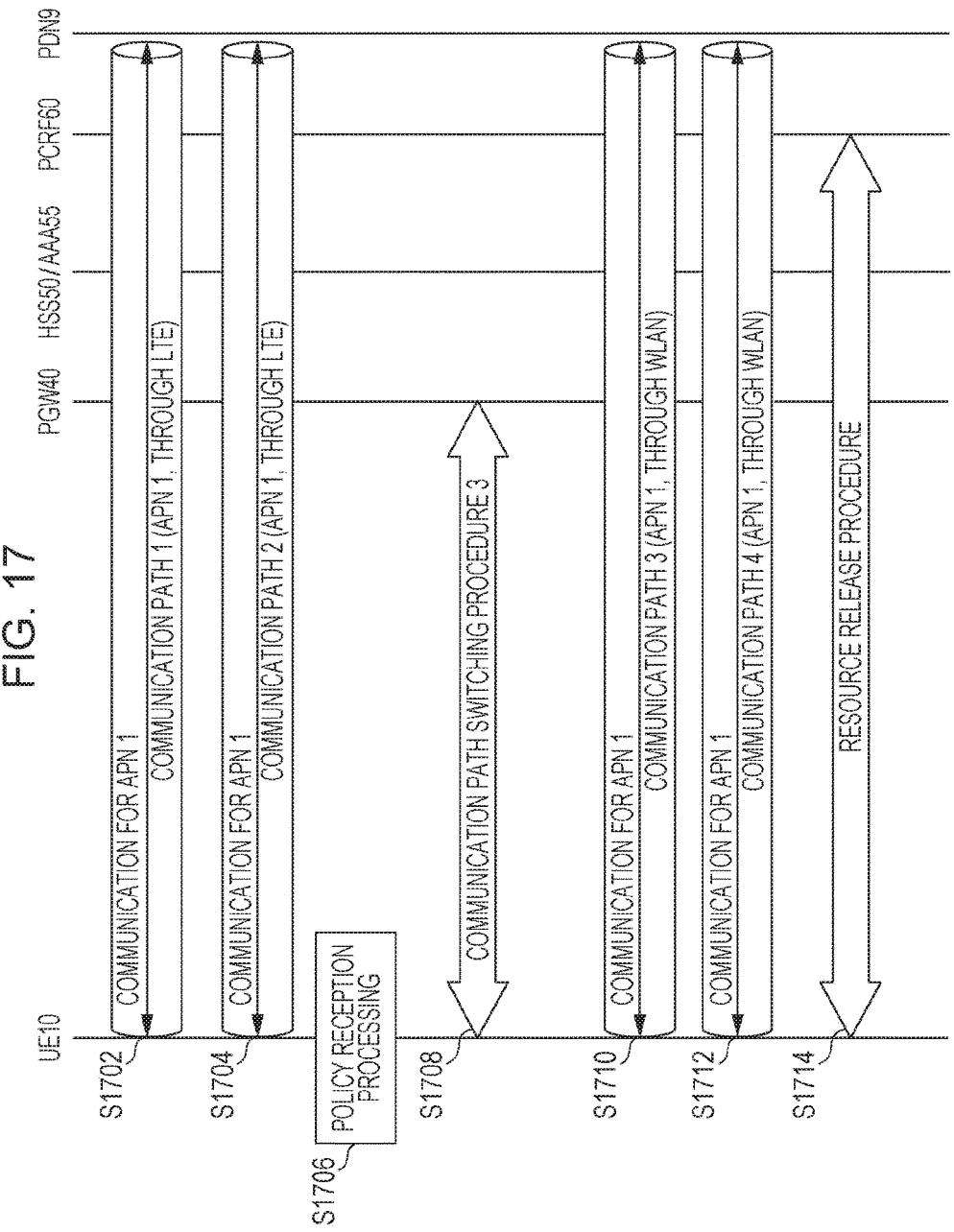
FIG. 17 is a diagram for describing the procedure for switching the access network according to the first embodiment.

Next, a switching procedure in which the UE 10 uses the policy of the type 1 is described referring to FIG. 17.

As illustrated in FIG. 17, the UE 10 in the initial state establishes the communication path 1, and performs the communication that is associated with the APN (S1702). For example, the UE 10 may manage the communication path 1 in the state of being associated with the APN 1, may manage the communication path 2 that is associated with the APN 2, and may perform these communications using the communication path 1 and the communication path 2. Additionally, the UE 10 establishes the communication path 2 in addition to the communication path 1, and performs the communication that is associated with the APN (S1704).

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 1 in the state of being associated with the APN 2. In this manner, in the UE 10 and the PGW 40, the APN 2 and the communication path 2 are associated with each other.

Moreover, because a specific method of establishing the communication path 2, a management method in which the APN 2 and the communication path 2 correspond to each other, and a management method in which the identification information for identifying a communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1706). An example of the policy reception processing will be described below referring to FIG. 9.

First, the UE 10 executes the procedure for receiving the operator policy. Moreover, whether or not to receive the operator policy may be determined based on the approval information 1 of the approval information 144. More precisely, in the case where the approval information 1 is set to be "APPROVED", the operator policy may be received. Furthermore, in the case where the approval information 1 is set to be "DISAPPROVED", the present procedure may be ended without receiving the operator policy.

A specific example for receiving the operator policy will be described below. The UE 10 searches for the ANDSF 20 and secures the secure communication with the ANDSF 20 that is found as the result of the search (S904). Various methods in which the UE 10 searches for the ANDSF 20 are considered, and for example, the ANDSF 20 can be searched for by the UE 10 making an inquiry to the DNS server that is installed on the PDN. Various methods in which the UE 10 and the ANDSF 20 ensure a secure communication are considered and for example, the IPSec may be used.

Moreover, based on the approval information 1, the UE 10 may search for the ANDSF 20 or may transmit the control message for establishing a secure communication path to the ANDSF 20.

When ensuring the secure communication path between the UE 10 itself and the ANDSF 20, the UE 10 transmits the request for the access network information to the ANDSF 20 (S906).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the UE 10 may transmit the request message. The ANDSF 20 transmits the operator policy notification to the UE 10 (S908). Based on the reception of the request message that is transmitted from the UE 10, the ANDSF 20 may notify the UE 10 of the operator policy notification or may perform the transmission at the timing at which the operator policy is updated or at an arbitrary timing.

The ANDSF 20 may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, the approval information may be the approval information 2 of the approval information 244. The UE 10 receives the operator policy notification and acquires the ANDSF policy and the approval information.

Accordingly, based on the approval information 1, the UE 10 can receive the operator policy.

Furthermore, based on the approval information 1, the UE 10 may store the received ANDSF policy in the UE policy 142, or by performing the updating and so on, may manage the received ANDSF policy as a UE policy. Additionally, based on the approval information 1, the UE 10 may store the approval information 2 that is received from the ANDSF 20, as approval information of the approval information 144, and, by performing the renewal and so on, may manage the received approval information 2, as approval information of the UE.

Next, the UE 10 determines whether or not to receive the RAN policy from the LTE_AN 80. At this point, based on the approval information 2 of the approval information 144, the UE 10 may receive the RAN policy. For example, in the case where the approval information 2 is "APPROVED", the RAN policy may be received. Furthermore, in the case where the approval information 2 is "DISAPPROVED", a configuration, such as one in which the reception of the RAN policy is not performed, may be performed.

Furthermore, based on the approval information 2 that is received from the ANDSF 20, the UE 10 may receive the RAN policy, and, based on the renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the home mobile operator with which the UE 10 has a contract.

Moreover, the eNB 45 may transmit the RAN policy to multiple terminals in a manner that performs the broadcasting to the base station area, and may transmit the RAN policy only to the UE 10. Accordingly, based on the approval information 2, the UE 10 can receive the RAN policy.

Moreover, because the approval information 2 does not need necessarily to be transmitted from the ANDSF 20, the RAN policy can be received based on the UE policy, not based on the operator policy. For example, as illustrated in FIG. 19, even in the communication system for which the ANDSF is not configured, the UE 10 can control whether or not to use the RAN policy, based on the approval information 2.

Next, using the operator policy, the RAN policy, or both, the UE 10 makes a selection of the access system and makes a determination of the communication path switching procedure (S912).

In the present example, that is, an example in which, based on the policy of the type 1 whose targets are all communications by the UE 10, which is stored by the UE 10 in the UE policy 142, and on the RAN policy that is transmitted by the eNB 45, the communication path for the communication that is associated with the APN 1 is switched is described.

Moreover, the ANDSF policy that is stored in the UE policy 142 is the policy of the type 1. This means that, based on the approval information 1, although the UE policy 142 is updated with what is received from the ANDSF 20, any that is stored in the UE policy 142 may be available.

Furthermore, as described so far, the information for identifying the communication, the access network information, the priority level of the access network, and the threshold are stored in the ANDSF policy, in the state of being associated with one another. Additionally, the access network information and the threshold are stored in the RAN policy, in the state of being associated with each other. Specifically, the information for identifying the communication is information indicating all communications, is information indicating LTE and WLAN in the access network information, and is information indicating that LTE takes precedence in terms of the priority level of the access network. Moreover, specifically, because the information for identifying the communication is information indicating all communications, all communications may be implicitly identified by not including the identification information, without the identification information being explicitly included in the policy.

Based on the RAN policy, the UE 10 may determine the switching of the communication path based on the RAN policy. The UE 10 may determine the switching, based on at least one or two pieces of information, among the RSRP, the RSRQ, and the OPI, which are included in the RAN policy.

Furthermore, the communication path to the switching destination and the communication data for performing the switching may be determined based on the ANDSF policy. Specifically, because the information for identifying the communication for the ANDSF policy is information for identifying all communications and WLAN is stored as an available access network, it may be determined that all communication by the UE 10 are switched to the communication path that uses WLAN.

Furthermore, from the fact that the ANDSF policy is the policy of the type 1, the switching means may determine that the switching of all communications is performed.

With the procedure described above, the policy reception processing (S1706) is completed.

For example, in the case of the policy of the type 1 that is illustrated in the first example of the policy in FIG. 5(*a*), as an example of the policy which the ANDSF 20 notifies the UE 10 of, the access that takes precedence may be included. With the inclusion of the APN that takes precedence, the ANDSF 20 can cause the UE 10 to switch the access system. More precisely, with the access that takes precedence, which is included in the ANDSF policy from the ANDSF 20, the UE 10 can switch the access system.

Furthermore, in the case of the policy of the type 1, in addition to the access that takes precedence, the ANDSF 20 may cause the information elements, that is, the rule priority, the effective area, the availability and unavailability of the roaming, the PLMN ID, a point in time, the threshold 1, and OPI 1, and availability and unavailability of policy update, to be included.

Moreover, because rule priority is the same as for the policy of the type 2 that is described in 1.3.1.5, a detailed description thereof is omitted. Furthermore, because an effective area is the same as the effective area in the priority reference in the policy of the type 2, which is described in 1.3.1.5, a detailed description thereof is omitted.

Furthermore, with the inclusion of the enabling or disabling of the roaming, using the availability and unavailability of the roaming, the ANDSF 20 can cause the UE 10 to execute the policy and to switch the access system. More precisely, depending on the availability and unavailability of the roaming that is included in the ANDSF policy from the ANDSF 20, the UE 10 can switch the access system.

Furthermore, with the inclusion of the PLMN ID, in a case where the UE 10 serves an area that is indicated by the PLMN ID, the ANDSF 20 can cause the UE 10 to execute the policy and to switch the access system. More precisely, in a case where the UE 10 serves the area that is indicated by the PLMN ID which is included in the ANDSF policy from the ANDSF 20, the UE 10 can execute the policy and can switch the access system.

Furthermore, a point in time is the same as the point in time in the routing reference in the policy of the type 2, which is described in 1.3.1.5, a detailed description thereof is omitted. Furthermore, because the threshold 1 is the same as for the policy of the type 2 that is described in 1.3.1.5, a detailed description thereof is omitted. Furthermore, because the OPI 1 is the same as for the policy of the type 2 that is described in 1.3.1.5, a detailed description thereof is omitted.

Furthermore, with the inclusion of the availability and unavailability of the policy update, the ANDSF 20 can cause the UE 10 to update the policy and switch the access system. More precisely, with the availability and unavailability of the policy update that is included in the ANDSF policy from the ANDSF 20, the UE 10 can update the policy and can switch the access system.

Furthermore, with the threshold that is included in the RAN policy from the eNB 45, the UE 10 may switch the access system. Moreover, because the method that is described in 1.3.1.5 can be used for the determination of the switching of the access system in the RAN policy, a detailed description thereof is omitted.

More precisely, the threshold in the RAN policy is the same as that in the policy of the type 2. Furthermore, the OPI in the RAN policy is the same as that in the policy of the type 2, which is described in 1.3.1.5.

Moreover, in the case where the threshold is included in the ANDSF policy and the threshold is included in the RAN policy, the UE 10 may give precedence to the threshold in the ANDSF policy and may give precedence to the RAN policy. Moreover, when it comes to the determination of the priority levels of the ANDSF policy and the RAN policy, the determination may be made using the OPI that is included in the ANDSF policy and the OPI that is included in the RAN policy. Furthermore, in the case where the OPI is included neither in the ANDSF policy, nor in the RAN policy, the UE 10 may arbitrarily determine the priority levels of the ANDSF policy and the RAN policy.

The communication path switching processing will be described below as a communication path switching procedure 3 (S1708).

Based on at least one or two policies among the UE policy, the operator policy, and the RAN policy, the UE 10 switches all communication paths to the communication path through WLAN. The UE performs the switching of the communication path for every communication that is associated with the APN.

At this point, the UE 10 establishes the communication path using the APN 1 and the APN 2. Therefore, the UE 10 switches the communication path for the communication that is associated with the APN 1, from the communication path 1 to the communication path 3. Additionally, the UE 10 switches the communication path for the communication that is associated with the APN 2, from the communication path 2 to a communication path 4. Moreover, in the switching, the UE 10 newly establishes the communication path 3 and the communication path 4. Moreover, the UE 10 establishes the communication path 3 based on the APN 1. Additionally, the UE 10 establishes the communication path 4 based on the APN 2.

Furthermore, in a case where communication paths for other multiple APN, as well as for the APN 1 and the APN 2 are established, the UE 10 establishes the communication path through WLAN that corresponds to each APN, and switches all communications to the communication path through WLAN.

A specific procedure for establishing the communication path 3 and processing by each apparatus that is involved in the procedure may be almost the same as those in the WLAN_ANa attachment procedure, which are described in 1.3.1.2. For this reason, descriptions are provided with an emphasis on a difference with the attachment procedure, referring to FIG. 12 that is used when the WLAN_ANa attachment procedure is described.

When it comes to the timing at which the trigger message that is to be transmitted by the UE 10 is transmitted, the transmission may be performed based on the determination of the switching by the policy reception processing (S1706). The UE 10 may transmit the information for identifying the communication, in the state of being further included in the trigger message. Furthermore, the identification information indicating the switching means may be transmitted in the state of being further included. The WLAN_ANa 70 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the trigger response. Furthermore, the identification information indicating the switching means may be transmitted in the state of being further included.

Moreover, the information for identifying the communication may be information for identifying the APN 1. Furthermore, the identification information indicating the switching means may be identification information indicating that the communication path for the communication that is associated with a specific APN is switched. Alternatively, the identification information indicating the switching means may be identification information indicating switching means, such as one that switches all communications.

Moreover, the information for identifying a specific communication, such as the information for identifying the flow, as well as the APN, may be transmitted in the state of being included in the information for identifying the communication.

Additionally, the UE 10 establishes the communication path 4 based on the APN 2.

A specific procedure for establishing the communication path 4 and processing by each apparatus that is involved in the procedure may be almost the same as those in the WLAN_ANa attachment procedure, which are described in 1.3.1.2. For this reason, descriptions are provided with an emphasis on a difference with the attachment procedure, referring to FIG. 12 that is used when the WLAN_ANa attachment procedure is described.

When it comes to the timing at which the trigger message that is to be transmitted by the UE 10 is transmitted, the transmission may be performed based on the determination of the switching by the policy reception processing (S1706).

The UE 10 may transmit the information for identifying the communication, in the state of being further included in the trigger message. Furthermore, the identification information indicating the switching means may be transmitted in the state of being further included.

The WLAN_ANa 70 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the trigger response. Furthermore, the identification information indicating the switching means may be transmitted in the state of being further included.

Moreover, the information for identifying the communication may be information for identifying the APN 2. Furthermore, the identification information indicating the switching means may be identification information indicating that the communication path for the communication that is associated with a specific APN is switched. Alternatively, the identification information indicating the switching means may be identification information indicating switching means, such as one that switches all communications.

Moreover, the information for identifying a specific communication, such as the information for identifying the flow, as well as the APN, may be transmitted in the state of being included in the information for identifying the communication.

At this point, in the case where communication paths for other multiple APN, as well as for the APN 1 and the APN 2 are established, the UE 10 establishes the communication path through WLAN that corresponds to each APN, and switches all communications to the communication path through WLAN.

With the present procedure, the UE 10, the WLAN_ANa, and the PGW 40 perform the communication that is associated with the APN 1, using the communication path 3.

Additionally, the UE 10, the WLAN_ANa, and the PGW 40 perform the communication that is associated with the APN 2, using the communication path 4.

Moreover, in the present procedure, the UE 10, the WLAN_ANa, and the PGW 40 perform the path configuration in order that the communication which is associated with the APN 1 is performed using the communication path 3. In other words, with the procedure for establishing the communication path 3, the UE 10, the WLAN_ANa, and the PGW 40 acquire the information for identifying the communication that is indispensable for the path configuration, and performs the communication that is associated with the APN 1, using the communication path 3.

Furthermore, in the present procedure, the UE 10, the WLAN_ANa, and the PGW 40 perform the path configuration in order that the communication which is associated with the APN 2 is performed using the communication path 4. In other words, with the procedure for establishing the communication path 3, the UE 10, the WLAN_ANa, and the PGW 40 acquire the information for identifying the communication that is indispensable for the path configuration, and performs the communication that is associated with the APN 2, using the communication path 4.

With the procedure described above, the UE 10 can continue the communication that is associated with the APN 1, using the communication path 3 (S1710). Additionally, the UE 10 can continue the communication that is associated with the APN 2, using the communication path 4 (S1712).

Additionally, the UE 10 and the PGW 10 may execute the resource release procedure (S1714). With the resource release procedure, the UE 10 and the PGW 10 may execute the communication path deletion processing such as the release of resources for the communication path 1 and the communication path 2 or the deletion of the communication path information.

The communication path 1 through LTE is described above as being established for the APN 1 (S1702), the communication path 2 through LTE as being established for the APN 2 (S1704), and the switching to the communication path 3 through WLAN for the APN 1 and the communication path 4 through WLAN for the APN 2 as taking place as a result of the communication path switching procedure 3 (S1708) after the policy reception processing (S1706).

At this point, the communication path 1 through LTE may be established for the APN 1 (S1702), the communication path 2 through LTE may be established for the APN 1 (S1704), and the switching to the communication path 3 through WLAN for the APN 1 and the communication path 4 through WLAN for the APN 1 may take place as a result of the communication path switching procedure 3 (S1708) after the policy reception processing (S1706).

Furthermore, the communication path 1 through LTE may be established for the APN 1 (S1702), the communication path 2 through LTE may be established for the APN 1 (S1704), and the switching to the communication path 3 through WLAN for the APN 1 may take place as the result of the communication path switching procedure 3 (S1708) after the policy reception processing (S1706).

[1.3.3.6 Second Example of the Switching Procedure in which the Policy of the Type 1 is Used]

In the first example of the switching procedure in which the policy of the type 1 is used, which is described in 1.3.3.5, as an example, the communication path 3 and the communication path 4 are described as being communication paths for the connection to the PGW 40 through the WLAN_ANa 70.

Furthermore, the communication path 3 and the communication path 4 may be communication paths for the connection to the PGW 40 through the WLAN_ANb 75.

The switching procedure in which the UE 10 uses the policy of the type 1 will be described below referring to FIG. 17.

Procedures and processing operations up to and including the policy reception processing (S1706) by each of the apparatuses that include the UE 10 may be the same as the procedures and processing operations that are performed in 1.3.3.6. Specifically, procedures for the communication path 1 and the communication path 2, and processing by each apparatus may be the same as the procedures and processing that are described in 1.3.3.6. For this reason, detailed descriptions thereof are omitted.

Additionally, the UE 10 performs the policy reception processing (S1706). This policy reception processing may be the same processing and procedure as the policy reception processing that is described in 1.3.2.5. For this reason, detailed descriptions thereof are omitted.

The communication path switching processing will be described below as a communication path switching procedure 3 (S1708).

Based on at least one or two policies among the UE policy, the operator policy, and the RAN policy, the UE 10 switches all communication paths to the communication path through WLAN. The UE performs the switching of the communication path for every communication that is associated with the APN.

At this point, the UE 10 establishes the communication path using the APN 1 and the APN 2. Therefore, the UE 10 switches the communication path for the communication that is associated with the APN 1, from the communication path 1 to the communication path 3. Additionally, the UE 10 switches the communication path for the communication that is associated with the APN 2, from the communication path 2 to a communication path 4. Furthermore, moreover, in the switching, the UE 10 newly establishes the communication path 3 and the communication path 4. Moreover, the UE 10 establishes the communication path 3 based on the APN 1. Additionally, the UE 10 establishes the communication path 4 based on the APN 2.

Furthermore, in the case where communication paths for other multiple APN, as well as for the APN 1 and the APN 2 are established, the UE 10 establishes the communication path through WLAN that corresponds to each APN, and switches all communications to the communication path through WLAN.

A specific procedure for establishing the communication path 3 and processing by each apparatus that is involved in the procedure may be almost the same as those in the WLAN_ANb attachment procedure, which are described in 1.3.1.3. For this reason, descriptions are provided with an emphasis on a difference with the attachment procedure, referring to FIG. 13 that is used when the WLAN_ANb attachment procedure is described.

When it comes to the timing at which the control message that is the trigger to start the procedure for establishing the security association, which is transmitted by the UE 10, the transmission may be performed based on the determination of the switching by the policy reception processing (S1706).

Furthermore, the UE 10 may transmit the information for identifying the communication, in the state of being further included in the message that is a trigger. Furthermore, the identification information indicating the switching means may be transmitted in the state of being further included.

At this point, the message that is a trigger is as described in 1.3.1.3, and may be a control message that is transmitted by the UE 10 to the ePDG 65 in the IKE v2 authentication procedure.

The ePDG 65 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the response message that is a trigger. Furthermore, the identification information indicating the switching means may be transmitted in the state of being further included.

Moreover, the response message that is a trigger is as described in 1.3.1.3, and may be an IKE v2 response message.

Moreover, the information for identifying the communication may be information for identifying the APN 1. Furthermore, the identification information indicating the switching means may be identification information indicating that the communication path for the communication that is associated with a specific APN is switched. Alternatively, the identification information indicating the switching means may be identification information indicating switching means, such as one that switches all communications.

Moreover, the information for identifying a specific communication, such as the information for identifying the flow, as well as the APN, may be transmitted in the state of being included in the information for identifying the communication.

Additionally, the UE 10 establishes the communication path 4 based on the APN 2.

A specific procedure for establishing the communication path 4 and processing by each apparatus that is involved in the procedure may be almost the same as those in the WLAN_ANb attachment procedure, which are described in 1.3.1.3. For this reason, descriptions are provided with an emphasis on a difference with the attachment procedure, referring to FIG. 13 that is used when the WLAN_ANb attachment procedure is described.

When it comes to the timing at which the control message that is the trigger to start the procedure for establishing the security association, which is transmitted by the UE 10, the transmission may be performed based on the determination of the switching by the policy reception processing (S1706).

Furthermore, the UE 10 may transmit the information for identifying the communication, in the state of being further included in the message that is a trigger. Furthermore, the identification information indicating the switching means may be transmitted in the state of being further included.

At this point, the message that is a trigger is as described in 1.3.1.3, and may be a control message that is transmitted by the UE 10 to the ePDG 65 in the IKE v2 authentication procedure.

The ePDG 65 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the response message that is a trigger. Furthermore, the identification information indicating the switching means may be transmitted in the state of being further included.

Moreover, the response message that is a trigger is as described in 1.3.1.3, and may be an IKE v2 response message.

Moreover, the information for identifying the communication may be information for identifying the APN 2. Furthermore, the identification information indicating the switching means may be identification information indicating that the communication path for the communication that is associated with a specific APN is switched. Alternatively, the identification information indicating the switching means may be identification information indicating switching means, such as one that switches all communications.

Moreover, the information for identifying a specific communication, such as the information for identifying the flow, as well as the APN, may be transmitted in the state of being included in the information for identifying the communication.

At this point, in the case where communication paths for other multiple APN, as well as for the APN 1 and the APN 2 are established, the UE 10 establishes the communication path through WLAN that corresponds to each APN, and switches all communications to the communication path through WLAN.

With the present procedure, the UE 10, the ePDG 65, and the PGW 40 perform the communication that is associated with the APN 1, using the communication path 3.

Additionally, the UE 10, the ePDG 65, and the PGW 40 perform the communication that is associated with the APN 2, using the communication path 4.

Moreover, in the present procedure, the UE 10, the ePDG 65, and the PGW 40 perform the path configuration in order that the communication which is associated with the APN 1 is performed using the communication path 3. In other words, with the procedure for establishing the communication path 3, the UE 10, the ePDG 65, and the PGW 40 acquire the information for identifying the communication that is indispensable for the path configuration, and performs the communication that is associated with the APN 1, using the communication path 3.

Furthermore, in the present procedure, the UE 10, the ePDG 65, and the PGW 40 perform the path configuration in order that the communication which is associated with the APN 2 is performed using the communication path 4. In other words, with the procedure for establishing the communication path 3, the UE 10, the ePDG 65, and the PGW 40 acquire the information for identifying the communication that is indispensable for the path configuration, and performs the communication that is associated with the APN 2, using the communication path 4.

With the procedure described above, the UE 10 can continue the communication that is associated with the APN 1, using the communication path 3 (S1710). Additionally, the UE 10 can continue the communication that is associated with the APN 2, using the communication path 4 (S1712).

Additionally, the UE 10 and the PGW 10 may execute the resource release procedure (S1714). With the resource release procedure, the UE 10 and the PGW 10 may execute the communication path deletion processing such as the release of resources for the communication path 1 and the communication path 2 or the deletion of the communication path information.

The communication path 1 through LTE is described above as being established for the APN 1 (S1702), the communication path 2 through LTE as being established for the APN 2 (S1704), and the switching to the communication path 3 through WLAN for the APN 1 and the communication path 4 through WLAN for the APN 2 as taking place as the result of the communication path switching procedure 3 (S1708) after the policy reception processing (S1706).

At this point, the communication path 1 through LTE may be established for the APN 1 (S1702), the communication path 2 through LTE may be established for the APN 1 (S1704), and the switching to the communication path 3 through WLAN for the APN 1 and the communication path 4 through WLAN for the APN 1 may take place as the result of the communication path switching procedure 3 (S1708) after the policy reception processing (S1706).

Furthermore, the communication path 1 through LTE may be established for the APN 1 (S1702), the communication path 2 through LTE may be established for the APN 1 (S1704), and the switching to the communication path 3 through WLAN for the APN 1 may take place as the result of the communication path switching procedure 3 (S1708) after the policy reception processing (S1706).

[1.3.3.7 Third Example of the Switching Procedure in which the Policy of the Type 1 is Used]

In the first example of the switching procedure in which the policy of the type 1 is used, which is described in 1.3.3.5, as an example, the communication path 3 and the communication path 4 are described as being communication paths for the connection to the PGW 40 through the WLAN_ANa 70.

Furthermore, the communication path 3, the communication path 4, and the communication path 3 may be communication paths that are established using the DSMIP.

The switching procedure in which the UE 10 uses the policy of the type 3 will be described below referring to FIG. 17.

Procedures and processing operations up to and including the policy reception processing (S1706) by each of the apparatuses that include the UE 10 may be the same as the procedures and processing operations that are performed in 1.3.3.6. Specifically, procedures for the communication path 1 and the communication path 2, and processing by each apparatus may be the same as the procedures and processing that are described in 1.3.3.6. For this reason, detailed descriptions thereof are omitted.

Additionally, the UE 10 performs the policy reception processing (S1706). This policy reception processing may be the same processing and procedure as the policy reception processing that is described in 1.3.2.5. For this reason, detailed descriptions thereof are omitted.

The communication path switching processing will be described below as a communication path switching procedure 3 (S1708). Based on at least one or two policies among the UE policy, the operator policy, and the RAN policy, the UE 10 switches all communication paths to the communication path through WLAN. The UE performs the switching of the communication path for every communication that is associated with the APN.

At this point, the UE 10 establishes the communication path using the APN 1 and the APN 2. Therefore, the UE 10 switches the communication path for the communication that is associated with the APN 1, from the communication path 1 to the communication path 3. Additionally, the UE 10 switches the communication path for the communication that is associated with the APN 2, from the communication path 2 to a communication path 4. Furthermore, moreover, in the switching, the UE 10 newly establishes the communication path 3 and the communication path 4. Moreover, the UE 10 establishes the communication path 3 based on the APN 1. Additionally, the UE 10 establishes the communication path 4 based on the APN 2.

Furthermore, in the case where communication paths for other multiple APN, as well as for the APN 1 and the APN 2 are established, the UE 10 establishes the communication path through WLAN that corresponds to each APN, and switches all communications to the communication path through WLAN.

A specific procedure for establishing the communication path 3, and processing by each apparatus that is involved in the procedure may be almost the same as those in the attachment procedure in which the DIMIP is used, which are described in 1.3.1.4. For this reason, descriptions are provided with an emphasis on a difference with the attachment procedure, referring to FIG. 14 that is used when the attachment procedure in which the DSMIP is used is described.

The transmission may be performed based on the trigger for the UE 10 to start the security association and on the determination of the switching by the policy reception processing (S1706). When it comes to the timing at which the control message that is a trigger for the UE 10 to start the security association is transmitted, the transmission may be performed based on the determination of the switching by the policy reception processing (S1706).

Furthermore, the UE 10 may transmit the information for identifying the communication, in the state of being further included in the binding update message. Furthermore, the identification information indicating the switching means may be transmitted in the state of being further included.

Moreover, when it comes to the timing at which the binding update message that is transmitted by the UE 10 is transmitted, the transmission may be performed based on the determination of the switching by the policy reception processing (S1706), and the transmission may be performed based on the establishment of the security association. The UE 10 may transmit the information for identifying the communication, in the state of being further included in the binding update. Furthermore, the identification information indicating the switching means may be transmitted in the state of being further included.

The PGW 40 may transmit the information for identifying the communication, in the state of being further included in the binding response. Furthermore, the identification information indicating the switching means may be transmitted in the state of being further included.

Moreover, the information for identifying the communication may be information for identifying the APN 1. Furthermore, the identification information indicating the switching means may be identification information indicating that the communication path for the communication that is associated with a specific APN is switched. Alternatively, the identification information indicating the switching means may be identification information indicating switching means, such as one that switches all communications.

Moreover, the information for identifying a specific communication, such as the information for identifying the flow, as well as the APN, may be transmitted in the state of being included in the information for identifying the communication. Additionally, the UE 10 establishes the communication path 4 based on the APN 2.

A specific procedure for establishing the communication path 4, and processing by each apparatus that is involved in the procedure may be almost the same as those in the attachment procedure in which the DIMIP is used, which are described in 1.3.1.4. For this reason, descriptions are provided with an emphasis on a difference with the attachment procedure, referring to FIG. 14 that is used when the attachment procedure in which the DSMIP is used is described.

The transmission may be performed based on the trigger for the UE 10 to start the security association and on the determination of the switching by the policy reception processing (S1706). When it comes to the timing at which the control message that is a trigger for the UE 10 to start the security association is transmitted, the transmission may be performed based on the determination of the switching by the policy reception processing (S1706).

Furthermore, the UE 10 may transmit the information for identifying the communication, in the state of being further included in the binding update message. Furthermore, the identification information indicating the switching means may be transmitted in the state of being further included.

Moreover, when it comes to the timing at which the binding update message that is transmitted by the UE 10 is transmitted, the transmission may be performed based on the determination of the switching by the policy reception processing (S1706), and the transmission may be performed based on the establishment of the security association.

The UE 10 may transmit the information for identifying the communication, in the state of being further included in the binding update. Furthermore, the identification information indicating the switching means may be transmitted in the state of being further included.

The PGW 40 may transmit the information for identifying the communication, in the state of being further included in the binding response. Furthermore, the identification information indicating the switching means may be transmitted in the state of being further included.

Moreover, the information for identifying the communication may be information for identifying the APN 2. Furthermore, the identification information indicating the switching means may be identification information indicating that the communication path for the communication that is associated with a specific APN is switched. Alternatively, the identification information indicating the switching means may be identification information indicating switching means, such as one that switches all communications.

Moreover, the information for identifying a specific communication, such as the information for identifying the flow, as well as the APN, may be transmitted in the state of being included in the information for identifying the communication.

At this point, in the case where communication paths for other multiple APN, as well as for the APN 1 and the APN 2 are established, the UE 10 establishes the communication path through WLAN that corresponds to each APN, and switches all communications to the communication path through WLAN.

With the present procedure, the UE 10, the ePDG 65, and the PGW 40 perform the communication that is associated with the APN 1, using the communication path 3.

Additionally, the UE 10, the ePDG 65, and the PGW 40 perform the communication that is associated with the APN 2, using the communication path 4.

Moreover, in the present procedure, the UE 10, the ePDG 65, and the PGW 40 perform the path configuration in order that the communication which is associated with the APN 1 is performed using the communication path 3. In other words, with the procedure for establishing the communication path 3, the UE 10, the ePDG 65, and the PGW 40 acquire the information for identifying the communication that is indispensable for the path configuration, and performs the communication that is associated with the APN 1, using the communication path 3.

Furthermore, in the present procedure, the UE 10, the ePDG 65, and the PGW 40 perform the path configuration in order that the communication which is associated with the APN 2 is performed using the communication path 4. In other words, with the procedure for establishing the communication path 3, the UE 10, the ePDG 65, and the PGW 40 acquire the information for identifying the communication that is indispensable for the path configuration, and performs the communication that is associated with the APN 2, using the communication path 4.

With the procedure described above, the UE 10 can continue the communication that is associated with the APN 1, using the communication path 3 (S1710). Additionally, the UE 10 can continue the communication that is associated with the APN 2, using the communication path 4 (S1712).

Additionally, the UE 10 and the PGW 10 may execute the resource release procedure (S1714). With the resource release procedure, the UE 10 and the PGW 10 may execute the communication path deletion processing such as the release of resources for the communication path 1 and the communication path 2 or the deletion of the communication path information.

The communication path 1 through LTE is described above as being established for the APN 1 (S1702), the communication path 2 through LTE as being established for the APN 2 (S1704), and the switching to the communication path 3 through WLAN for the APN 1 and the communication path 4 through WLAN for the APN 2 as taking place as the result of the communication path switching procedure 3 (S1708) after the policy reception processing (S1706).

At this point, the communication path 1 through LTE may be established for the APN 1 (S1702), the communication path 2 through LTE may be established for the APN 1 (S1704), and the switching to the communication path 3 through WLAN for the APN 1 and the communication path 4 through WLAN for the APN 1 may take place as the result of the communication path switching procedure 3 (S1708) after the policy reception processing (S1706).

Furthermore, the communication path 1 through LTE may be established for the APN 1 (S1702), the communication path 2 through LTE may be established for the APN 1 (S1704), and the switching to the communication path 3 through WLAN for the APN 1 may take place as the result of the communication path switching procedure 3 (S1708) after the policy reception processing (S1706).

[1.3.4 Control Procedure in which a Policy of the Type 4 is Used]

The present example, that is, an example in which the UE 10 switches a communication path using the ANDSF policy and the RAN policy of the type 4, which are illustrated in a fourth example of the policy in FIG. 5(*d*), is described.

First, an LTE attachment procedure, a WLAN_ANa attachment procedure, a WLAN_ANb attachment procedure, and an attachment procedure in which the DSMIP is used, all of which lead to the initial state of the UE 10 where the control procedure in which the policy according to the present embodiment is used is executed, are described.

[1.3.4.1 LTE Attachment Procedure]

The UE 10 establishes the communication path through the LTE access system (the LTE_AN 80). An LTE attachment procedure may be the same as the LTE attachment procedure that is described in 1.3.1.1 referring to FIG. 11. Moreover, processing by each apparatus that is involved in the attachment procedure may also be the same as that which is described in 1.3.1.1 referring to FIG. 11. For this reason, a detailed description thereof is omitted.

[1.3.4.2 WLAN_ANa Attachment Procedure]

The UE 10 establishes the communication path through the WLAN_ANa 70. A WLAN_ANa 70 attachment procedure may be the same as the WLAN_ANa 70 attachment procedure that is described in 1.3.1.2 referring to FIG. 12. Moreover, processing by each apparatus that is involved in the attachment procedure may also be the same as that which is described in 1.3.1.2 referring to FIG. 12. For this reason, a detailed description thereof is omitted.

[1.3.4.3 WLAN_ANb Attachment Procedure]

The UE 10 establishes a communication path through the WLAN_ANb 70. A WLAN_ANb 70 attachment procedure may be the same as the WLAN_ANa 70 attachment procedure that is described in 1.3.1.3 referring to FIG. 13. Moreover, processing by each apparatus that is involved in the attachment procedure may also be the same as that which is described in 1.3.1.3 referring to FIG. 13. For this reason, a detailed description thereof is omitted.

[1.3.4.4 Attachment Procedure in which the DSMIP is Used]

The UE 10 establishes the communication path using the DSMIP. An attachment procedure in which the DSMIP is used is the same as the attachment procedure in which the DSMIP is used, which is described in 1.3.1.4 referring to FIG. 13. Moreover, processing by each apparatus that is involved in the attachment procedure may also be the same as that which is described in 1.3.1.4 referring to FIG. 13. For this reason, a detailed description thereof is omitted.

With the attachment procedure in which the DSMIP is used, the UE 10 can establish the communication path through the WLAN_ANa 70 or the communication path through the WLAN_ANb 75.

[1.3.4.5 First Example of the Switching Procedure in which the Policy of the Type 4 is Used]

Next, a switching procedure in which the UE 10 uses the policy of the type 4 is described referring to FIG. 16.

Figure 18:
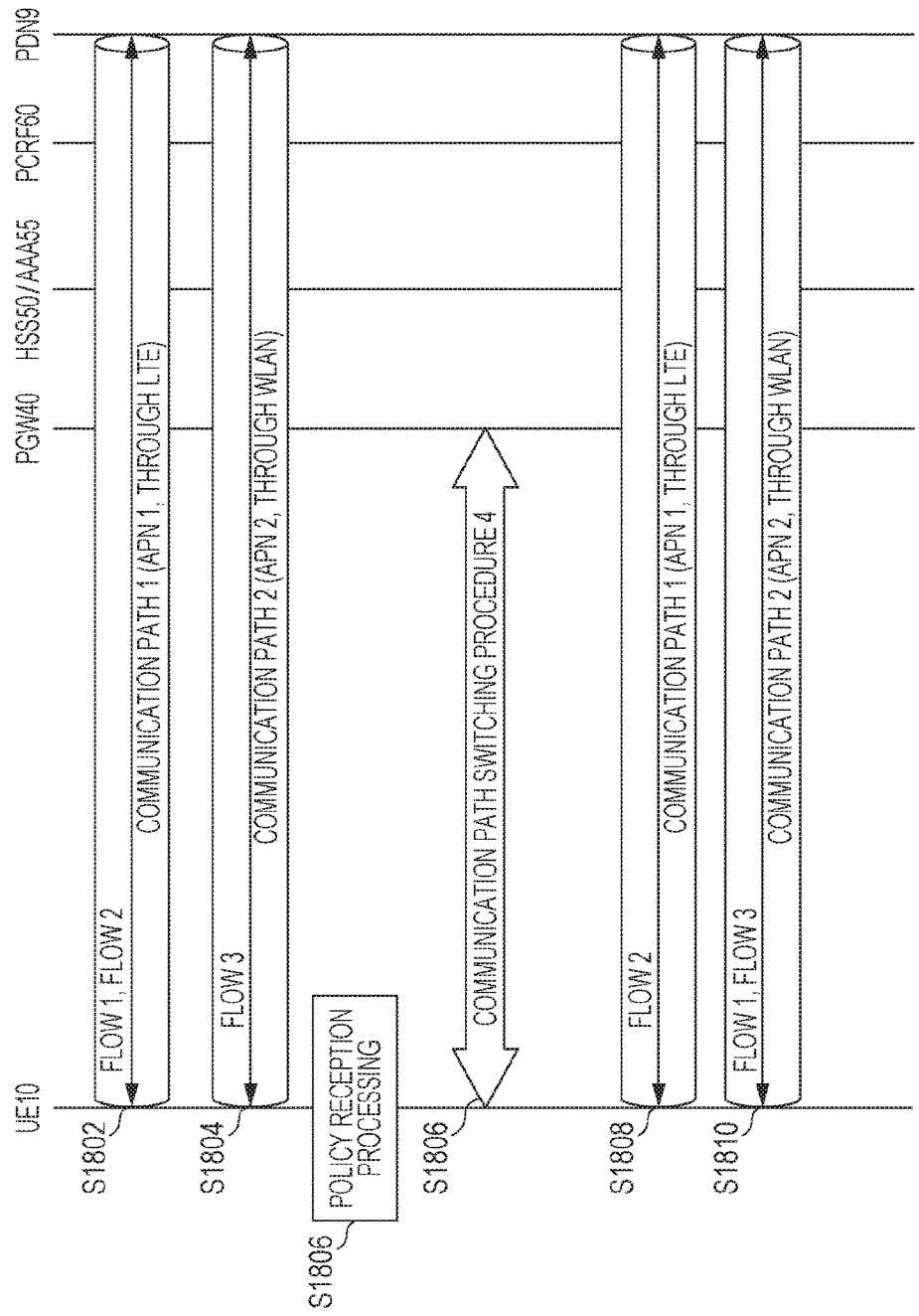
FIG. 18 is a diagram for describing the procedure for switching the access network according to the first embodiment.

As illustrated in FIG. 18, the UE 10 in the initial state establishes the communication path 1, and performs the communications in the flow 1 and the flow 2 (S1802). Additionally, the UE 10 establishes the communication path 2 in addition to the communication path 1, and performs the communication in the flow 3 (S1804). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the WLAN_ANa 70. Additionally, the UE 10 may establish the communication path 1 in the state of being associated with the APN 2. In this manner, in the UE 10 and the PGW 40, the APN 2 and the communication path 2 are associated with each other, and the identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying a communication and the communication path 1 correspond to each other are described when the WLAN_ANa access procedure is described in 1.3.1.2, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1806). An example of the policy reception processing will be described below referring to FIG. 9.

First, the UE 10 executes the procedure for receiving the operator policy. Moreover, whether or not to receive the operator policy may be determined based on the approval information 1 of the approval information 144. More precisely, in the case where the approval information 1 is set to be "APPROVED", the operator policy may be received. Furthermore, in the case where the approval information 1 is set to be "DISAPPROVED", the present procedure may be ended without receiving the operator policy.

A specific example for receiving the operator policy will be described below.

The UE 10 searches for the ANDSF 20 and ensures the secure communication with the ANDSF 20 that is found as the result of the search (S904). Various methods in which the UE 10 searches for the ANDSF 20 are considered, and for example, the ANDSF 20 can be searched for by the UE 10 making an inquiry to the DNS server that is installed on the PDN. Various methods in which the UE 10 and the ANDSF 20 ensure a secure communication are considered and for example, the IPSec may be used.

Moreover, based on the approval information 1, the UE 10 may search for the ANDSF 20 or may transmit the control message for establishing a secure communication path to the ANDSF 20.

When ensuring the secure communication path between the UE 10 itself and the ANDSF 20, the UE 10 transmits the request for the access network information to the ANDSF 20 (S906).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the UE 10 may transmit the request message.

The ANDSF 20 transmits the operator policy notification to the UE 10 (S908). Based on the reception of the request message that is transmitted from the UE 10, the ANDSF 20 may notify the UE 10 of the operator policy notification or may perform the transmission at the timing at which the operator policy is updated or at an arbitrary timing.

The ANDSF 20 may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, the approval information may be the approval information 2 of the approval information 244.

The UE 10 receives the operator policy notification and acquires the ANDSF policy and the approval information.

Accordingly, based on the approval information 1, the UE 10 can receive the operator policy.

Furthermore, based on the approval information 1, the UE 10 may store the received ANDSF policy in the UE policy 142, or by performing the updating and so on, may manage the received ANDSF policy as a UE policy. Additionally, based on the approval information 1, the UE 10 may store the approval information 2 that is received from the ANDSF 20, as approval information of the approval information 144, and, by performing the renewal and so on, may manage the received approval information 2, as approval information of the UE.

Next, the UE 10 determines whether or not to receive the RAN policy from the LTE_AN 80. At this point, based on the approval information 2 of the approval information 144, the UE 10 may receive the RAN policy. For example, in the case where the approval information 2 is "APPROVED", the RAN policy may be received. Furthermore, in the case where the approval information 2 is "DISAPPROVED", a configuration, such as one in which the reception of the RAN policy is not performed, may be performed.

Furthermore, based on the approval information 2 that is received from the ANDSF 20, the UE 10 may receive the RAN policy, and, based on the renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the home mobile operator with which the UE 10 has a contract.

Moreover, the eNB 45 may transmit the RAN policy to multiple terminals in a manner that performs the broadcasting to the base station area, and may transmit the RAN policy only to the UE 10.

Accordingly, based on the approval information 2, the UE 10 can receive the RAN policy.

Moreover, because the approval information 2 does not need necessarily to be transmitted from the ANDSF 20, the RAN policy can be received based on the UE policy, not based on the operator policy. For example, as illustrated in FIG. 19, even in the communication system for which the ANDSF is not configured, the UE 10 can control whether or not to use the RAN policy, based on the approval information 2.

Next, using the operator policy, the RAN policy, or both, the UE 10 makes a selection of the access system and makes a determination of the communication path switching procedure (S912).

In the present example, based on the policy of the type 4 whose target is the flow 1, which is stored by the UE 10 in the UE policy 142, and on the RAN policy that is transmitted by the eNB 45, the example of switching the communication path in the flow 1 is described.

Moreover, the ANDSF policy that is stored in the UE policy 142 is the policy of the type 4. This means that, based on the approval information 1, although the UE policy 142 is updated with what is received from the ANDSF 20, any that is stored in the UE policy 142 may be available.

Furthermore, as described so far, the information for identifying the communication, the access network information, the priority level of the access network, and the threshold are stored in the ANDSF policy, in the state of being associated with one another. Additionally, the access network information and the threshold are stored in the RAN policy, in the state of being associated with each other. Specifically, the information for identifying the communication is information for identifying the flow 1, is information indicating LTE and WLAN in the access network information, and is information indicating that LTE takes precedence in terms of the priority level of the access network.

Based on the RAN policy, the UE 10 may determine the switching of the communication path based on the RAN policy. The UE 10 may determine the switching, based on at least one or two pieces of information, among the RSRP, the RSRQ, and the OPI, which are included in the RAN policy.

Furthermore, the communication path to the switching destination and the communication data for performing the switching may be determined based on the ANDSF policy. Specifically, because the information for identifying the communication for the ANDSF policy is information for identifying the flow 1, WLAN is stored as an available access network, it may be determined that a communication in the flow 1 is switched to a communication path that uses WLAN.

Furthermore, from the fact that the ANDSF policy is the policy of the type 4, the switching means may determine that the switching of the flow base is performed.

With the procedure described above, the policy reception processing (S1806) is completed.

In the case of the policy of the type 4 that is illustrated in the fourth example of the policy in FIG. 5(*d*), as an example of the policy which the ANDSF 20 notifies the UE 10 of, the IP flow and the routing rule may be included. With the inclusion of the IP flow and the routing rule, the ANDSF 20 can cause the UE 10 to switch the data transmission and reception that is identified with the IP flow, to the data transmission and reception for the APN that is included in the routing rule, and to switch the access system. More precisely, the UE 10 can switch the data transmission and reception that is identified with the IP flow which is included in the ANDSF policy from the ANDSF 20, to the data transmission and reception for the APN that is included in the routing rule, and to switch the access system.

Because an IP flow is the same as for the policy of the type 2 that is illustrated in the second example of the policy in FIG. 5(*b*), a detailed description thereof is omitted.

On the other hand, information indicating the APN that takes precedence within the policy is included in the routing rule. With the inclusion of the IP flow and the routing rule, the ANDSF 20 can cause the UE 10 to switch the data transmission and reception that is identified with the IP flow, to the APN in accordance with the routing rule. More precisely, with the inclusion of the IP flow and the routing rule, the ANDSF 20 can switch the data transmission and reception that is identified with the IP flow, to the data transmission and reception for the APN that is included in the routing rule. More precisely, the UE 10 can switch the data transmission and reception that is identified with the IP flow which is included in the ANDSF policy from the ANDSF 20, to the data transmission and reception for the APN that is included in the routing rule, and to switch the access system.

Furthermore, in the case of the policy of the type 4, the ANDSF 20 may cause the routing reference, the rule priority, the threshold 1 and the OPI 1 to be included, in addition to the IP flow and the routing rule.

Moreover, because a routing reference is the same as for the policy of the type 2 that is described in 1.3.1.5, a detailed description thereof is omitted. Furthermore, because rule priority is the same as for the policy of the type 2 that is described in 1.3.1.5, a detailed description thereof is omitted. Furthermore, because the threshold 1 is the same as for the policy of the type 2 that is described in 1.3.1.5, a detailed description thereof is omitted. Furthermore, because the OPI 1 is the same as for the policy of the type 2 that is described in 1.3.1.5, a detailed description thereof is omitted.

Among the routing reference, the rule priority, the threshold 1 and the OPI 1 in addition to the IP flow and the routing rule, any one is described above as not being included, but with the inclusion of multiple pieces of information among the routing reference, the rule priority, the threshold 1, and the OPI 1 in addition to the APN and the routing rule, the UE 10 may be caused to execute the ANDSF policy and to switch the access system.

More precisely, with the multiple pieces of information among the routing reference, the rule priority, the threshold 1, and the OPI 1, in addition to the IP flow and the routing rule, which are included in the ANDSF policy from the ANDSF 20, the UE 10 can switch the access system.

Furthermore, with the threshold that is included in the RAN policy from the eNB 45, the UE 10 may switch the access system. Moreover, because the method that is described in 1.3.1.5 can be used for the determination of the switching of the access system in the RAN policy, a detailed description thereof is omitted.

More precisely, the threshold in the RAN policy is the same as that in the policy of the type 2. Furthermore, the OPI in the RAN policy is the same as that in the policy of the type 2, which is described in 1.3.1.5.

Moreover, in the case where the threshold is included in the ANDSF policy and the threshold is included in the RAN policy, the UE 10 may give precedence to the threshold in the ANDSF policy and may give precedence to the RAN policy. Moreover, when it comes to the determination of the priority levels of the ANDSF policy and the RAN policy, the determination may be made using the OPI that is included in the ANDSF policy and the OPI that is included in the RAN policy. Furthermore, in the case where the OPI is included neither in the ANDSF policy, nor in the RAN policy, the UE 10 may arbitrarily determine the priority levels of the ANDSF policy and the RAN policy.

The communication path switching processing will be described below as a communication path switching procedure 4 (S1808).

Based on at least one or two policies among the UE policy, the operator policy, and the RAN policy, the UE 10 switches a communication path that is used for the communication in the flow 1 from the communication path 1 to the communication path 2.

A specific switching procedure and processing by each apparatus that is involved in the procedure may be almost the same as those in the WLAN_ANa attachment procedure, which are described in 1.3.1.2. For this reason, descriptions are provided with an emphasis on a difference with the attachment procedure, referring to FIG. 12 that is used when the WLAN_ANa attachment procedure is described.

When it comes to the timing at which the trigger message that is to be transmitted by the UE 10 is transmitted, the transmission may be performed based on the determination of the switching by the policy reception processing (S1806).

The UE 10 may transmit the information for identifying the communication, in the state of being further included in the trigger message. Furthermore, the identification information indicating the switching means may be transmitted in the state of being further included.

The WLAN_ANa 70 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the trigger response. Furthermore, the identification information indicating the switching means may be transmitted in the state of being further included.

Moreover, the information for identifying the communication may be information for identifying the flow 1. Furthermore, the identification information indicating the switching means may be identification information indicating that a specific flow is switched without changing the IP address. Alternatively, the identification information indicating the switching means may be identification information indicating switching means such as the Network Based IP Flow Mobility (NB_IFOM).

Furthermore, because the UE 10, the WLAN_ANa, and the PGW 40 already establish the communication path 2, with this procedure, a communication path may not be newly established. More specifically, the communication resource and the like do not need to be newly allocated.

The UE 10, the WLAN_ANa, and the PGW 40 already perform the communication in the flow 3 using the communication path 2, and with the present procedure, performs the communications in the flow 2 and the flow 3 using the communication path 2.

More specifically, in the present procedure, the UE 10, the WLAN_ANa, and the PGW 40 perform a path configuration in order that the communication in the flow 2 is performed using the communication path 2. In other words, with the present procedure, the UE 10, the WLAN_ANa, and the PGW 40 acquire the information for identifying the communication that is indispensable for the path configuration, and performs the communication in the flow 2 using the communication path 2.

With the procedure described above, the UE 10 can continue the communication in the flow 1 using the communication path 2 (S1812). Moreover, the UE 10 continues the communication in the flow 3 using the communication path 2. Moreover, the UE 10 continues the communication in the flow 1 using the communication path 1.

[1.3.4.6 Second Example of the Switching Procedure in which the Policy of the Type 4 is Used]

In the first example of the switching procedure in which the policy of the type 4 is used, which is described in 1.3.4.5, as an example, the communication path 2 is described as being the communication path for the connection to the PGW 40 through the WLAN_ANa 70.

Furthermore, the communication path 2 may be a communication path for the connection to the PGW 40 through the WLAN_ANb 75.

The switching procedure in which the UE 10 uses the policy of the type 4 will be described below referring to FIG. 18.

As illustrated in FIG. 18, the UE 10 in the initial state establishes the communication path 1, and performs the communications in the flow 1 and the flow 2 (S1802). Additionally, the UE 10 establishes the communication path 2 in addition to the communication path 1, and performs the communication in the flow 3 (S1804). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the WLAN_ANb 75. Additionally, the UE 10 may establish the communication path 1, in the state of being associated with the APN 2. In this manner, in the UE 10 and the PGW 40, the APN 2 and the communication path 2 are associated with each other, and the identification information for identifying the communication in the flow 3 and the communication path 1 are associated with each other.

Moreover, because a specific method of establishing the communication path 2, a management method in which the APN 2 and the communication path 2 correspond to each other, and a management method in which the identification information for identifying the communication and the communication path 1 correspond to each other are described when the WLAN_ANb access procedure is described in 1.3.1.3, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1806). This policy reception processing may be the same processing and procedure as the policy reception processing that is described in 1.3.1.5. For this reason, detailed descriptions thereof are omitted.

The communication path switching processing will be described below as the communication path switching procedure 1 (S1808).

Based on at least one or two policies among the UE policy, the operator policy, and the RAN policy, the UE 10 switches a communication path that is used for the communication in the flow 1 from the communication path 1 to the communication path 2.

A specific switching procedure and processing by each apparatus that is involved in the procedure may be almost the same as those in the WLAN_ANb attachment procedure that is described in 1.3.1.3. For this reason, descriptions are provided with an emphasis on a difference with the attachment procedure, referring to FIG. 13 that is used when the WLAN_ANb attachment procedure is described.

When it comes to the timing at which the control message that is the trigger to start the procedure for establishing the security association, which is transmitted by the UE 10, the transmission may be performed based on the determination of the switching by the policy reception processing (S1806).

Furthermore, the UE 10 may transmit the information for identifying the communication, in the state of being further included in the message that is a trigger. Furthermore, the identification information indicating the switching means may be transmitted in the state of being further included.

At this point, the message that is a trigger is as described in 1.3.1.3, and may be a control message that is transmitted by the UE 10 to the ePDG 65 in the IKE v2 authentication procedure.

The ePDG 65 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the response message that is a trigger. Furthermore, the identification information indicating the switching means may be transmitted in the state of being further included.

Moreover, the response message that is a trigger is as described in 1.3.1.3, and may be an IKE v2 response message.

Moreover, the information for identifying the communication may be information for identifying the flow 1. Furthermore, the identification information indicating the switching means may be identification information indicating that a specific flow is switched without changing the IP address. Alternatively, the identification information indicating the switching means may be identification information indicating switching means such as the Network Based IP Flow Mobility (NB_IFOM).

Furthermore, because the UE 10, the ePDG 65, and the PGW 40 already establish the communication path 2, with this procedure, the communication path may not be newly established. More specifically, the communication resource and the like do not need to be newly allocated.

The UE 10, the ePDG 65, and the PGW 40 already perform the communication in the flow 3 using the communication path 2, and with the present procedure, performs the communications in the flow 2 and the flow 3 using the communication path 2.

More specifically, in the present procedure, the UE 10, the ePDG 65, and the PGW 40 perform the path configuration in order that the communication in the flow 2 is performed using the communication path 2. In other words, with the present procedure, the UE 10, the ePDG 65, and the PGW 40 acquire the information for identifying the communication that is indispensable for the path configuration, and performs the communication in the flow 2 using the communication path 2.

With the procedure described above, the UE 10 can continue the communication in the flow 1 using the communication path 2 (S1810). Moreover, the UE 10 continues the communication in the flow 3 using the communication path 2. Moreover, the UE 10 continues the communication in the flow 2 using the communication path 1 (S1808).

[1.3.4.7 Third Example of the Switching Procedure in which the Policy of the Type 4 is Used]

In the first example of the switching procedure in which the policy of the type 4 is used, which is described in 1.3.4.5, as an example, the communication path 2 is described as being the communication path for the connection to the PGW 40 through the WLAN_ANa 70.

Furthermore, the communication path 2 may be a communication path that is established using the DSMIP.

The switching procedure in which the UE 10 uses the policy of the type 4 will be described below referring to FIG. 18.

As illustrated in FIG. 18, the UE 10 in the initial state establishes the communication path 1, and performs the communications in the flow 1 and the flow 2 (S1802). Additionally, the UE 10 establishes the communication path 2 in addition to the communication path 1, and performs the communication in the flow 3 (S1804). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 using the DSMIP. Additionally, the UE 10 may establish the communication path 1 in the state of being associated with the APN 1. In this manner, in the UE 10 and the PGW 40, the APN 1 and the communication path 2 are associated with each other, and identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying the communication and the communication path 1 correspond to each other are described when the attachment procedure in which the DSMIP is used is described in 1.3.1.4, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Next, the UE 10 performs the policy reception processing (S1806). This policy reception processing may be the same processing and procedure as the policy reception processing that is described in 1.3.1.5. For this reason, detailed descriptions thereof are omitted.

The communication path switching processing will be described below as the communication path switching procedure 1 (S1808).

Based on at least one or two policies among the UE policy, the operator policy, and the RAN policy, the UE 10 switches a communication path that is used for the communication in the flow 1 from the communication path 1 to the communication path 2.

A specific switching procedure and processing by each apparatus that is involved in the procedure may be almost the same as those in the attachment procedure in which the DSMIP is used, which are described in 1.3.1.4. For this reason, descriptions are provided with an emphasis on a difference with the attachment procedure, referring to FIG. 14 that is used when the WLAN_ANb attachment procedure is described.

In the case of a state where the security association that is established in the attachment procedure is established, the UE 10 does not need to newly establish the security association. However, in the case where the security association needs to be anew established, such as the case where the timer or the like that is associated with the security association is managed and where the timer expires, the UE 10 again establishes the security association. An establishment procedure may be the same as the procedure or processing that is described in 1.3.1.4.

Moreover, in the case where the security association is reestablished, when it comes to the timing at which the control message that is a trigger to start the security association, which is transmitted by the UE 10, is transmitted, the transmission may be performed based on the determination of the switching by the policy reception processing (S1806).

The UE 10 may transmit the information for identifying the communication, in the state of being further included in the binding update message. Furthermore, the identification information indicating the switching means may be transmitted in the state of being further included.

Moreover, when it comes to the timing at which the binding update message that is transmitted by the UE 10 is transmitted, the transmission may be performed based on the determination of the switching by the policy reception processing (S1806), and the transmission may be performed based on the reestablishment of the security association.

The ePDG 65 may transmit the information for identifying the communication, in the state of being further included in the session generation request or the proxy binding update. Furthermore, the identification information indicating the switching means may be transmitted in the state of being further included.

The PGW 40 may transmit the information for identifying the communication, in the state of being further included in the session response or the proxy binding response. Furthermore, the identification information indicating the switching means may be transmitted in the state of being further included.

The WLAN_ANa 70 may transmit the information for identifying the communication, in the state of being further included in the trigger response. Furthermore, the identification information indicating the switching means may be transmitted in the state of being further included.

Moreover, the information for identifying the communication may be information for identifying the flow 1. Furthermore, the identification information indicating the switching means may be identification information indicating that a specific flow is switched without changing the IP address. Alternatively, the identification information indicating the switching means may be identification information indicating switching means such as the IP Flow Mobility (IFOM).

Furthermore, because the UE 10, the ePDG 65, and the PGW 40 already establish the communication path 2, with this procedure, the communication path may not be newly established. More specifically, the communication resource and the like do not need to be newly allocated.

The UE 10, the ePDG 65, and the PGW 40 already perform the communication in the flow 3 using the communication path 2, and with the present procedure, performs the communications in the flow 2 and the flow 3 using the communication path 2.

More specifically, in the present procedure, the UE 10, the ePDG 65, and the PGW 40 perform the path configuration in order that the communication in the flow 2 is performed using the communication path 2. In other words, with the present procedure, the UE 10, the ePDG 65, and the PGW 40 acquire the information for identifying the communication that is indispensable for the path configuration, and performs the communication in the flow 2 using the communication path 2. With the procedure described above, the UE 10 can continue the communication in the flow 1 using the communication path 2 (S1810). Moreover, the UE 10 continues the communication in the flow 3 using the communication path 2. Moreover, the UE 10 continues the communication in the flow 1 using the communication path 1 (S1808).

2. Second Embodiment

A second embodiment is described. According to the first embodiment, the UE 10 is present on the mobile communication network (H-PLMN) with which the user of the UE 10 has a contract, but according to the second embodiment, the UE 10 is present on the mobile communication network (V-PLMN) that is a roaming destination, not on the H-PLMN.

Figure 20:
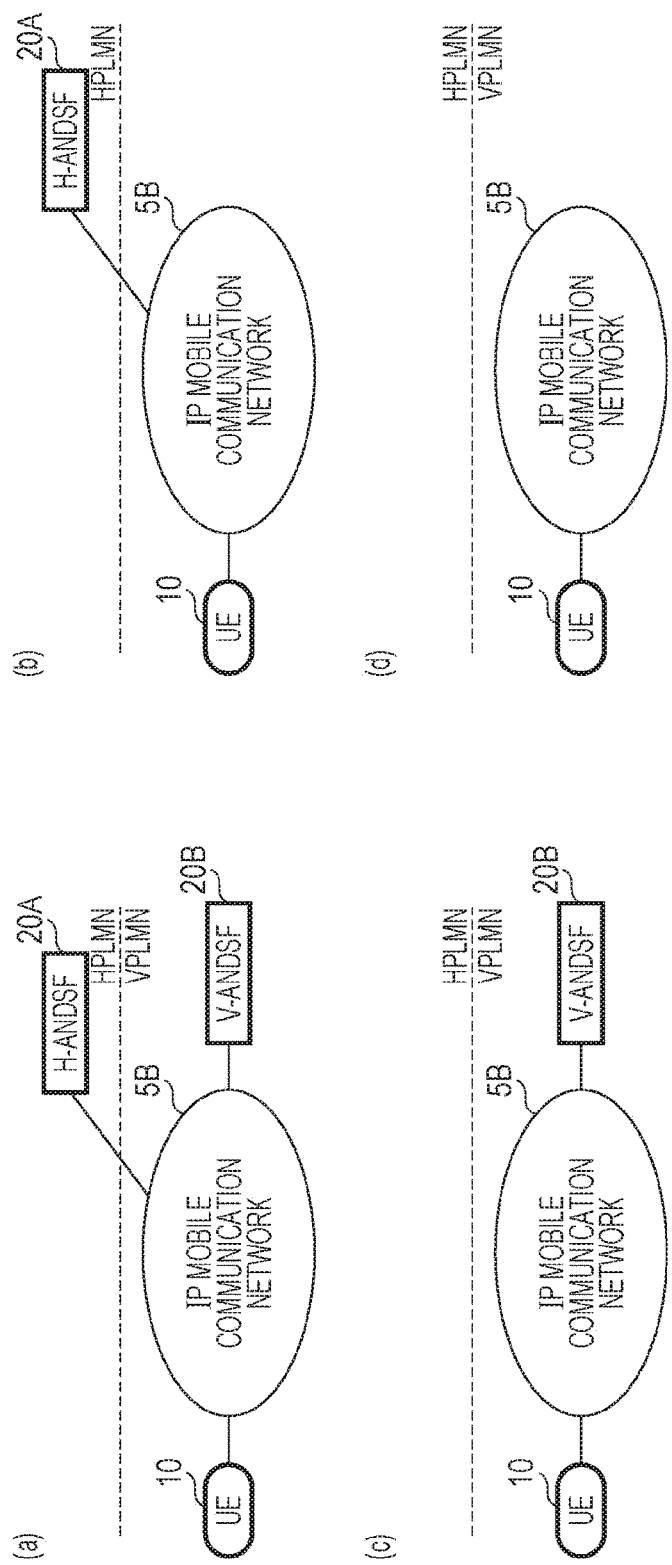
FIG. 20 is a diagram for describing an outline of a communication system according to a second embodiment.

FIG. 20(a) illustrates a constitution of a communication system according to the second embodiment. In FIG. 20(a), the UE 10 makes a connection to an IP mobile communication network 5B on the V-PLMN.

Furthermore, the V-PLMN may be a home mobile operator with which the UE 10 has a contract, or may be a home mobile operator that the UE has a roaming contract with. The V-PLMN may be identification information for identifying the roaming home mobile operator or the roaming Home Operator Network. Therefore, the IP mobile communication network 5B may be a network that is operated or managed by the roaming home mobile operator.

Furthermore, an H-ANDSF 20 and a V-ANDSF 20B are connected to the IP mobile communication network 5B on the V-PLMN. Moreover, the H-ANDSF 20 is an ANDSF that is managed by the H-PLMN. Moreover, the H-PLMN may be identification information for the home mobile operator with which the UE 10 has a contract or the Home Operator Network. Furthermore, the V-ANDSF 20B is an ANDSF that is managed by the V-PLMN.

Moreover, only the home mobile operator that performs the operation or the management is different for the H-ANDSF 20 and the V-ANDSF 20B, and the H-ANDSF 20 and the V-ANDSF 20B may have the same constitution as the constitution of the ANDSF 20 that is described according to the first embodiment. For this reason, a detailed description of the constitution is omitted.

Furthermore, the IP mobile communication network 5B on the V-PLMN is available to have the same constitution of the IP mobile communication network 5A that is described according to the first embodiment. Additionally, each of the constituent elements (the devices and the apparatuses) that is included in the IP mobile communication network 5B is available in the same manner as well and thus a description thereof is omitted.

Moreover, the UE 10 makes a connection to the IP mobile communication network 5A on the V-PLMN according to the first embodiment, whereas the UE 10 makes a connection to the IP mobile communication network 5A on the H-PLMN according to the first embodiment.

Because the IP mobile communication network 5A and the IP mobile communication network 5B may have the same constitution, with only an operations operator being different for the IP mobile communication network 5A and the IP mobile communication network 5B and, a description will be provided below referring to the drawings that are used for the description of the first embodiment. For this reason, a core network and an access network will be used for the following description and each apparatus that is illustrated in each drawing are apparatus that constitute the IP mobile communication network 5B on the VPLMN.

Furthermore, because a constitution of the UE 10 is the same as the constitution of the UE that is described according to the first embodiment, a detailed description of the constitution is omitted.

[2.1 Processing Description]

According to the present embodiment, a procedure in which the UE 10 switches the communication path using the UE policy 142 is described.

[2.1.1 Control Procedure in which the Policy of the Type 2 is Used]

The present example, that is, an example in which the UE 10 switches a communication path using the ANDSF policy and the RAN policy of the type 2, which are illustrated in a second example of the policy in FIG. 5(b), is described.

First, an LTE attachment procedure, a WLAN_ANa attachment procedure, a WLAN_ANb attachment procedure, and an attachment procedure in which the DSMIP is used, all of which lead to the initial state of the UE 10 where the control procedure in which the policy according to the present embodiment is used is executed, are described.

[2.1.1.1 LTE Attachment Procedure]

The UE 10 establishes the communication path through the LTE access system (the LTE_AN 80). An LTE attachment procedure may be the same as the LTE attachment procedure that is described in 1.3.1.1 referring to FIG. 11. Moreover, processing by each apparatus that is involved in the attachment procedure may also be the same as that which is described in 1.3.1.1 referring to FIG. 11. For this reason, a detailed description thereof is omitted.

[2.1.1.2 WLAN_ANa Attachment Procedure]

The UE 10 establishes the communication path through the WLAN_ANa 70. A WLAN_ANa 70 attachment procedure may be the same as the WLAN_ANa 70 attachment procedure that is described in 1.3.1.2 referring to FIG. 12. Moreover, processing by each apparatus that is involved in the attachment procedure may also be the same as that which is described in 1.3.1.2 referring to FIG. 12. For this reason, a detailed description thereof is omitted.

[2.1.1.3 WLAN_ANb Attachment Procedure]

The UE 10 establishes the communication path through the WLAN_ANb 70. A WLAN_ANb 70 attachment procedure may be the same as the WLAN_ANa 70 attachment procedure that is described in 1.3.1.3 referring to FIG. 13. Moreover, processing by each apparatus that is involved in the attachment procedure may also be the same as that which is described in 1.3.1.3 referring to FIG. 13. For this reason, a detailed description thereof is omitted.

[2.3.1.4 Attachment Procedure in which the DSMIP is Used]

The UE 10 establishes the communication path using the DSMIP. An attachment procedure in which the DSMIP is used is the same as the attachment procedure in which the DSMIP is used, which is described in 1.3.1.4 referring to FIG. 13. Moreover, processing by each apparatus that is involved in the attachment procedure may also be the same as that which is described in 1.3.1.4 referring to FIG. 13. For this reason, a detailed description thereof is omitted.

With the attachment procedure in which the DSMIP is used, the UE 10 can establish the communication path through the WLAN_ANa 70 or the communication path through the WLAN_ANb 75.

[2.1.1.5 First Example of a Switching Procedure of the Policy of the Type 2 is Used]

Next, a switching procedure in which the UE 10 uses the policy of the type 2 is described referring to FIG. 15.

As illustrated in FIG. 15, the UE 10 in an initial state, establishes the communication path 1, and performs communications in the flow 1 and the flow 2 (S1502). Additionally, the UE 10 establishes the communication path 2 in addition to the communication path 1, and performs a communication in a flow 3 (S1504). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the WLAN_ANa 70. Additionally, the UE 10 may establish the communication path 1 in the state of being associated with the APN 1. In this manner, in the UE 10 and the PGW 40, the APN 1 and the communication path 2 are associated with each other, and identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying a communication and the communication path 1 correspond to each other are described when the WLAN_ANa access procedure is described in 1.3.1.2, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Figure 21:
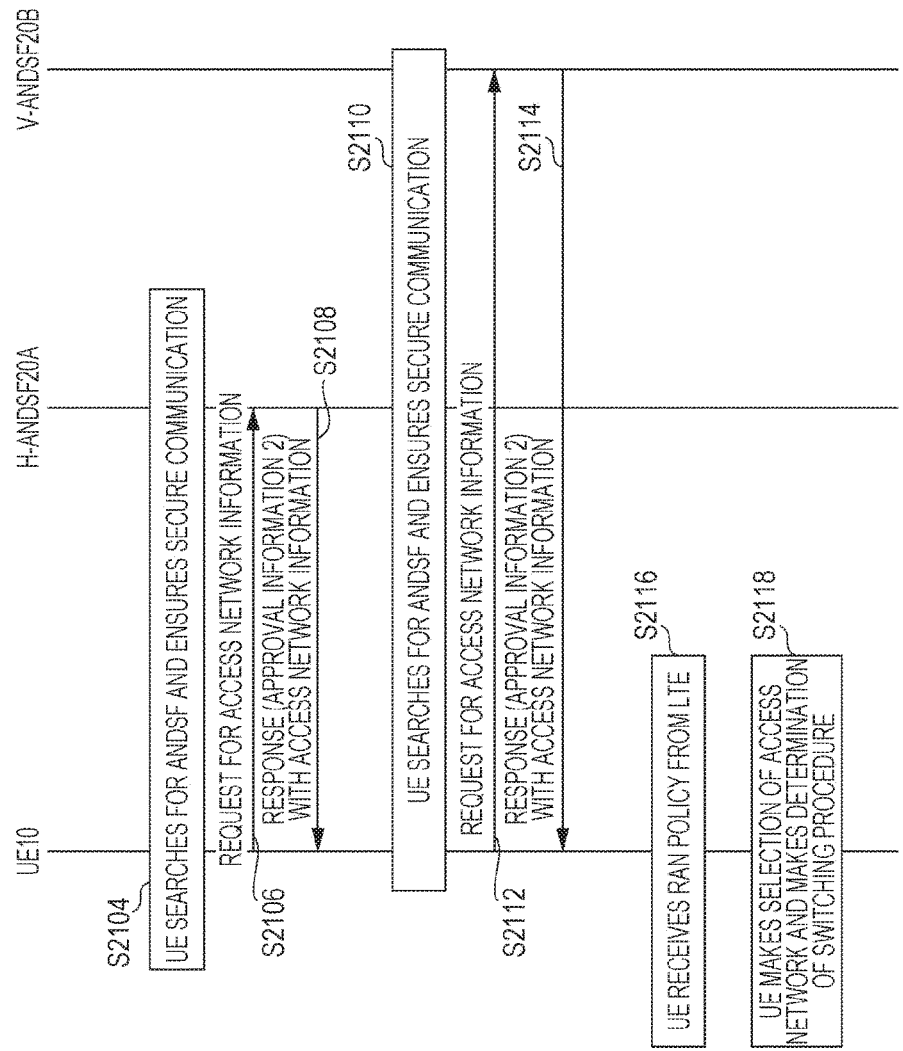
FIG. 21 is a diagram for describing a flow of processing according to the second embodiment.

Next, the UE 10 performs the policy reception processing (S1506). An example of the policy reception processing will be described below referring to FIG. 21.

First, the UE 10 executes the procedure for receiving the operator policy. Moreover, whether or not to receive the operator policy may be determined based on the approval information 1 of the approval information 144. More precisely, in the case where the approval information 1 is set to be "APPROVED", the operator policy may be received. Furthermore, in the case where the approval information 1 is set to be "DISAPPROVED", the present procedure may be ended without receiving the operator policy.

A specific example for receiving the operator policy will be described below.

The UE 10 searches for an H-ANDSF 20A and ensures a secure communication with the H-ANDSF 20A that is found as a result of the search (S2104). Various methods in which the UE 10 searches for the H-ANDSF 20A are considered, and for example, the H-ANDSF 20A can be searched for by the UE 10 making an inquiry to the DNS server that is installed on the PDN. Various methods in which the UE 10 and the H-ANDSF 20A ensure a secure communication are considered and for example, the IPSec may be used.

Moreover, based on the approval information 1, the UE 10 may search for the H-ANDSF 20A or may transmit a control message for establishing a secure communication path to the H-ANDSF 20A.

When ensuring the secure communication path between the UE 10 itself and the H-ANDSF 20A, the UE 10 transmits the request for the access network information to the ANDSF 20 (S2106).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the UE 10 may transmit the request message.

The H-ANDSF 20A transmits the operator policy notification to the UE 10 (S2108). Based on the reception of the request message that is transmitted from the UE 10, the H-ANDSF 20A may notify the UE 10 of the operator policy notification or may perform the transmission at the timing at which the operator policy is updated or at an arbitrary timing.

The H-ANDSF 20A may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, pieces of approval information may include at least one or two pieces of approval information, among the approval information 2, the approval information 3, and the approval information 5 of the approval information 244.

The UE 10 receives the operator policy notification and acquires the ANDSF policy and the approval information.

Accordingly, based on the approval information 1, the UE 10 can receive the operator policy.

Furthermore, based on the approval information 1, the UE 10 may store the received ANDSF policy in the UE policy 142, or by performing the updating and so on, may manage the received ANDSF policy as a UE policy. Additionally, based on the approval information 1, the UE 10 may store the approval information 2 that is received from the H-ANDSF 20A, as approval information of the approval information 144, and, by performing the renewal and so on, may manage the received approval information 2, as approval information of the UE.

Next, the UE 10 determines whether or not to receive the RAN policy from the LTE_AN 80.

At this point, based on the approval information 2 of the approval information 144, the UE 10 may receive the RAN policy. For example, in the case where the approval information 2 is "APPROVED", the RAN policy may be received. Furthermore, in the case where the approval information 2 is "DISAPPROVED", a configuration, such as one in which the reception of the RAN policy is not performed, may be performed.

Furthermore, based on the approval information 2 that is received from the ANDSF 20, the UE 10 may receive the RAN policy, and, based on the renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the roaming home mobile operator.

Moreover, the eNB 45 may transmit the RAN policy to multiple terminals in a manner that performs the broadcasting to the base station area, and may transmit the RAN policy only to the UE 10.

Accordingly, based on the approval information 2, the UE 10 can receive the RAN policy.

Moreover, because the approval information 2 does not need necessarily to be transmitted from the H-ANDSF 20A, the RAN policy can be received based on the UE policy, not based on the operator policy. For example, as illustrated in FIG. 19, even in the communication system for which the ANDSF is not configured, the UE 10 can control whether or not to use the RAN policy, based on the approval information 2.

Next, with separate means, the UE 10 determines whether or not to receive the RAN policy from the LTE_AN 80.

For example, a policy of a roaming operator may be received from a V-ANDSF and may be determined based on the received operator policy.

Specifically, the UE 10 searches for the V-ANDSF 20B and ensures a secure communication with the V-ANDSF 20B that is found as a result of the search (S2110). Various methods in which the UE 10 searches for the V-ANDSF 20B are considered, and for example, the V-ANDSF 20B can be searched for by the UE 10 making an inquiry to the DNS server that is installed on the PDN. Various methods in which the UE 10 and the V-ANDSF 20B ensure a secure communication are considered and for example, the IPSec may be used.

Moreover, based on the approval information 1, the approval information 3, or a combination of both, the UE 10 may search for the V-ANDSF 20B or may transmit the control message for establishing a secure combination to the H-ANDSF 20A.

When ensuring the secure communication path between the UE 10 itself and the ANDSF 20, the UE 10 transmits the request for the access network information to the ANDSF 20 (S2112).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the approval information 3, or the combination of both, the UE 10 may transmit the request message.

The V-ANDSF 20B transmits the operator policy notification to the UE 10 (S2114). Based on the reception of the request message that is transmitted from the UE 10, the V-ANDSF 20B may notify the UE 10 of the operator policy notification or may perform the transmission at the timing at which the operator policy is updated or at an arbitrary timing.

The V-ANDSF 20B may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, pieces of approval information may include at least the approval information 4 of the approval information 244.

The UE 10 receives the operator policy notification and acquires the ANDSF policy and the approval information (S2114).

Accordingly, based on the approval information 1, the approval information 3, or the combination of both, the UE 10 can receive the operator policy.

Furthermore, based on the approval information 1, the approval information 3, or the combination of both, the UE 10 may store the received ANDSF policy in the UE policy 142, or by performing the updating and so on, may manage the received ANDSF policy as a UE policy. Additionally, based on the approval information 1, the approval information 3, or the combination of both, the UE 10 may store the approval information 2 that is received from the H-ANDSF 20B, as approval information of the approval information 144, and, by performing the renewal and so on, may manage the received approval information 2, as approval information of the UE.

Based on at least any one piece of approval information, among the approval information 2, the approval information 4, and the approval information 5, the UE 10 may determine that the RAN policy is received. Alternatively, based on a combination of the approval information 2, the approval information 4, and the approval information 5, the UE 10 may determine that the RAN policy is received.

For example, by the approval information 2 being "APPROVED", the UE 10 may receive the RAN policy. For example, by the approval information 4 being "APPROVED", the UE 10 may receive the RAN policy. Alternatively, by the approval information 5 being "APPROVED" and the approval information 4 being "APPROVED", the UE 10 may receive the RAN policy.

Furthermore, even in a case where the approval information 4 is "APPROVED", or even in a case where the approval information 4 is not stored, if the approval information 5 "DISAPPROVED", the UE 10 may determine that the reception of the RAN policy is not performed. In this manner, the operations operator of the H-PLMN can limit the reception processing of the RAN policy at the roaming destination by the UE 10.

Based on this determination, the UE 10 may receive the RAN policy 4542 from LTE (the eNB 45) (S2116).

Next, using the operator policy, the RAN policy, or both, the UE 10 makes a selection of the access system and makes a determination of the communication path switching procedure (S2118).

In the present example, based on the policy of the type 2 whose target is the flow 1, which is stored by the UE 10 in the UE policy 142, and on the RAN policy that is transmitted by the eNB 45, an example of switching a communication path in the flow 1 is described.

Moreover, the ANDSF policy that is stored in the UE policy 142 is the policy of the type 2. This means that, based on the approval information 1, although the UE policy 142 is updated with what is received from the ANDSF 20, any that is stored in the UE policy 142 may be available.

Furthermore, as described so far, the information for identifying the communication, the access network information, the priority level of the access network, and the threshold are stored in the ANDSF policy, in the state of being associated with one another. Additionally, the access network information and the threshold are stored in the RAN policy, in the state of being associated with each other. Specifically, the information for identifying a communication is information for identifying the flow 1, is information indicating LTE and WLAN in the access network information, and is information indicating that LTE takes precedence in terms of the priority level of the access network.

Based on the RAN policy, the UE 10 may determine the switching of the communication path based on the RAN policy. The UE 10 may determine the switching, based on at least one or two pieces of information, among the RSRP, the RSRQ, and the OPI, which are included in the RAN policy.

Furthermore, the communication path to the switching destination and the communication data for performing the switching may be determined based on the ANDSF policy. Specifically, because the information for identifying the communication for the ANDSF policy is information for identifying the flow 1, WLAN is stored as an available access network, it may be determined that a communication in the flow 1 is switched to a communication path that uses WLAN.

Furthermore, from the fact that the ANDSF policy is the policy of the type 2, the switching means may determine that switching of a flow base is performed.

With the procedure described above, the policy reception processing (S1506) is completed. Moreover, because specific policy reception processing relating to the type 2, which is described in 1.3.1.5 according to the first embodiment, a detailed description thereof is omitted.

Subsequently, the communication path switching processing (the communication path switching procedure 1) will be performed (S1508).

At this point, the communication path switching procedure 1 may be that same as the communication path switching procedure 1 that is described in 1.3.1.5. A detailed procedure and processing by each apparatus may be the same as those in the communication path switching procedure 1 that is described in 1.3.1.5.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication in the flow 1 using the communication path 2 (S1512). Moreover, the UE 10 continues the communication in the flow 3 using the communication path 2. Moreover, the UE 10 continues the communication in the flow 2 using the communication path 1 (S1510).

[2.1.1.6 Second Example of the Switching Procedure in which the Policy of the Type 2 is Used]

In the first example of the switching procedure in which the policy of the type 2 is used, which is described in 2.1.1.5, as an example, the communication path 2 is described as being the communication path for the connection to the PGW 40 through the WLAN_ANa 70.

Furthermore, the communication path 2 may be a communication path for the connection to the PGW 40 through the WLAN_ANb 75.

A switching procedure in which the UE 10 uses the policy of the type 2 will be described below referring to FIG. 15.

As illustrated in FIG. 15, the UE 10 in an initial state, establishes the communication path 1, and performs the communications in the flow 1 and the flow 2 (S1502). Additionally, the UE 10 establishes the communication path 2 in addition to the communication path 1, and performs a communication in a flow 3 (S1504). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the WLAN_ANb 75. Additionally, the UE 10 may establish the communication path 1 in the state of being associated with the APN 1. In this manner, in the UE 10 and the PGW 40, the APN 1 and the communication path 2 are associated with each other, and identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying a communication and the communication path 1 correspond to each other are described when the WLAN_ANb access procedure is described in 1.3.1.3, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Next, the UE 10 performs the policy reception processing (S1506). This policy reception processing may be the same processing and procedure as the policy reception processing that is described in 2.1.1.5. For this reason, detailed descriptions thereof are omitted.

Subsequently, the communication path switching processing (the communication path switching procedure 1) will be performed (S1508).

At this point, the communication path switching procedure 1 may be that same as the communication path switching procedure 1 that is described in 1.3.1.6. Because a detailed procedure and processing by each apparatus may be the same as those in the communication path switching procedure 1 that is described in 1.3.1.6, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication in the flow 1 using the communication path 2 (S1512). Moreover, the UE 10 continues the communication in the flow 3 using the communication path 2. Moreover, the UE 10 continues the communication in the flow 2 using the communication path 1 (S1510).

[2.1.1.7 Third Example of the Switching Procedure in which the Policy of the Type 2 is Used]

In the first example of the switching procedure in which the policy of the type 2 is used, which is described in 2.1.1.5, as an example, the communication path 2 is described as being the communication path for the connection to the PGW 40 through the WLAN_ANa 70.

Furthermore, the communication path 2 may be a communication path that is established using the DSMIP.

A switching procedure in which the UE 10 uses the policy of the type 2 will be described below referring to FIG. 15.

As illustrated in FIG. 15, the UE 10 in an initial state, establishes the communication path 1, and performs the communications in the flow 1 and the flow 2 (S1502). Additionally, the UE 10 establishes the communication path 2 in addition to the communication path 1, and performs a communication in a flow 3 (S1504). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1, in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 using the DSMIP. Additionally, the UE 10 may establish the communication path 1 in the state of being associated with the APN 1. In this manner, in the UE 10 and the PGW 40, the APN 1 and the communication path 2 are associated with each other, and identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying the communication and the communication path 1 correspond to each other are described when the attachment procedure in which the DSMIP is used is described in 1.3.1.4, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Next, the UE 10 performs the policy reception processing (S1506). This policy reception processing may be the same processing and procedure as the policy reception processing that is described in 2.1.1.5. For this reason, detailed descriptions thereof are omitted.

Subsequently, the communication path switching processing (the communication path switching procedure 1) will be performed (S1508).

At this point, the communication path switching procedure 1 may be that same as the communication path switching procedure 1 that is described in 1.3.1.7. Because a detailed procedure and processing by each apparatus may be the same as those in the communication path switching procedure 1 that is described in 1.3.1.7, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication in the flow 1 using the communication path 2 (S1512). Moreover, the UE 10 continues the communication in the flow 3 using the communication path 2. Moreover, the UE 10 continues the communication in the flow 2 using the communication path 1 (S1510).

[2.1.2 Control Procedure in which the Policy of the Type 3 is Used]

The present example, that is, an example in which the UE 10 switches a communication path using the ANDSF policy and the RAN policy of the type 3, which are illustrated in a third example of the policy in FIG. 5(*c*), is described.

First, an LTE attachment procedure, a WLAN_ANa attachment procedure, a WLAN_ANb attachment procedure, and an attachment procedure in which the DSMIP is used, all of which lead to the initial state of the UE 10 where the control procedure in which the policy according to the present embodiment is used is executed, are described.

[2.1.2.1 LTE Attachment Procedure]

The UE 10 establishes the communication path through the LTE access system (the LTE_AN 80). An LTE attachment procedure may be the same as the LTE attachment procedure that is described in 1.3.1.1 referring to FIG. 11. Moreover, processing by each apparatus that is involved in the attachment procedure may also be the same as that which is described in 1.3.1.1 referring to FIG. 11. For this reason, a detailed description thereof is omitted.

[2.1.2.2 WLAN_ANa Attachment Procedure]

The UE 10 establishes the communication path through the WLAN_ANa 70. A WLAN_ANa 70 attachment procedure may be the same as the WLAN_ANa 70 attachment procedure that is described in 1.3.1.2 referring to FIG. 12. Moreover, processing by each apparatus that is involved in the attachment procedure may also be the same as that which is described in 1.3.1.2 referring to FIG. 12. For this reason, a detailed description thereof is omitted.

[2.1.2.3 WLAN_ANb Attachment Procedure]

The UE 10 establishes the communication path through the WLAN_ANb 70. A WLAN_ANb 70 attachment procedure may be the same as the WLAN_ANa 70 attachment procedure that is described in 1.3.1.3 referring to FIG. 13. Moreover, processing by each apparatus that is involved in the attachment procedure may also be the same as that which is described in 1.3.1.3 referring to FIG. 13. For this reason, a detailed description thereof is omitted.

[2.1.2.4 Attachment Procedure in which the DSMIP is Used]

The UE 10 establishes the communication path using the DSMIP. An attachment procedure in which the DSMIP is used is the same as the attachment procedure in which the DSMIP is used, which is described in 1.3.1.4 referring to FIG. 13. Moreover, processing by each apparatus that is involved in the attachment procedure may also be the same as that which is described in 1.3.1.4 referring to FIG. 13. For this reason, a detailed description thereof is omitted.

With the attachment procedure in which the DSMIP is used, the UE 10 can establish the communication path through the WLAN_ANa 70 or the communication path through the WLAN_ANb 75.

[2.1.2.5 First Example of a Switching Procedure in which the Policy of the Type 3 is Used]

Next, a switching procedure in which the UE 10 uses the policy of the type 3 is described referring to FIG. 16.

As illustrated in FIG. 16, the UE 10 in the initial state establishes the communication path 1, and performs the communication that is associated with the APN (S1602). For example, the UE 10 may manage the flow 1 and the flow 2 in the state of being associated with the APN 1, and may perform these communications using the communication path 1. Additionally, the UE 10 establishes the communication path 2 in addition to the communication path 1, and performs the communication that is associated with the APN (S1604). For example, the UE 10 may manage the flow 3 in the state of being associated with the APN 2, and may perform these communications using the communication path 1.

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 1 in the state of being associated with the APN 2. In this manner, in the UE 10 and the PGW 40, the APN 2 and the communication path 2 are associated with each other, and the identification information for identifying the communication in the flow 3 and the communication path 2 are associated with each other.

Moreover, because a specific method of establishing the communication path 2, a management method in which the APN 2 and the communication path 2 correspond to each other, and a management method in which the identification information for identifying a communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1606). An example of the policy reception processing will be described below referring to FIG. 21.

First, the UE 10 executes the procedure for receiving the operator policy. Moreover, whether or not to receive the operator policy may be determined based on the approval information 1 of the approval information 144. More precisely, in the case where the approval information 1 is set to be "APPROVED", the operator policy may be received. Furthermore, in the case where the approval information 1 is set to be "DISAPPROVED", the present procedure may be ended without receiving the operator policy.

A specific example for receiving the operator policy will be described below. The UE 10 searches for the H-ANDSF 20A and ensures a secure communication with the H-ANDSF 20A that is found as a result of the search (S2104). Various methods in which the UE 10 searches for the H-ANDSF 20A are considered, and for example, the H-ANDSF 20A can be searched for by the UE 10 making an inquiry to the DNS server that is installed on the PDN. Various methods in which the UE 10 and the H-ANDSF 20A ensure a secure communication are considered and for example, the IPSec may be used.

Moreover, based on the approval information 1, the UE 10 may search for the H-ANDSF 20A or may transmit the control message for establishing a secure communication path to the H-ANDSF 20A.

When ensuring the secure communication path between the UE 10 itself and the ANDSF 20, the UE 10 transmits the request for the access network information to the ANDSF 20 (S2106).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the UE 10 may transmit the request message.

The H-ANDSF 20A transmits the operator policy notification to the UE 10 (S2108). Based on the reception of the request message that is transmitted from the UE 10, the H-ANDSF 20A may notify the UE 10 of the operator policy notification or may perform the transmission at the timing at which the operator policy is updated or at an arbitrary timing.

The H-ANDSF 20A may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, pieces of approval information may include at least one or two pieces of approval information, among the approval information 2, the approval information 3, and the approval information 5 of the approval information 244.

The UE 10 receives the operator policy notification and acquires the ANDSF policy and the approval information.

Accordingly, based on the approval information 1, the UE 10 can receive the operator policy.

Furthermore, based on the approval information 1, the UE 10 may store the received ANDSF policy in the UE policy 142, or by performing the updating and so on, may manage the received ANDSF policy as a UE policy. Additionally, based on the approval information 1, the UE 10 may store the approval information 2 that is received from the H-ANDSF 20A, as approval information of the approval information 144, and, by performing the renewal and so on, may manage the received approval information 2, as approval information of the UE.

Next, the UE 10 determines whether or not to receive the RAN policy from the LTE_AN 80.

At this point, based on the approval information 2 of the approval information 144, the UE 10 may receive the RAN policy. For example, in the case where the approval information 2 is "APPROVED", the RAN policy may be received. Furthermore, in the case where the approval information 2 is "DISAPPROVED", a configuration, such as one in which the RAN policy is not performed, may be performed.

Furthermore, based on the approval information 2 that is received from the ANDSF 20, the UE 10 may receive the RAN policy, and, based on the renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the roaming home mobile operator.

Moreover, the eNB 45 may transmit the RAN policy to multiple terminals in a manner that performs the broadcasting to the base station area, and may transmit the RAN policy only to the UE 10.

Accordingly, based on the approval information 2, the UE 10 can receive the RAN policy.

Moreover, because the approval information 2 does not need necessarily to be transmitted from the H-ANDSF 20A, the RAN policy can be received based on the UE policy, not based on the operator policy. For example, as illustrated in FIG. 19, even in the communication system for which the ANDSF is not configured, the UE 10 can control whether or not to use the RAN policy, based on the approval information 2.

Next, with separate means, the UE 10 determines whether or not to receive the RAN policy from the LTE_AN 80.

For example, the policy of the roaming operator may be received from the V-ANDSF and may be determined based on the received operator policy.

Specifically, the UE 10 searches for the V-ANDSF 20B and ensures a secure communication with the V-ANDSF 20B that is found as a result of the search (S2110). Various methods in which the UE 10 searches for the V-ANDSF 20B are considered, and for example, the V-ANDSF 20B can be searched for by the UE 10 making an inquiry to the DNS server that is installed on the PDN. Various methods in which the UE 10 and the V-ANDSF 20B ensure a secure communication are considered and for example, the IPSec may be used.

Moreover, based on the approval information 1, the approval information 3, or the combination of both, the UE 10 may search for the V-ANDSF 20B or may transmit the control message for establishing a secure combination to the H-ANDSF 20A.

When ensuring the secure communication path between the UE 10 itself and the ANDSF 20, the UE 10 transmits the request for the access network information to the ANDSF 20 (S2112).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the approval information 3, or the combination of both, the UE 10 may transmit the request message.

The V-ANDSF 20B transmits the operator policy notification to the UE 10 (S2114). Based on the reception of the request message that is transmitted from the UE 10, the V-ANDSF 20B may notify the UE 10 of the operator policy notification or may perform the transmission at the timing at which the operator policy is updated or at an arbitrary timing.

The V-ANDSF 20B may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included. Furthermore, pieces of approval information may include at least the approval information 4 of the approval information 244.

The UE 10 receives the operator policy notification and acquires the ANDSF policy and the approval information (S2114).

Accordingly, based on the approval information 1, the approval information 3, or the combination of both, the UE 10 can receive the operator policy. Furthermore, based on the approval information 1, the approval information 3, or the combination of both, the UE 10 may store the received ANDSF policy in the UE policy 142, or by performing the updating and so on, may manage the received ANDSF policy as a UE policy. Additionally, based on the approval information 1, the approval information 3, or the combination of both, the UE 10 may store the approval information 2 that is received from the H-ANDSF 20B, as approval information of the approval information 144, and, by performing the renewal and so on, may manage the received approval information 2, as approval information of the UE.

Based on at least any one piece of approval information, among the approval information 2, the approval information 4, and the approval information 5, the UE 10 may determine that the RAN policy is received. Alternatively, based on the combination of the approval information 2, the approval information 4, and the approval information 5, the UE 10 may determine that the RAN policy is received.

For example, by the approval information 2 being "APPROVED", the UE 10 may receive the RAN policy. For example, by the approval information 4 being "APPROVED", the UE 10 may receive the RAN policy. Alternatively, by the approval information 5 being "APPROVED" and the approval information 4 being "APPROVED", the UE 10 may receive the RAN policy.

Furthermore, even in the case where the approval information 4 is "APPROVED", or even in the case where the approval information 4 is not stored, if the approval information 5 "DISAPPROVED", the UE 10 may determine that the reception of the RAN policy is not performed. In this manner, the operations operator of the H-PLMN can limit the reception processing of the RAN policy at the roaming destination by the UE 10.

Based on this determination, the UE 10 may receive the RAN policy 4542 from LTE (the eNB 45) (S2116).

Next, using the operator policy, the RAN policy, or both, the UE 10 makes a selection of the access system and makes a determination of the communication path switching procedure (S2118).

In the present example, that is, an example in which, based on the policy of the type 3 whose target is a communication that is associated with the APN 1, which is stored by the UE 10 in the UE policy 142, and on the RAN policy that is transmitted by the eNB 45, a communication path for the communication that is associated with the APN 1 is switched is described.

Moreover, the ANDSF policy that is stored in the UE policy 142 is the policy of the type 3. This means that, based on the approval information 1, although the UE policy 142 is updated with what is received from the ANDSF 20, any that is stored in the UE policy 142 may be available.

Furthermore, as described so far, the information for identifying the communication, the access network information, the priority level of the access network, and the threshold are stored in the ANDSF policy, in the state of being associated with one another. Additionally, the access network information and the threshold are stored in the RAN policy, in the state of being associated with each other. Specifically, the information for identifying the communication is information for identifying the APN 1, is information indicating LTE and WLAN in the access network information, and is information indicating that LTE takes precedence in terms of the priority level of the access network. Moreover, specifically, the information for identifying the communication may be an APN for identifying the APN 1.

Based on the RAN policy, the UE 10 may determine the switching of the communication path based on the RAN policy. The UE 10 may determine the switching, based on at least one or two pieces of information, among the RSRP, the RSRQ, and the OPI, which are included in the RAN policy.

Furthermore, the communication path to the switching destination and the communication data for performing the switching may be determined based on the ANDSF policy. Specifically, because the information for identifying the communication for the ANDSF policy is information for identifying the flow 1, WLAN is stored as an available access network, it may be determined that communication which is associated with to the APN 1 is switched to the communication path that uses WLAN.

Furthermore, from the fact that the ANDSF policy is the policy of the type 3, the switching means may determine that switching of an APN base is performed.

With the procedure described above, the policy reception processing (S1606) is completed. Moreover, because specific policy reception processing relating to the type 3, which is described in 1.3.2.5 according to the first embodiment, a detailed description thereof is omitted.

Subsequently, the communication path switching processing (the communication path switching procedure 2) will be performed (S1608). At this point, the communication path switching procedure 2 may be that same as the communication path switching procedure 2 that is described in 1.3.2.5. Because a detailed procedure and processing by each apparatus may be the same as those in the communication path switching procedure 2 that is described in 1.3.2.5, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication that is associated with the APN 1, using the communication path 3 (S1610). Moreover, the UE 10 continues the communication that is associated with the APN 2, using the communication path 2 (S1612).

Additionally, the UE 10 and the PGW 10 may execute the resource release procedure (S1614). With the resource release procedure, the UE 10 and the PGW 10 may execute the communication path deletion processing such as the release of the resource for the communication path 1 or the deletion of the communication path information.

[2.1.2.6 Second Example of the Switching Procedure in which the Policy of the Type 3 is Used]

In the first example of the switching procedure in which the policy of the type 2 is used, which is described in 2.1.2.5, as an example, the communication path 3 is described as being the communication path for the connection to the PGW 40 through the WLAN_ANa 70. Furthermore, the communication path 3 may be a communication path for the connection to the PGW 40 through the WLAN_ANb 75.

The switching procedure in which the UE 10 uses the policy of the type 3 will be described below referring to FIG. 16.

As illustrated in FIG. 16, the UE 10 in the initial state establishes the communication path 1, and performs the communication that is associated with the APN (S1602). For example, the UE 10 may manage the flow 1 and the flow 2 in the state of being associated with the APN 1, and may perform these communications using the communication path 1. Additionally, the UE 10 establishes the communication path 2 in addition to the communication path 1, and performs the communication that is associated with the APN (S1604). For example, the UE 10 may manage the flow 3 in the state of being associated with the APN 2, and may perform these communications using the communication path 1.

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 1 in the state of being associated with the APN 2. In this manner, in the UE 10 and the PGW 40, the APN 2 and the communication path 2 are associated with each other, and the identification information for identifying the communication in the flow 3 and the communication path 2 are associated with each other.

Moreover, because a specific method of establishing the communication path 2, a management method in which the APN 2 and the communication path 2 correspond to each other, and a management method in which the identification information for identifying a communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1606). This policy reception processing may be the same processing and procedure as the policy reception processing that is described in 2.1.2.5. For this reason, detailed descriptions thereof are omitted.

Subsequently, the communication path switching processing (the communication path switching procedure 2) will be performed (S1608). At this point, the communication path switching procedure 2 may be that same as the communication path switching procedure 2 that is described in 1.3.2.6. Because a detailed procedure and processing by each apparatus may be the same as those in the communication path switching procedure 2 that is described in 1.3.2.6, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication that is associated with the APN 1, using the communication path 3 (S1610). Moreover, the UE 10 continues the communication that is associated with the APN 2, using the communication path 2 (S1612).

Additionally, the UE 10 and the PGW 10 may execute the resource release procedure (S1614). With the resource release procedure, the UE 10 and the PGW 10 may execute the communication path deletion processing such as the release of the resource for the communication path 1 or the deletion of the communication path information.

[2.1.2.7 Third Example of the Switching Procedure in which the Policy of the Type 3 is Used]

In the first example of the switching procedure in which the policy of the type 2 is used, which is described in 2.1.2.5, as an example, the communication path 3 is described as being the communication path for the connection to the PGW 40 through the WLAN_ANa 70.

Furthermore, the communication path 3 may be a communication path that is established using the DSMIP.

The switching procedure in which the UE 10 uses the policy of the type 3 will be described below referring to FIG. 16.

As illustrated in FIG. 16, the UE 10 in the initial state establishes the communication path 1, and performs the communication that is associated with the APN (S1602). For example, the UE 10 may manage the flow 1 and the flow 2 in the state of being associated with the APN 1, and may perform these communications using the communication path 1. Additionally, the UE 10 establishes the communication path 2 in addition to the communication path 1, and performs the communication that is associated with the APN (S1604). For example, the UE 10 may manage the flow 3 in the state of being associated with the APN 2, and may perform these communications using the communication path 1.

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 1 in the state of being associated with the APN 2. In this manner, in the UE 10 and the PGW 40, the APN 2 and the communication path 2 are associated with each other, and the identification information for identifying the communication in the flow 3 and the communication path 2 are associated with each other.

Moreover, because a specific method of establishing the communication path 2, a management method in which the APN 2 and the communication path 2 correspond to each other, and a management method in which the identification information for identifying a communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1606). This policy reception processing may be the same processing and procedure as the policy reception processing that is described in 2.1.2.5. For this reason, detailed descriptions thereof are omitted.

Subsequently, the communication path switching processing (the communication path switching procedure 2) will be performed (S1608). At this point, the communication path switching procedure 2 may be that same as the communication path switching procedure 2 that is described in 1.3.2.7. Because a detailed procedure and processing by each apparatus may be the same as those in the communication path switching procedure 2 that is described in 1.3.2.7, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication that is associated with the APN 1, using the communication path 3 (S1610). Moreover, the UE 10 continues the communication that is associated with the APN 2, using the communication path 2 (S1612).

Additionally, the UE 10 and the PGW 10 may execute the resource release procedure (S1614). With the resource release procedure, the UE 10 and the PGW 10 may execute the communication path deletion processing such as the release of the resource for the communication path 1 or the deletion of the communication path information.

[2.1.3 Control Procedure in which the Policy of the Type 1 is Used]

The present example, that is, an example in which the UE 10 switches a communication path using the ANDSF policy and the RAN policy of the type 1, which are illustrated in a first example of the policy in FIG. 5(*a*), is described.

First, an LTE attachment procedure, a WLAN_ANa attachment procedure, a WLAN_ANb attachment procedure, and an attachment procedure in which the DSMIP is used, all of which lead to the initial state of the UE 10 where the control procedure in which the policy according to the present embodiment is used is executed, are described.

[2.1.3.1 LTE Attachment Procedure]

The UE 10 establishes the communication path through the LTE access system (the LTE_AN 80). An LTE attachment procedure may be the same as the LTE attachment procedure that is described in 1.3.1.1 referring to FIG. 11. Moreover, processing by each apparatus that is involved in the attachment procedure may also be the same as that which is described in 1.3.1.1 referring to FIG. 11. For this reason, a detailed description thereof is omitted.

[2.1.3.2 WLAN_ANa Attachment Procedure]

The UE 10 establishes the communication path through the WLAN_ANa 70. A WLAN_ANa 70 attachment procedure may be the same as the WLAN_ANa 70 attachment procedure that is described in 1.3.1.2 referring to FIG. 12. Moreover, processing by each apparatus that is involved in the attachment procedure may also be the same as that which is described in 1.3.1.2 referring to FIG. 12. For this reason, a detailed description thereof is omitted.

[2.1.3.3 WLAN_ANb Attachment Procedure]

The UE 10 establishes the communication path through the WLAN_ANb 70. A WLAN_ANb 70 attachment procedure may be the same as the WLAN_ANa 70 attachment procedure that is described in 1.3.1.3 referring to FIG. 13. Moreover, processing by each apparatus that is involved in the attachment procedure may also be the same as that which is described in 1.3.1.3 referring to FIG. 13. For this reason, a detailed description thereof is omitted.

[2.1.3.4 Attachment Procedure in which the DSMIP is Used]

The UE 10 establishes the communication path using the DSMIP. An attachment procedure in which the DSMIP is used is the same as the attachment procedure in which the DSMIP is used, which is described in 1.3.1.4 referring to FIG. 13. Moreover, processing by each apparatus that is involved in the attachment procedure may also be the same as that which is described in 1.3.1.4 referring to FIG. 13. For this reason, a detailed description thereof is omitted.

With the attachment procedure in which the DSMIP is used, the UE 10 can establish the communication path through the WLAN_ANa 70 or the communication path through the WLAN_ANb 75.

[2.1.3.5 First Example of a Switching Procedure in which the Policy of the Type 1 is Used]

Next, a switching procedure in which the UE 10 uses the policy of the type 1 is described referring to FIG. 17.

As illustrated in FIG. 17, the UE 10 in the initial state establishes the communication path 1, and performs the communication that is associated with the APN (S1702). For example, the UE 10 may manage the communication path 1 in the state of being associated with the APN 1, and may perform these communications using the communication path 1. Additionally, the UE 10 establishes the communication path 2 in addition to the communication path 1, and performs the communication that is associated with the APN (S1704). For example, the UE 10 may manage the communication path 2 in the state of being associated with the APN 2, and may perform these communications using the communication path 1.

Moreover, the communication that is associated with the APN may be a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the LTE_AN 80. Additionally, the UE 10 may establish the communication path 2 in the state of being associated with the APN 2. In this manner, in the UE 10 and the PGW 40, the APN 2 and the communication path 2 are associated with each other.

Moreover, because a specific method of establishing the communication path 2, a management method in which the APN 2 and the communication path 2 correspond to each other, and a management method in which the identification information for identifying a communication and the communication path 2 correspond to each other are described when the LTE access procedure or the PDN connection establishment procedure is described in 1.3.1.1, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1706). An example of the policy reception processing will be described below referring to FIG. 21.

First, the UE 10 executes the procedure for receiving the operator policy. Moreover, whether or not to receive the operator policy may be determined based on the approval information 1 of the approval information 144. More precisely, in the case where the approval information 1 is set to be "APPROVED", the operator policy may be received. Furthermore, in the case where the approval information 1 is set to be "DISAPPROVED", the present procedure may be ended without receiving the operator policy.

A specific example for receiving the operator policy will be described below.

The UE 10 searches for the H-ANDSF 20A and ensures a secure communication with the H-ANDSF 20A that is found as the result of the search (S2104). Various methods in which the UE 10 searches for the H-ANDSF 20A are considered, and for example, the H-ANDSF 20A can be searched for by the UE 10 making an inquiry to the DNS server that is installed on the PDN. Various methods in which the UE 10 and the H-ANDSF 20A ensure a secure communication are considered and for example, the IPSec may be used.

Moreover, based on the approval information 1, the UE 10 may search for the H-ANDSF 20A or may transmit the control message for establishing a secure communication path to the H-ANDSF 20A.

When ensuring the secure communication path between the UE 10 itself and the ANDSF 20, the UE 10 transmits the request for the access network information to the ANDSF 20 (S2106).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the UE 10 may transmit the request message.

The H-ANDSF 20A transmits the operator policy notification to the UE 10 (S2108). Based on the reception of the request message that is transmitted from the UE 10, the H-ANDSF 20A may notify the UE 10 of the operator policy notification or may perform the transmission at the timing at which the operator policy is updated or at an arbitrary timing.

The H-ANDSF 20A may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, pieces of approval information may include at least one or two pieces of approval information, among the approval information 2, the approval information 3, and the approval information 5 of the approval information 244.

The UE 10 receives the operator policy notification and acquires the ANDSF policy and the approval information.

Accordingly, based on the approval information 1, the UE 10 can receive the operator policy.

Furthermore, based on the approval information 1, the UE 10 may store the received ANDSF policy in the UE policy 142, or by performing the updating and so on, may manage the received ANDSF policy as a UE policy. Additionally, based on the approval information 1, the UE 10 may store the approval information 2 that is received from the H-ANDSF 20A, as approval information of the approval information 144, and, by performing the renewal and so on, may manage the received approval information 2, as approval information of the UE.

Next, the UE 10 determines whether or not to receive the RAN policy from the LTE_AN 80.

At this point, based on the approval information 2 of the approval information 144, the UE 10 may receive the RAN policy. For example, in the case where the approval information 2 is "APPROVED", the RAN policy may be received. Furthermore, in the case where the approval information 2 is "DISAPPROVED", a configuration, such as one in which the RAN policy is not performed, may be performed.

Furthermore, based on the approval information 2 that is received from the ANDSF 20, the UE 10 may receive the RAN policy, and, based on the renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the roaming home mobile operator.

Moreover, the eNB 45 may transmit the RAN policy to multiple terminals in a manner that performs the broadcasting to the base station area, and may transmit the RAN policy only to the UE 10.

Accordingly, based on the approval information 2, the UE 10 can receive the RAN policy.

Moreover, because the approval information 2 does not need necessarily to be transmitted from the H-ANDSF 20A, the RAN policy can be received based on the UE policy, not based on the operator policy. For example, as illustrated in FIG. 19, even in the communication system for which the ANDSF is not configured, the UE 10 can control whether or not to use the RAN policy, based on the approval information 2.

Next, with separate means, the UE 10 determines whether or not to receive the RAN policy from the LTE_AN 80.

For example, the policy of the roaming operator may be received from the V-ANDSF and may be determined based on the received operator policy.

Specifically, the UE 10 searches for the V-ANDSF 20B and ensures a secure communication with the V-ANDSF 20B that is found as the result of the search (S2110). Various methods in which the UE 10 searches for the V-ANDSF 20B are considered, and for example, the V-ANDSF 20B can be searched for by the UE 10 making an inquiry to the DNS server that is installed on the PDN. Various methods in which the UE 10 and the V-ANDSF 20B ensure a secure communication are considered and for example, the IPSec may be used.

Moreover, based on the approval information 1, the approval information 3, or the combination of both, the UE 10 may search for the V-ANDSF 20B or may transmit the control message for establishing a secure combination to the H-ANDSF 20A.

When ensuring the secure communication path between the UE 10 itself and the ANDSF 20, the UE 10 transmits the request for the access network information to the ANDSF 20 (S2112).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the approval information 3, or the combination of both, the UE 10 may transmit the request message.

The V-ANDSF 20B transmits the operator policy notification to the UE 10 (S2114). Based on the reception of the request message that is transmitted from the UE 10, the V-ANDSF 20B may notify the UE 10 of the operator policy notification or may perform the transmission at the timing at which the operator policy is updated or at an arbitrary timing.

The V-ANDSF 20B may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, pieces of approval information may include at least the approval information 4 of the approval information 244.

The UE 10 receives the operator policy notification and acquires the ANDSF policy and the approval information (S2114).

Accordingly, based on the approval information 1, the approval information 3, or the combination of both, the UE 10 can receive the operator policy.

Furthermore, based on the approval information 1, the approval information 3, or the combination of both, the UE 10 may store the received ANDSF policy in the UE policy 142, or by performing the updating and so on, may manage the received ANDSF policy as a UE policy. Additionally, based on the approval information 1, the approval information 3, or the combination of both, the UE 10 may store the approval information 2 that is received from the H-ANDSF 20B, as approval information of the approval information 144, and, by performing the renewal and so on, may manage the received approval information 2, as approval information of the UE.

Based on at least any one piece of approval information, among the approval information 2, the approval information 4, and the approval information 5, the UE 10 may determine that the RAN policy is received. Alternatively, based on the combination of the approval information 2, the approval information 4, and the approval information 5, the UE 10 may determine that the RAN policy is received.

For example, by the approval information 2 being "APPROVED", the UE 10 may receive the RAN policy. For example, by the approval information 4 being "APPROVED", the UE 10 may receive the RAN policy. Alternatively, by the approval information 5 being "APPROVED" and the approval information 4 being "APPROVED", the UE 10 may receive the RAN policy.

Furthermore, even in the case where the approval information 4 is "APPROVED", or even in the case where the approval information 4 is not stored, if the approval information 5 "DISAPPROVED", the UE 10 may determine that the reception of the RAN policy is not performed. In this manner, the operations operator of the H-PLMN can limit the reception processing of the RAN policy at the roaming destination by the UE 10.

Based on this determination, the UE 10 may receive the RAN policy 4542 from LTE (the eNB 45) (S2116).

Next, using the operator policy, the RAN policy, or both, the UE 10 makes a selection of the access system and makes a determination of the communication path switching procedure (S2118).

In the present example, that is, an example in which, based on the policy of the type 1 whose targets are all communications by the UE 10, which is stored by the UE 10 in the UE policy 142, and on the RAN policy that is transmitted by the eNB 45, the communication path for the communication that is associated with the APN 1 is switched is described.

Moreover, the ANDSF policy that is stored in the UE policy 142 is the policy of the type 1. This means that, based on the approval information 1, although the UE policy 142 is updated with what is received from the ANDSF 20, any that is stored in the UE policy 142 may be available.

Furthermore, as described so far, the information for identifying the communication, the access network information, the priority level of the access network, and the threshold are stored in the ANDSF policy, in the state of being associated with one another. Additionally, the access network information and the threshold are stored in the RAN policy, in the state of being associated with each other. Specifically, the information for identifying the communication is information indicating all communications, is information indicating LTE and WLAN in the access network information, and is information indicating that LTE takes precedence in terms of the priority level of the access network. Moreover, specifically, because the information for identifying the communication is information indicating all communications, all communications may be implicitly identified not by not including the identification information, without the identification information being explicitly included in the policy.

Based on the RAN policy, the UE 10 may determine the switching of the communication path based on the RAN policy. The UE 10 may determine the switching, based on at least one or two pieces of information, among the RSRP, the RSRQ, and the OPI, which are included in the RAN policy.

Furthermore, the communication path to the switching destination and the communication data for performing the switching may be determined based on the ANDSF policy. Specifically, because the information for identifying the communication for the ANDSF policy is information for identifying all communications and WLAN is stored as an available access network, it may be determined that all communication by the UE 10 are switched to the communication path that uses WLAN.

Furthermore, from the fact that the ANDSF policy is the policy of the type 1, the switching means may determine that the switching of all communications is performed.

With the procedure described above, the policy reception processing (S1706) is completed. Moreover, because specific policy reception processing relating to the type 1, which is described in 1.3.3.5 according to the first embodiment, a detailed description thereof is omitted. Subsequently, the communication path switching processing (the communication path switching procedure 3) will be performed (S1708).

At this point, the communication path switching procedure 3 may be that same as the communication path switching procedure 3 that is described in 1.3.3.5. Because a detailed procedure and processing by each apparatus may be the same as those in the communication path switching procedure 3 that is described in 1.3.3.5, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication that is associated with the APN 1, using the communication path 3 (S1710). Additionally, the UE 10 can continue the communication that is associated with the APN 2, using the communication path 4 (S1712).

Additionally, the UE 10 and the PGW 10 may execute the resource release procedure (S1714). With the resource release procedure, the UE 10 and the PGW 10 may execute the communication path deletion processing such as the release of resources for the communication path 1 and the communication path 2 or the deletion of the communication path information.

[2.1.3.6 Second Example of the Switching Procedure in which the Policy of the Type 1 is Used]

In the first example of the switching procedure in which the policy of the type 1 is used, which is described in 2.1.3.5, as an example, the communication path 3 and the communication path 4 are described as being the communication paths for the connection to the PGW 40 through the WLAN_ANa 70.

Furthermore, the communication path 3 and the communication path 4 may be communication paths for the connection to the PGW 40 through the WLAN_ANb 75.

The switching procedure in which the UE 10 uses the policy of the type 1 will be described below referring to FIG. 17.

Procedures and processing operations up to and including the policy reception processing (S1706) by each of the apparatuses that include the UE 10 may be the same as the procedures and processing operations that are performed in 1.3.3.6. Specifically, procedures for the communication path 1 and the communication path 2, and processing by each apparatus may be the same as the procedures and processing that are described in 1.3.3.6. For this reason, detailed descriptions thereof are omitted.

Additionally, the UE 10 performs the policy reception processing (S1706). This policy reception processing may be the same processing and procedure as the policy reception processing that is described in 2.1.3.5. For this reason, detailed descriptions thereof are omitted.

Subsequently, the communication path switching processing (the communication path switching procedure 3) will be performed (S1708).

At this point, the communication path switching procedure 3 may be that same as the communication path switching procedure 3 that is described in 1.3.3.6. Because a detailed procedure and processing by each apparatus may be the same as those in the communication path switching procedure 3 that is described in 1.3.3.6, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication that is associated with the APN 1, using the communication path 3 (S1710). Additionally, the UE 10 can continue the communication that is associated with the APN 2, using the communication path 4 (S1712).

Additionally, the UE 10 and the PGW 10 may execute the resource release procedure (S1714). With the resource release procedure, the UE 10 and the PGW 10 may execute the communication path deletion processing such as the release of resources for the communication path 1 and the communication path 2 or the deletion of the communication path information.

[2.1.3.7 Third Example of the Switching Procedure in which the Policy of the Type 1 is Used]

In the first example of the switching procedure in which the policy of the type 1 is used, which is described in 2.1.3.5, as an example, the communication path 3 and the communication path 4 are described as being the communication paths for the connection to the PGW 40 through the WLAN_ANa 70.

Furthermore, the communication path 3, the communication path 4, and the communication path 3 may be communication paths that are established using the DSMIP.

The switching procedure in which the UE 10 uses the policy of the type 3 will be described below referring to FIG. 17.

Procedures and processing operations up to and including the policy reception processing (S1706) by each of the apparatuses that include the UE 10 may be the same as the procedures and processing operations that are performed in 1.3.3.6. Specifically, procedures for the communication path 1 and the communication path 2, and processing by each apparatus may be the same as the procedures and processing that are described in 1.3.3.6. For this reason, detailed descriptions thereof are omitted.

Additionally, the UE 10 performs the policy reception processing (S1706). This policy reception processing may be the same processing and procedure as the policy reception processing that is described in 2.1.3.5. For this reason, detailed descriptions thereof are omitted.

Subsequently, the communication path switching processing (the communication path switching procedure 3) will be performed (S1708).

At this point, the communication path switching procedure 3 may be that same as the communication path switching procedure 3 that is described in 1.3.3.7. Because a detailed procedure and processing by each apparatus may be the same as those in the communication path switching procedure 3 that is described in 1.3.3.7, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication that is associated with the APN 1, using the communication path 3 (S1710). Additionally, the UE 10 can continue the communication that is associated with the APN 2, using the communication path 4 (S1712).

Additionally, the UE 10 and the PGW 10 may execute the resource release procedure (S1714). With the resource release procedure, the UE 10 and the PGW 10 may execute the communication path deletion processing such as the release of resources for the communication path 1 and the communication path 2 or the deletion of the communication path information.

[2.1.4 Control Procedure in which the Policy of the Type 4 is Uses]

The present example, that is, an example in which the UE 10 switches a communication path using the ANDSF policy and the RAN policy of the type 4, which are illustrated in a fourth example of the policy in FIG. 5(d), is described.

First, an LTE attachment procedure, a WLAN_ANa attachment procedure, a WLAN_ANb attachment procedure, and an attachment procedure in which the DSMIP is used, all of which lead to the initial state of the UE 10 where the control procedure in which the policy according to the present embodiment is used is executed, are described.

[2.1.4.1 LTE Attachment Procedure]

The UE 10 establishes the communication path through the LTE access system (the LTE_AN 80). An LTE attachment procedure may be the same as the LTE attachment procedure that is described in 1.3.1.1 referring to FIG. 11. Moreover, processing by each apparatus that is involved in the attachment procedure may also be the same as that which is described in 1.3.1.1 referring to FIG. 11. For this reason, a detailed description thereof is omitted.

[2.1.4.2 WLAN_ANa Attachment Procedure]

The UE 10 establishes the communication path through the WLAN_ANa 70. A WLAN_ANa 70 attachment procedure may be the same as the WLAN_ANa 70 attachment procedure that is described in 1.3.1.2 referring to FIG. 12. Moreover, processing by each apparatus that is involved in the attachment procedure may also be the same as that which is described in 1.3.1.2 referring to FIG. 12. For this reason, a detailed description thereof is omitted.

[2.1.4.3 WLAN_ANb Attachment Procedure]

The UE 10 establishes the communication path through the WLAN_ANb 70. A WLAN_ANb 70 attachment procedure may be the same as the WLAN_ANa 70 attachment procedure that is described in 1.3.1.3 referring to FIG. 13. Moreover, processing by each apparatus that is involved in the attachment procedure may also be the same as that which is described in 1.3.1.3 referring to FIG. 13. For this reason, a detailed description thereof is omitted.

[2.1.4.4 Attachment Procedure in which the DSMIP is Used]

The UE 10 establishes the communication path using the DSMIP. An attachment procedure in which the DSMIP is used is the same as the attachment procedure in which the DSMIP is used, which is described in 1.3.1.4 referring to FIG. 13. Moreover, processing by each apparatus that is involved in the attachment procedure may also be the same as that which is described in 1.3.1.4 referring to FIG. 13. For this reason, a detailed description thereof is omitted.

With the attachment procedure in which the DSMIP is used, the UE 10 can establish the communication path through the WLAN_ANa 70 or the communication path through the WLAN_ANb 75.

[2.1.4.5 First Example of a Switching Procedure of the Policy of the Type 4 is Used]

Next, a switching procedure in which the UE 10 uses the policy of the type 4 is described referring to FIG. 16.

As illustrated in FIG. 18, the UE 10 in the initial state establishes the communication path 1, and performs the communications in the flow 1 and the flow 2 (S1802). Additionally, the UE 10 establishes the communication path 2 in addition to the communication path 1, and performs the communication in the flow 3 (S1804). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the WLAN_ANa 70. Additionally, the UE 10 may establish the communication path 1 in the state of being associated with the APN 2. In this manner, in the UE 10 and the PGW 40, the APN 2 and the communication path 2 are associated with each other, and the identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying a communication and the communication path 1 correspond to each other are described when the WLAN_ANa access procedure is described in 1.3.1.2, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1806). An example of the policy reception processing will be described below referring to FIG. 21.

First, the UE 10 executes the procedure for receiving the operator policy. Moreover, whether or not to receive the operator policy may be determined based on the approval information 1 of the approval information 144. More precisely, in the case where the approval information 1 is set to be "APPROVED", the operator policy may be received. Furthermore, in the case where the approval information 1 is set to be "DISAPPROVED", the present procedure may be ended without receiving the operator policy.

A specific example for receiving the operator policy will be described below.

The UE 10 searches for the H-ANDSF 20A and ensures a secure communication with the H-ANDSF 20A that is found as the result of the search (S2104). Various methods in which the UE 10 searches for the H-ANDSF 20A are considered, and for example, the H-ANDSF 20A can be searched for by the UE 10 making an inquiry to the DNS server that is installed on the PDN. Various methods in which the UE 10 and the H-ANDSF 20A ensure a secure communication are considered and for example, the IPSec may be used.

Moreover, based on the approval information 1, the UE 10 may search for the H-ANDSF 20A or may transmit the control message for establishing a secure communication path to the H-ANDSF 20A.

When ensuring the secure communication path between the UE 10 itself and the ANDSF 20, the UE 10 transmits the request for the access network information to the ANDSF 20 (S2106).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the UE 10 may transmit the request message.

The H-ANDSF 20A transmits the operator policy notification to the UE 10 (S2108). Based on the reception of the request message that is transmitted from the UE 10, the H-ANDSF 20A may notify the UE 10 of the operator policy notification or may perform the transmission at the timing at which the operator policy is updated or at an arbitrary timing.

The H-ANDSF 20A may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, pieces of approval information may include at least one or two pieces of approval information, among the approval information 2, the approval information 3, and the approval information 5 of the approval information 244.

The UE 10 receives the operator policy notification and acquires the ANDSF policy and the approval information.

Accordingly, based on the approval information 1, the UE 10 can receive the operator policy.

Furthermore, based on the approval information 1, the UE 10 may store the received ANDSF policy in the UE policy 142, or by performing the updating and so on, may manage the received ANDSF policy as a UE policy. Additionally, based on the approval information 1, the UE 10 may store the approval information 2 that is received from the H-ANDSF 20A, as approval information of the approval information 144, and, by performing the renewal and so on, may manage the received approval information 2, as approval information of the UE.

Next, the UE 10 determines whether or not to receive the RAN policy from the LTE_AN 80.

At this point, based on the approval information 2 of the approval information 144, the UE 10 may receive the RAN policy. For example, in the case where the approval information 2 is "APPROVED", the RAN policy may be received. Furthermore, in the case where the approval information 2 is "DISAPPROVED", a configuration, such as one in which the RAN policy is not performed, may be performed.

Furthermore, based on the approval information 2 that is received from the ANDSF 20, the UE 10 may receive the RAN policy, and, based on the renewal of the approval information 2 of the approval information 144 from "DISAPPROVED" to "APPROVED", may receive the RAN policy.

An example of a specific method in which the UE 10 acquires the RAN policy will be described below. The eNB 45 that is configured to be on the LTE_AN 80 transmits the RAN policy 4542. At this point, the LTE_AN may be an access network that uses LTE, which is operated by the home mobile operator with which the UE 10 has a contract. Furthermore, the eNB 45 may be a base station that is operated by the roaming home mobile operator.

Moreover, the eNB 45 may transmit the RAN policy to multiple terminals in a manner that performs the broadcasting to the base station area, and may transmit the RAN policy only to the UE 10.

Accordingly, based on the approval information 2, the UE 10 can receive the RAN policy.

Moreover, because the approval information 2 does not need necessarily to be transmitted from the H-ANDSF 20A, the RAN policy can be received based on the UE policy, not based on the operator policy. For example, as illustrated in FIG. 19, even in the communication system for which the ANDSF is not configured, the UE 10 can control whether or not to use the RAN policy, based on the approval information 2.

Next, with separate means, the UE 10 determines whether or not to receive the RAN policy from the LTE_AN 80.

For example, the policy of the roaming operator may be received from the V-ANDSF and may be determined based on the received operator policy.

Specifically, the UE 10 searches for the V-ANDSF 20B and ensures a secure communication with the V-ANDSF 20B that is found as the result of the search (S2110). Various methods in which the UE 10 searches for the V-ANDSF 20B are considered, and for example, the V-ANDSF 20B can be searched for by the UE 10 making an inquiry to the DNS server that is installed on the PDN. Various methods in which the UE 10 and the V-ANDSF 20B ensure a secure communication are considered and for example, the IPSec may be used.

Moreover, based on the approval information 1, the approval information 3, or the combination of both, the UE 10 may search for the V-ANDSF 20B or may transmit the control message for establishing a secure combination to the H-ANDSF 20A.

When ensuring the secure communication path between the UE 10 itself and the ANDSF 20, the UE 10 transmits the request for the access network information to the ANDSF 20 (S2112).

At this time, as illustrated in FIG. 10(*a*), the location information of the access system that is available for the UE 10 or of the UE 10 may be included in the request for the access network information. At this point, as capability information (capability) of the UE 10, the information indicating LTE that is an available access system and the information indicating WLAN may be included. Pieces of location information include the location information 1, and without being limited to this, may include the Cell ID or the Tracking Area ID (TAI) of the LTE base station apparatus and the Global Positioning System (GPS) information.

Moreover, based on the approval information 1, the approval information 3, or the combination of both, the UE 10 may transmit the request message.

The V-ANDSF 20B transmits the operator policy notification to the UE 10 (S2114). Based on the reception of the request message that is transmitted from the UE 10, the V-ANDSF 20B may notify the UE 10 of the operator policy notification or may perform the transmission at the timing at which the operator policy is updated or at an arbitrary timing.

The V-ANDSF 20B may include the operator policy with the ANDSF policy and the approval information being included.

At this point, the ANDSF policy may be a policy for the UE 10, which is stored in the ANDSF policy 242, and multiple policies are included in every piece of information for identifying the communication such as the flow communication. Additionally, policies of multiple types, such as the type 1 to the type 4, may be included.

Furthermore, pieces of approval information may include at least the approval information 4 of the approval information 244.

The UE 10 receives the operator policy notification and acquires the ANDSF policy and the approval information (S2114).

Accordingly, based on the approval information 1, the approval information 3, or the combination of both, the UE 10 can receive the operator policy.

Furthermore, based on the approval information 1, the approval information 3, or the combination of both, the UE 10 may store the received ANDSF policy in the UE policy 142, or by performing the updating and so on, may manage the received ANDSF policy as a UE policy. Additionally, based on the approval information 1, the approval information 3, or the combination of both, the UE 10 may store the approval information 2 that is received from the H-ANDSF 20B, as approval information of the approval information 144, and, by performing the renewal and so on, may manage the received approval information 2, as approval information of the UE.

Based on at least any one piece of approval information, among the approval information 2, the approval information 4, and the approval information 5, the UE 10 may determine that the RAN policy is received. Alternatively, based on the combination of the approval information 2, the approval information 4, and the approval information 5, the UE 10 may determine that the RAN policy is received.

For example, by the approval information 2 being "APPROVED", the UE 10 may receive the RAN policy. For example, by the approval information 4 being "APPROVED", the UE 10 may receive the RAN policy. Alternatively, by the approval information 5 being "APPROVED" and the approval information 4 being "APPROVED", the UE 10 may receive the RAN policy.

Furthermore, even in the case where the approval information 4 is "APPROVED", or even in the case where the approval information 4 is not stored, if the approval information 5 "DISAPPROVED", the UE 10 may determine that the reception of the RAN policy is not performed. In this manner, the operations operator of the H-PLMN can limit the reception processing of the RAN policy at the roaming destination by the UE 10.

Based on this determination, the UE 10 may receive the RAN policy 4542 from LTE (the eNB 45) (S2116).

Next, using the operator policy, the RAN policy, or both, the UE 10 makes a selection of the access system and makes a determination of the communication path switching procedure (S2118).

In the present example, based on the policy of the type 4 whose target is the flow 1, which is stored by the UE 10 in the UE policy 142, and on the RAN policy that is transmitted by the eNB 45, the example of switching the communication path in the flow 1 is described.

Moreover, the ANDSF policy that is stored in the UE policy 142 is the policy of the type 4. This means that, based on the approval information 1, although the UE policy 142 is updated with what is received from the ANDSF 20, any that is stored in the UE policy 142 may be available.

Furthermore, as described so far, the information for identifying the communication, the access network information, the priority level of the access network, and the threshold are stored in the ANDSF policy, in the state of being associated with one another. Additionally, the access network information and the threshold are stored in the RAN policy, in the state of being associated with each other. Specifically, the information for identifying a communication is information for identifying the flow 1, is information indicating LTE and WLAN in the access network information, and is information indicating that LTE takes precedence in terms of the priority level of the access network.

Based on the RAN policy, the UE 10 may determine the switching of the communication path based on the RAN policy. The UE 10 may determine the switching, based on at least one or two pieces of information, among the RSRP, the RSRQ, and the OPI, which are included in the RAN policy.

Furthermore, the communication path to the switching destination and the communication data for performing the switching may be determined based on the ANDSF policy. Specifically, because the information for identifying the communication for the ANDSF policy is information for identifying the flow 1, WLAN is stored as an available access network, it may be determined that a communication in the flow 1 is switched to a communication path that uses WLAN.

Furthermore, from the fact that the ANDSF policy is the policy of the type 4, the switching means may determine that the switching of the flow base is performed.

With the procedure described above, the policy reception processing (S1806) is completed. Moreover, because specific policy reception processing relating to the type 2, which is described in 1.3.4.5 according to the first embodiment, a detailed description thereof is omitted. Subsequently, the communication path switching processing (the communication path switching procedure 4) will be performed (S1808).

At this point, the communication path switching procedure 4 may be that same as the communication path switching procedure 3 that is described in 1.3.4.5. Because a detailed procedure and processing by each apparatus may be the same as those in the communication path switching procedure 4 that is described in 1.3.4.5, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication in the flow 1 using the communication path 2 (S1810). Moreover, the UE 10 continues the communication in the flow 3 using the communication path 2. Moreover, the UE 10 continues the communication in the flow 2 using the communication path 1 (S1808).

[2.1.4.6 Second Example of the Switching Procedure in which the Policy of the Type 4 is Used]

In the first example of the switching procedure in which the policy of the type 4 is used, which is described in 2.1.4.5, as an example, the communication path 2 is described as being the communication path for the connection to the PGW 40 through the WLAN_ANa 70.

Furthermore, the communication path 2 may be a communication path for the connection to the PGW 40 through the WLAN_ANb 75.

The switching procedure in which the UE 10 uses the policy of the type 4 will be described below referring to FIG. 18.

As illustrated in FIG. 18, the UE 10 in the initial state establishes the communication path 1, and performs the communications in the flow 1 and the flow 2 (S1802). Additionally, the UE 10 establishes the communication path 2 in addition to the communication path 1, and performs the communication in the flow 3 (S1804). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 through the WLAN_ANb 75. Additionally, the UE 10 may establish the communication path 1 in the state of being associated with the APN 2. In this manner, in the UE 10 and the PGW 40, the APN 2 and the communication path 2 are associated with each other, and the identification information for identifying the communication in the flow 3 and the communication path 1 are associated with each other.

Moreover, because a specific method of establishing the communication path 2, a management method in which the APN 2 and the communication path 2 correspond to each other, and a management method in which the identification information for identifying the communication and the communication path 1 correspond to each other are described when the WLAN_ANb access procedure is described in 1.3.1.3, detailed descriptions thereof are omitted.

Moreover, with different APNs, the UE 10 establishes the communication path 1 and the communication path 2. For example, the UE 10 establishes the communication path 1 using the APN 1 and establishes the communication path 2 using the APN 2. For this reason, when it comes to the IP address that is used for the communication path 1 and the IP address that is used for the communication path 2, the UE 10 can acquire different IP addresses, and perform communications that use the different IP addresses, respectively.

Next, the UE 10 performs the policy reception processing (S1806). This policy reception processing may be the same processing and procedure as the policy reception processing that is described in 2.1.4.5. For this reason, detailed descriptions thereof are omitted.

Subsequently, the communication path switching processing (the communication path switching procedure 4) will be performed (S1808).

At this point, the communication path switching procedure 4 may be that same as the communication path switching procedure 3 that is described in 1.3.4.6. Because a detailed procedure and processing by each apparatus may be the same as those in the communication path switching procedure 4 that is described in 1.3.4.6, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication in the flow 1 using the communication path 2 (S1810). Moreover, the UE 10 continues the communication in the flow 3 using the communication path 2. Moreover, the UE 10 continues the communication in the flow 2 using the communication path 1 (S1808).

[2.1.4.7 Third Example of the Switching Procedure in which the Policy of the Type 4 is Used]

In the first example of the switching procedure in which the policy of the type 4 is used, which is described in 2.1.4.5, as an example, the communication path 2 is described as being the communication path for the connection to the PGW 40 through the WLAN_ANa 70. Furthermore, the communication path 2 may be a communication path that is established using the DSMIP.

The switching procedure in which the UE 10 uses the policy of the type 4 will be described below referring to FIG. 18.

As illustrated in FIG. 18, the UE 10 in the initial state establishes the communication path 1, and performs the communications in the flow 1 and the flow 2 (S1802). Additionally, the UE 10 establishes the communication path 2 in addition to the communication path 1, and performs the communication in the flow 3 (S1804). Moreover, each flow may be for a communication that is identified with a specific application, a communication that can be identified with at least one or several pieces of information, among the transmission source IP address of a packet, the transmission destination IP address, the transmission source port number, the transmission destination port number, the protocol number, and the application name, or a communication that can be identified with the TFT or the like.

At this point, the communication path 1 may be a communication path for a connection to the PGW 40 through the LTE_AN 80. Additionally, the UE 10 may establish the communication path 1 in the state of being associated with the APN 1. In this manner, in the UE 10 and the PGW 40, the APN 1 and the communication path 1 are associated with each other, and identification information for identifying the communications in the flow 1 and the flow 2 and the communication path 1 are associated with each other.

Moreover, because a specific method of establishing the communication path 1, a management method in which the APN 1 and the communication path 1 correspond to each other, and a management method in which the identification information for identifying a communication and the communication path 1 correspond to each other are described when the LTE access procedure or the PDN connection establishment procedure is described in 1.3.1.1, detailed descriptions thereof are omitted.

Furthermore, the communication path 2 may be a communication path for the connection to the PGW 40 using the DSMIP. Additionally, the UE 10 may establish the communication path 1 in the state of being associated with the APN 1. In this manner, in the UE 10 and the PGW 40, the APN 1 and the communication path 2 are associated with each other, and identification information for identifying the communication in the flow 3 and the communication path 1 are associated with each other.

Moreover, because a specific method of establishing the communication path 2, a management method in which the APN 1 and the communication path 2 correspond to each other, and a management method in which the identification information for identifying the communication and the communication path 1 correspond to each other are described when the attachment procedure in which the DSMIP is used is described in 1.3.1.4, detailed descriptions thereof are omitted.

Moreover, with the same APN, the UE 10 establishes the communication path 1 and the communication path 2. For this reason, when it comes to an IP address that is used for the communication path 1 and an IP address that is used for the communication path 2, the UE 10 can acquire the same IP address, and can perform communications that use the same IP address.

Next, the UE 10 performs the policy reception processing (S1806). This policy reception processing may be the same processing and procedure as the policy reception processing that is described in 2.1.4.5. For this reason, detailed descriptions thereof are omitted.

Subsequently, the communication path switching processing (the communication path switching procedure 4) will be performed (S1808).

At this point, the communication path switching procedure 4 may be that same as the communication path switching procedure 3 that is described in 1.3.4.7. Because a detailed procedure and processing by each apparatus may be the same as those in the communication path switching procedure 4 that is described in 1.3.4.7, descriptions thereof are omitted.

Moreover, with regard to the communication path change procedure, the access network, the core network, and each apparatus that is included in the access network or the core network are configured to be included in the IP mobile communication network 5B on the V-PLMN, in the present example, whereas the access network, the core network, and each apparatus are configured to be included in the IP mobile communication network 5A on the H-PLMN according to the first embodiment.

With the procedure described above, the UE 10 can continue the communication in the flow 1 using the communication path 2 (S1810). Moreover, the UE 10 continues the communication in the flow 3 using the communication path 2. Moreover, the UE 10 continues the communication in the flow 2 using the communication path 1 (S1808).

3. Modification Example

In the first embodiment and the second embodiment that have been so far, the UE 10 is described as receiving the approval information from the H-ANDSF 20 or the V-ANDSF 20B. Moreover, as is described in the second embodiment, the approval information that the UE 10 receives from the H-ANDSF 20 may be at least among the approval information 2, among the approval information 3, and the approval information 5. Additionally, the UE 10 may receive two or more pieces of approval information among approval information 2, the approval information 3, and the approval information 5.

Furthermore, the approval information that the UE 10 receives from the V-ANDSF 20b may be the approval information 4.

The method of receiving the approval information is not limited to this, and the UE 10 may receive the approval information in the attachment procedure.

A procedure for acquiring the approval information in the present modification example will be described referring to FIG. 22.

An attachment Procedure for notifying the approval information is described referring to FIG. 22. First, the UE 10 transmits the attachment request to the eNB 45 (S2202). At this point, the UE 10 includes Capability flag in the eNB 45. Moreover, the Capability flag is information indicating the capability of the UE 10 to be able to determine the switching of the access network using the ANDSF policy 242 from the H-ANDSF 20 or the V-ANDSF 20B and the RAN policy 4542 that is transmitted from the eNB 45 on the H-PLMN or the V-PLMN.

Next, the eNB 45 transfers the attachment request to the MME 30 (S2204). This attachment request is an attachment request that is transmitted from the UE 10. More precisely, the Capability flag that the UE 10 includes is included as well.

The MME 30 that receives the attachment request from the eNB 45 detects, in the Capability flag that is included in the attachment request, that the UE 10 can detect the switching of the access network using the ANDSF policy 242 from the H-ANDSF 20 or the V-ANDSF 20B and the RAN policy 4542 that is transmitted from the eNB 45 on the H-PLMN or the V-PLMN.

Moreover, the MME 40 authenticates the UE 10 so that the UE 10 determines the switching of the access network using the ANDSF policy 242 from the H-ANDSF 20 or the V-ANDSF 20B and the RAN policy 4542 that is transmitted from the eNB 45 on the H-PLMN or the V-PLMN.

Next, the MME 40 transmits the session establishment request to the SGW 35 (S2206), the SGW 35 transmits the session establishment request to the PGW 40 (S2208), the PGW 40 transmits the session establishment response to the SGW 35 (S2210), and the SGW 35 transmits the session establishment response to MME 30 (S2212). Because S2206, S2208, S2210, and S2212 are the same as those in the attachment procedure in the related art, detailed descriptions thereof are omitted.

The MME 30 that receives the session establishment response transmits an initial context configuration request and an attachment entrustment to the eNB 45 (S2214). Moreover, the MME 30 may include the approval information in the initial context configuration request or the attachment entrustment.

The eNB 45 that receives the initial context configuration request and the attachment entrustment from the MME 30 transmits an RRC reconnection reconfiguration to the UE 10 (S2216). Moreover, the approval information is included in the RRC reconnection reconfiguration.

The UE 10 receives the RRC connection reconfiguration detects the approval information that is included in the RRC reconnection reconfiguration.

As described above, with the attachment procedure, the UE 10 can receive the approval information.

Moreover, the MME on the H-PLMN may transmit any approval information among the approval information 2, the approval information 3, and the approval information 5, and may transmit two or more pieces of approval information among the approval information 2, the approval information 3, and the approval information 5.

Furthermore, the MME on the V-PLMN may transmit pieces of approval information with the approval information 4 being included.

Moreover, a method for the UE 10 to manage the approval information, and processing by the UE 10, which is based on each piece of approval information, may be the same as the method and the processing that are described in the first embodiment and the second embodiment. For this reason, detailed descriptions thereof are omitted here.

The embodiments and the modification example of the present invention are described above in detail referring to the drawings, but specific constitutions are not limited to the embodiments and a design and the like within a scope that does not depart from the gist of the present invention fall within the scope of claims as well.

A program running on each of the apparatus and the device according to each embodiment is a program (a program that causes a computer to operate) that controls a CPU and the like in such a manner as to realize the functions according to each of the embodiments described above. Then, pieces of information that are handled in each of the apparatus and the device are temporarily accumulated in a temporary storage device (for example, a RAM) while being processed. Thereafter, the pieces of information are stored in various storage devices, that is, ROMs or HDDs, and if need arises, is read by the CPU in order to be modified or written.

At this point, as a recording medium on which to store the program, among a semiconductor medium (for example, a ROM, a nonvolatile memory card, or the like), an optical recording medium or an optical magnetic recording medium (for example, a Digital Versatile Disc (DVD), a Magneto Optical Disc (MO), a Mini Disc (MD), a Compact Disc (CD), a BD, or the like), a magnetic recording medium (for example, a magnetic tape, a flexible disk, or the like), and the like, any one may be used. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where programs are distributed on the market, the programs, each of which is stored on a portable recording medium, can be distributed, or the program can be transmitted to a server computer that is connected through a network such as the Internet. In this case, of course, a storage device of the server computer is also included in the present invention.

Furthermore, some or all portions of each of the apparatus and the device according to the embodiments, which are described above, may be realized as a Large Scale Integration (LSI) that is a typical integrated circuit. Each functional block of each of the apparatus and the device may be individually built into a chip, and some or all functional blocks may be integrated into a chip. Furthermore, a technique for the integrated circuit is not limited to the LSI, and an integrated circuit for the functional block may be realized as a dedicated circuit or a general-purpose processor. Furthermore, if with advances in a semiconductor technology, a circuit integration technology with which an LSI is replaced appears, of course, it is also possible to use an integrated circuit to which such a technology is applied.

Furthermore, according to the embodiments described above, the description is provided with LTE and WLAN (for example, IEEE 802.11a/b/n and the like) as examples of the wireless access network, but instead of WLAN, the connection may be made using WiMAX.

The invention claimed is:

1. A UE (User Equipment) comprising:
reception circuitry configured for:
    receiving an ANDSF (Access Network Discovery and Selection Function) Policy from an ANDSF located in a Home PLMN (Public Land Mobile Network), wherein
        the ANDSF Policy contains an ISRP (Inter-System Routing Policy) and/or an IARP (Inter-APN Routing Policy); and
    receiving RAN information containing a threshold for switching communication paths, from an LTE access network; and
a controller configured for selecting an access network by using the ISRP and/or the IARP if the UE has the ANDSF Policy and the RAN information,
wherein
the access network is selected from between the LTE access network and a WLAN access network,
the ISRP contains a first OPI (Offload Preference Indicator),
the IARP contains a second OPI, and
the RAN information contains a third OPI.

2. A UE (User Equipment) comprising:
reception circuitry configured for:
    receiving an ANDSF (Access Network Discovery and Selection Function) Policy from an ANDSF located in a Home PLMN (Public Land Mobile Network), wherein
        the ANDSF Policy contains an ISRP (Inter-System Routing Policy) and/or an IARP (Inter-APN Routing Policy); and
    receiving RAN information containing a threshold for switching communication paths, from an LTE access network;
a storage configured for storing the ANDSF Policy and the RAN information; and
a controller configured for making a decision of an access network by comparing a third OPI (Offload Preference Indicator) with a first OPI and/or a second OPI, wherein:
the access network is selected from between the LTE access network and a WLAN access network,
the ISRP contains the first OPI,
the IARP contains the second OPI, and
the RAN information contains the third OPI.

3. A communication control method for use in a UE (User Equipment), the method comprising:
receiving an ANDSF (Access Network Discovery and Selection Function) Policy from an ANDSF located in a Home PLMN (Public Land Mobile Network), wherein
the ANDSF Policy contains an ISRP (Inter-System Routing Policy) and/or an IARP (Inter-APN Routing Policy);
receiving RAN information containing a threshold for switching communication paths, from an LTE access network; and
selecting an access network by using the ISRP and/or the IARP, if the UE has the ANDSF Policy and the RAN information,
wherein:
the access network is selected from between the LTE access network and a WLAN access network,
the ISRP contains a first OPI (Offload Preference Indicator),
the IARP contains a second OPI, and
the RAN information contains a third OPI.

4. A communication control method for use in a UE (User Equipment), the method comprising:
receiving an ANDSF (Access Network Discovery and Selection Function) Policy from an ANDSF located in a Home PLMN (Public Land Mobile Network), wherein
the ANDSF Policy contains an ISRP (Inter-System Routing Policy) and/or an IARP (Inter-APN Routing Policy);
receiving RAN information containing a threshold for switching communication paths from an LTE access network;
storing the ANDSF Policy and the RAN information; and
making a decision of an access network by comparing a third OPI (Offload Preference Indicator) with a first OPI and/or a second OPI,
wherein:
the access network is selected from between the LTE access network and a WLAN access network,
the ISRP contains the first OPI,
the IARP contains the second OPI, and
the RAN information contains the third OPI.

* * * * *